(12) United States Patent
Matsuoka et al.

(10) Patent No.: US 12,131,278 B2
(45) Date of Patent: Oct. 29, 2024

(54) SYSTEMS AND METHODS FOR PROCESSING TASKS DELEGATED TO A TASK FACILITATION SERVICE

(71) Applicant: Yohana LLC, Palo Alto, CA (US)

(72) Inventors: Yoky Matsuoka, Los Altos Hills, CA (US); Gwendolyn W. van der Linden, Redwood City, CA (US); Nitin Viswanathan, San Francisco, CA (US); Malia Beaulieu, San Jose, CA (US); Lingyun Liu, Sunnyvale, CA (US); Sean Paterson, Mountain View, CA (US); Benjamin Deming, Campbell, CA (US)

(73) Assignee: Yohana LLC, Palo Alto, CA (US)

( * ) Notice: Subject to any disclaimer, the term of this patent is extended or adjusted under 35 U.S.C. 154(b) by 21 days.

(21) Appl. No.: 17/930,105

(22) Filed: Sep. 7, 2022

(65) Prior Publication Data
US 2023/0071115 A1 Mar. 9, 2023

Related U.S. Application Data

(60) Provisional application No. 63/241,136, filed on Sep. 7, 2021.

(51) Int. Cl.
*G06Q 10/0631* (2023.01)
(52) U.S. Cl.
CPC .............. *G06Q 10/06316* (2013.01)
(58) Field of Classification Search
None
See application file for complete search history.

(56) References Cited

U.S. PATENT DOCUMENTS

| | | |
|---|---|---|
| 6,606,613 B1 | 8/2003 | Altschuler et al. |
| 7,620,470 B1 | 11/2009 | Hickey |
| 2002/0152254 A1 | 10/2002 | Teng |
| 2006/0136495 A1 | 6/2006 | Schaad |
| 2007/0043821 A1 | 2/2007 | Brumfield |
| 2007/0250784 A1 | 10/2007 | Riley |
| 2007/0282660 A1 | 12/2007 | Forth |
| 2008/0091782 A1 | 4/2008 | Jakobson |
| 2009/0055270 A1 | 2/2009 | Magdon-Ismail et al. |
| 2009/0138319 A1 | 5/2009 | Ratnala et al. |
| 2009/0204471 A1 | 8/2009 | Elenbaas et al. |
| 2010/0070542 A1 | 3/2010 | Feinsmith |
| 2010/0174577 A1 | 7/2010 | Duffy et al. |
| 2010/0287011 A1 | 11/2010 | Muchkaev |
| 2011/0282793 A1 | 11/2011 | Mercuri et al. |

(Continued)

OTHER PUBLICATIONS

International Search Report and Written Opinion mailed Oct. 11, 2022 in International Application PCT/US2022/074527.

(Continued)

*Primary Examiner* — Stephanie Z Delich
(74) *Attorney, Agent, or Firm* — Polsinelli LLP

(57) ABSTRACT

Systems and methods for delegating tasks for a task facilitation service include receiving a delegation indicator for a task and determining a communication policy for the task in response to receiving the delegation indicator. The communication policy generally inhibits communication between the task facilitation service and a member of the service. Generation of proposals for completing delegated tasks and prediction of missing task data are also facilitated by aspects of the task facilitation service.

24 Claims, 17 Drawing Sheets

(56) References Cited

U.S. PATENT DOCUMENTS

| | | |
|---|---|---|
| 2012/0042003 A1 | 2/2012 | Goetz et al. |
| 2012/0278117 A1 | 11/2012 | Nguyen et al. |
| 2014/0257899 A1 | 9/2014 | Peng |
| 2015/0081361 A1 | 3/2015 | Lee et al. |
| 2015/0269508 A1 | 9/2015 | Damboritz |
| 2015/0310362 A1 | 10/2015 | Huffman |
| 2015/0347944 A1 | 12/2015 | Aparimit |
| 2016/0292011 A1 | 10/2016 | Colson et al. |
| 2017/0061357 A1 | 3/2017 | Dubey |
| 2018/0129993 A1 | 5/2018 | Fowler et al. |
| 2018/0152407 A1 | 5/2018 | Soni |
| 2019/0035503 A1 | 1/2019 | Gonzalez et al. |
| 2019/0179667 A1 | 6/2019 | Kan et al. |
| 2019/0213528 A1 | 7/2019 | Gupta et al. |
| 2021/0090556 A1 | 3/2021 | Quemy et al. |
| 2021/0160375 A1 | 5/2021 | Takeuchi |

OTHER PUBLICATIONS

International Search Report and Written Opinion mailed Nov. 12, 2022 in International Application PCT/US2022/074525.
International Search Report and Written Opinion mailed Nov. 28, 2022 in International Application PCT/US2022/076004.
Zidle, Marcia, "10 Tips for Effective Delegation." Management Library, Jul. 19, 2011, https://management.org/blogs/supervision/2011/07/19/10-tips-for-effective-delegation/.
Office Action mailed Feb. 7, 2024 in U.S. Appl. No. 17/814,146.
Hsu, Hwai-Jung et al., "A Delegation framework for task-role based access control in WFMS," Journal of Information Science and Engineering, vol. 27, Issue 3, 2011, pp. 1011-1028.
International Preliminary Report on Patentability mailed Feb. 15, 2024 in International Application PCT/US2022/074525.
International Preliminary Report on Patentability mailed Feb. 15, 2024 in International Application PCT/US2022/074527.
International Search Report and Written Opinion mailed Mar. 7, 2024 in International Application PCT/US2022/074022.
International Preliminary Report on Patentability mailed Mar. 21, 2024 in International Application PCT/US2022/076004.
International Preliminary Report on Patentability mailed Mar. 21, 2024 in International Application PCT/US2022/074022.
Office Action mailed Mar. 26, 2024 in U.S. Appl. No. 17/817,518.
Office Action mailed Jun. 4, 2024 in U.S. Appl. No. 17/817,500.
Gaaloul, Khaled, et al., "A Secure Task Delegation Model for Workflows," Conference: Emerging Security Information, Systems and Technologies, IEEE Xplore, Aug. 25, 2008, pp. 10-15.
Office Action mailed Aug. 26, 2024 in U.S. Appl. No. 17/814,146.
Itaiwi, Al-Mutazbellah Khamees et al., "A multi-agent framework for dynamic task assignment and delegation in task distribution," 2012 International Conference on Computer & Information Science (ICCIS), Kuala Lumpur, Malaysia, 2012, pp. 318-323.

SYSTEMS AND METHODS FOR PROCESSING TASKS DELEGATED TO A TASK FACILITATION SERVICE

CROSS-REFERENCE TO RELATED APPLICATIONS

This application is related to and claims priority from U.S. provisional patent application No. 63/241,136 filed Sep. 7, 2021, the entire contents of which are fully incorporated by reference herein for all purposes.

FIELD

The present disclosure relates generally to determination and delegation of tasks. In one example, the systems and methods described herein may be used to generate proposals and modify communication policies for a task facilitation service in response to delegation of a task to the task facilitation service.

SUMMARY

Disclosed embodiments may provide approaches for processing delegation instructions received from a user of a task facilitation service. The task facilitation service tracks and facilitates completion of tasks on behalf of the user. While the task facilitation service may work with a user to complete certain tasks, the user may also delegate tasks to the task facilitation service for completion. When a task is delegated, the task facilitation service (which may include a representative acting on behalf of the task facilitation service) may complete some or all of the delegated task with reduced interaction with the user. In certain cases, a delegated task may not be fully defined. In such cases, the task facilitation service may use predictive models, historical data, user preferences, and other data to determine any missing information necessary for completing the task. The task facilitation service further includes functionality for permitting users to undelegate tasks and reinstate communication policies requiring increased interaction between the task facilitation service and the user.

In one aspect of the present disclosure, a computer-implemented method is provided. The method includes receiving a delegation indicator for a task associated with a user where the delegation indicator corresponds to the user delegating the task for completion by a task facilitation service. The method further includes determining a communication policy for the task responsive to receiving the delegation indicator. The communication policy inhibits transmission of communications to a computing device associated with the user as compared to before receiving the delegation indicator.

In some embodiments the communication policy inhibits the transmission of communications by precluding the transmission of communications to the computing device associated with the user.

In some embodiments the transmission of communications is from a computing device corresponding to a representative of the task facilitation service to the computing device corresponding to the user. In such embodiments the communication policy may inhibit the transmission of communications by requiring confirmation at the computing device corresponding to the representative before permitting a transmission of a communication to the computing device corresponding to the user.

In some embodiments the method further includes identifying a missing value for a parameter of the task and predicting the missing value for the parameter using a parameter prediction model, wherein the parameter prediction model is updated based on historic activity of the user.

In some embodiments the method further includes identifying a missing value for a parameter of the task and transmitting a request for the value for the parameter of the task to one of the computing device associated with the user and a computing device associated with a representative of the task facilitation service.

In some embodiments the method further includes generating a proposal for completion of the task using a proposal recommendation system. Generating the proposal may include providing a set of parameter values for the task to the proposal recommendation system.

In some embodiments the method further includes generating a proposal for completion of the task using a proposal recommendation system. Generating the proposal may include providing a set of parameter values for the task to the proposal recommendation system where the proposal recommendation system selects a proposal template based on the set of parameter values for the task.

In some embodiments the method further includes receiving feedback from the user following completion of the task and corresponding to completion of the task and updating a model of the task facilitation service based on the feedback received from the user.

In some embodiments the communication policy is a first communication policy and the method further includes receiving a revocation indicator for the task where the revocation indicator indicates that the task is to be no longer delegated for completion by the task facilitation service. In such embodiments, the method further includes determining a second communication policy for the task in response to receiving the revocation indicator, the second communication policy being more permissive than the first communication policy.

In another aspect of this disclosure, a system includes one or more processors and memory including instructions that, as a result of being executed by the one or more processors, cause the system to perform the processes described herein. In another aspect, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

BRIEF DESCRIPTION OF THE DRAWINGS

Illustrative embodiments are described in detail below with reference to the following figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may include a framework to identify and recommend tasks that may be performed for the benefit of a member. Through this framework, a member may be assigned with a representative that, over time, may learn about the member's preferences and behavior, which can be used to recommend tasks that can be performed to reduce the member's cognitive load. Embodiments of this disclosure may selectively enable delegation controls at a user interface of the member based on historic activity, demographic information, and other data collected about the member. When an enabled delegation control is activated by the member, the corresponding task may be updated or otherwise modified to indicate that the task is to be delegated to a representative or third party for completion. Among other things, delegating a task reduces the need for involvement of the member in completing the task, reducing the member's cognitive load, among other benefits.

Figure 1:
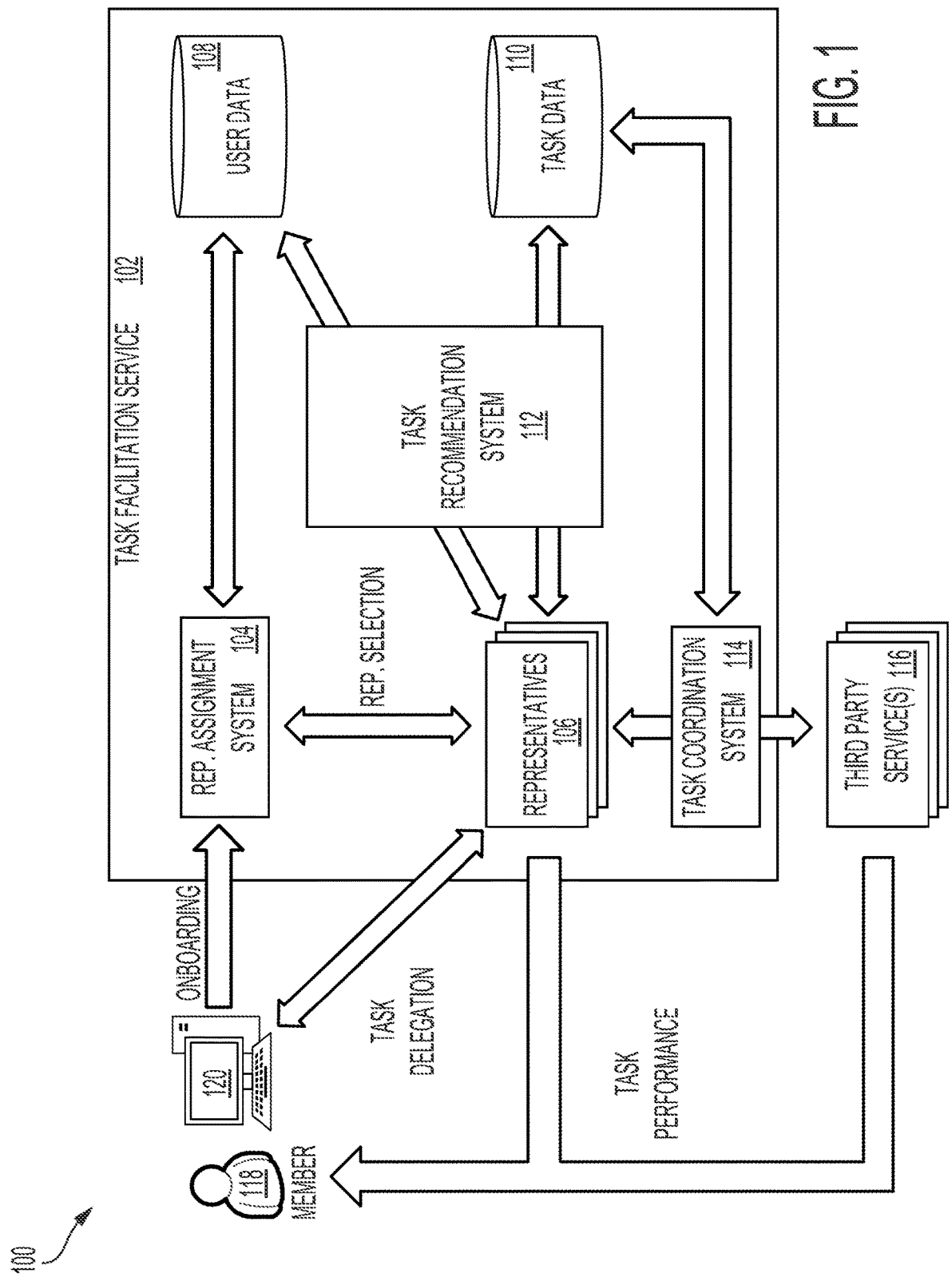
FIG. 1 shows an illustrative example of an environment in which a task facilitation service assigns a representative to a member through which various tasks performable for the benefit of the member can be recommended for performance by the representative and/or one or more third-party services in accordance with various embodiments.

FIG. 1 shows an illustrative example of an environment 100 in which a task facilitation service 102 assigns a representative 106 to a member 118 through which various tasks performable for the benefit of the member 118 can be recommended for performance by the representative 106 and/or one or more third-party services 116 in accordance with various embodiments. The task facilitation service 102 may be implemented to reduce the cognitive load on members and their families in performing various tasks in and around their homes by identifying and delegating tasks to representatives 106 that may coordinate performance of these tasks for the benefit of these members. In an embodiment, a member 118, via a computing device 120 (e.g., laptop computer, smartphone, etc.), may submit a request to the task facilitation service 102 to initiate an onboarding process for assignment of a representative 106 to the member 120 and to initiate identification of tasks that are performable for the benefit of the member 118. For instance, the member 118 may access the task facilitation service 102 via an application provided by the task facilitation service 102 and installed onto a computing device 120. Additionally, or alternatively, the task facilitation service 102 may maintain a web server (not shown) that hosts one or more websites configured to present or otherwise make available an interface through which the member 118 may access the task facilitation service 102 and initiate the onboarding process.

During the onboarding process, the task facilitation service 102 may collect identifying information of the member 118, which may be used by a representative assignment system 104 to identify and assign a representative 106 to the member 118. For instance, the task facilitation service 102 may provide, to the member 118, a survey or questionnaire through which the member 118 may provide identifying information usable by the representative assignment system 104 to select a representative 106 for the member 118. For instance, the task facilitation service 102 may prompt the member 118 to provide detailed information with regard to the composition of the member's family (e.g., number of inhabitants in the member's home, the number of children in the member's home, the number and types of pets in the member's home, etc.), the physical location of the member's home, any special needs or requirements of the member 118 (e.g., physical or emotional disabilities, etc.), and the like. In some instances, the member 118 may be prompted to provide demographic information (e.g., age, ethnicity, race, languages written/spoken, etc.). The member 118 may also be prompted to indicate any personal interests or hobbies that may be used to identify possible experiences that may be of interest to the member 118 (described in greater detail herein). In some instances, the task facilitation service 102 may prompt the member 118 to specify any tasks that the member 118 would like assistance with or would otherwise like to delegate to another entity, such as a representative and/or a third party.

In an embodiment, the task facilitation service 102 can prompt the member 118 to indicate a level or other measure of trust in delegating tasks to others, such as a representative and/or third-party. For instance, the task facilitation service 102 may utilize the identifying information submitted by the member 118 during the onboarding process to identify initial categories of tasks that may be relevant to the member's day-to-day life. In some instances, the task facilitation service 102 can utilize a machine learning algorithm or artificial intelligence to identify the categories of tasks that may be of relevance to the member 118. For instance, the task facilitation service 102 may implement a clustering algorithm to identify similarly situated members based on one or more vectors (e.g., geographic location, demographic information, likelihood to delegate tasks to others, family composition, home composition, etc.). In some instances, a dataset of input member characteristics corresponding to responses to prompts provided by the task facilitation service 102 provided by sample members (e.g., testers, etc.) may be analyzed using a clustering algorithm to identify different types of members that may interact with the task facilitation service 102. Example clustering algorithms that may trained using sample member datasets (e.g., historical member data, hypothetical member data, etc.) to classify a member in order to identify categories of tasks that may be of relevance to the member may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning algorithm generated using the member's identifying information, the task facilitation service 102 may prompt the member 118 to provide responses as to a comfort level in delegating tasks corresponding to the categories of tasks provided by the machine learning algorithm. This may reduce the number of prompts provided to the member 118 and better tailor the prompts to the member's needs.

In an embodiment, the member's identifying information, as well as any information related to the member's level of comfort or interest in delegating different categories of tasks to others, is provided to a representative assignment system 104 of the task facilitation service 102 to identify a representative 106 that may be assigned to the member 118. The representative assignment system 104 may be implemented using a computer system or as an application or other executable code implemented on a computer system of the task facilitation service 102. The representative assignment system 104, in an embodiment, uses the member's identifying information, any information related to the member's level of comfort or interest in delegating tasks to others, and any other information obtained during the onboarding process as input to a classification or clustering algorithm configured to identify representatives that may be well-suited to interact and communicate with the member 118 in a productive manner. For instance, representatives 106 may be profiled based on various criteria, including (but not limited to) demographics and other identifying information, geographic location, experience in handling different categories of tasks, experience in communicating with different categories of members, and the like. Using the classification or clustering algorithm, the representative assignment system 104 may identify a set of representatives 106 that may be more likely to develop a positive, long-term relationship with the member 118 while addressing any tasks that may need to be addressed for the benefit of the member 118.

Once the representative assignment system 104 has identified a set of representatives 106 that may be assigned to the member 118 to serve as an assistant or concierge for the member 118, the representative assignment system 104 may evaluate data corresponding to each representative of the set of representatives 106 to identify a particular representative that can be assigned to the member 118. For instance, the representative assignment system 104 may rank each representative of the set of representatives 106 according to degrees or vectors of similarity between the member's and representative's demographic information. For instance, if a member and a particular representative share a similar background (e.g., attended university in the same city, are from the same hometown, share particular interests, etc.), the representative assignment system 104 may rank the particular representative higher compared to other representatives that may have less similar backgrounds. Similarly, if a member and a particular representative are within geographic proximity to one another, the representative assignment system 104 may rank the particular representative higher compared to other representatives that may be further away from the member 118. Each factor, in some instances, may be weighed based on the impact of the factor on the creation of a positive, long-term relationship between members and representatives. For instance, based on historical data corresponding to member interactions with representatives, the representative assignment system 104 may identify correlations between different factors and the polarities of these interactions (e.g., positive, negative, etc.). Based on these correlations (or lack thereof), the representative assignment system 104 may apply a weight to each factor.

In some instances, each representative of the identified set of representatives 106 may be assigned a score corresponding to the various factors corresponding to the degrees or vectors of similarity between the member's and representative's demographic information. For instance, each factor may have a possible range of scores corresponding to the weight assigned to the factor. As an illustrative example, the various factors used to obtain representative scores may each have a possible score between 1 and 10. However, based on the weight assigned to each factor, the possible score may be multiplied by a weighting factor such that a factor having greater weight may be multiplied by a higher weighting factor compared to a factor having a lesser weight. The result is a set of different scoring ranges corresponding to the importance or relevance of the factor in determining a match between a member 118 and a representative. The scores determined for the various factors may be aggregated to obtain a composite score for each representative of the set of representatives 106. These composite scores may be used to create the ranking of the set of representatives 106.

In an embodiment, the representative assignment system 104 uses the ranking of the set of representatives 106 to select a representative that may be assigned to the member 118. For instance, the representative assignment system 104 may select the highest ranked representative and determine the representative's availability to engage the member 118 in identifying and recommending tasks, coordinating resolution of tasks, and otherwise communicating with the member 118 to assure that their needs are addressed. If the selected representative is unavailable (e.g., the representative is already engaged with one or more other members, etc.), the representative assignment system 104 may select another representative according to the aforementioned ranking and determine the availability of this representative to engage the member 118. This process may be repeated until a representative is identified from the set of representatives 106 that is available to engage the member 118. In some instances, representative availability may be used as a factor used to obtain the aforementioned representative scores, whereby a representative that is unavailable or otherwise does not have sufficient bandwidth to accommodate the new member 118 may be assigned a lower representative score. Accordingly, an unavailable representative may be ranked lower than other representatives that may be available for assignment to the member 118.

In an embodiment, the representative assignment system 104 can select a representative from the set of representatives 106 based on information corresponding to the availability of each representative. For instance, the representative assignment system 104 may automatically select the first available representative from the set of representatives 106. In some instances, the representative assignment system 104 may automatically select the first available representative that satisfies one or more criteria corresponding to the member's identifying information (e.g., a representative whose profile best matches the member profile, etc.). For example, the representative assignment system 104 may automatically select an available representative that is within geographic proximity of the member 118, shares a similar background as that of the member 118, and the like.

In an embodiment, the representative 106 can be an automated process, such as a bot, which may be configured to automatically engage and interact with the member 118. For instance, the representative assignment system 104 may utilize the responses provided by the member 118 during the onboarding process as input to a machine learning algorithm or artificial intelligence to generate a member profile and a bot that may serve as a representative 106 for the member 118. The bot may be configured to autonomously chat with the member 118 to generate tasks and proposals, perform tasks on behalf of the member 118 in accordance with any approved proposals, and the like as described herein. The bot may be configured according to the parameters or characteristics of the member 118 as defined in the member profile. As the bot communicates with the member 118 over time, the bot may be updated to improve the bot's interaction with the member 118.

Data associated with the member 118 collected during the onboarding process, as well as any data corresponding to the selected representative, may be stored in a user datastore 108. The user datastore 108 may include an entry corresponding to each member 118 of the task facilitation service 102. The entry may include identifying information of the corresponding member 118, as well as an identifier or other information corresponding to the representative assigned to the member 118. As described in greater detail herein, an entry in the user datastore 108 may further include historical data corresponding to communications between the member 118 and the assigned representative made over time. For instance, as a member 118 interacts with a representative 106 over a chat session or stream, messages exchanged over the chat session or stream may be recorded in the user datastore 108.

In an embodiment, the data associated with the member 118 is used by the task facilitation service 102 to create a member profile corresponding to the member 118. As noted above, the task facilitation service 102 may provide, to the member 118, a survey or questionnaire through which the member 118 may provide identifying information associated with the member 118. The responses provided by the member 118 to this survey or questionnaire may be used by the task facilitation service 102 to generate an initial member profile corresponding to the member 118. In an embodiment, once the representative assignment system 104 has assigned a representative to the member 118, the task facilitation service 102 can prompt the member 118 to generate a new member profile corresponding to the member 118. For instance, the task facilitation service 102 may provide the member 118 with a survey or questionnaire that includes a set of questions that may be used to supplement the information previously provided during the aforementioned onboarding process. For example, through the survey or questionnaire, the task facilitation service 102 may prompt the member 118 to provide additional information about family members, important dates (e.g., birthdays, etc.), dietary restrictions, and the like. Based on the responses provided by the member 118, the task facilitation service 102 may update the member profile corresponding to the member 118.

In some instances, the member profile may be accessible to the member 118, such as through an application or web portal provided by the task facilitation service 102. Through the application or web portal, the member 118 may add, remove, or edit any information within the member profile. The member profile, in some instances, may be divided into various sections corresponding to the member, the member's family, the member's home, and the like. Each of these sections may be supplemented based on the data associated with the member 118 collected during the onboarding process and on any responses to the survey or questionnaire provided to the member 118 after assignment of a representative to the member 118. Additionally, each section may include additional questions or prompts that the member 118 may use to provide additional information that may be used to expand the member profile. For example, through the member profile, the member 118 may be prompted to provide any credentials that may be used to access any external accounts (e.g., credit card accounts, retailer accounts, etc.) in order to facilitate completion of tasks.

In an embodiment, certain information within the member profile can be obscured from the member 118 or the representative. For example, as the representative develops a relationship with the member 118 through the completion of various tasks, the representative may modify the member profile to provide notes about the member 118 (e.g., the member's idiosyncrasies, any feedback regarding the member, etc.). Thus, when the member 118 accesses their member profile, these notes may be obscured such that the member 118 may be unable to review these notes or otherwise access any sections of the member profile that have been designated by the representative 118 or the task facilitation service 102 as being unavailable to the member.

As described in further detail herein, the representative assigned to the member 118 may add or otherwise modify information within the member profile based on information shared with the representative and/or on the representative's own observations regarding the member 118. Additionally, the task facilitation service 102 may automatically surface relevant portions of the member profile when creating or performing a task on behalf of the member 118. For example, if the representative is generating a task related to meal planning for the member 118, the task facilitation service 102 may automatically identify portions of the member profile that may be contextually relevant to meal planning and surface these portions of the member profile to the representative (e.g., dietary preferences, dietary restrictions, etc.). In some instances, if the representative requires additional information for creating or performing a task on behalf of the member 118, the representative may invite the member 118 to update specific portions of the member profile instead of having the member 118 share the additional information through a chat session or other communications session between the member 118 and the assigned representative.

In an embodiment, once the representative assignment system 104 has assigned a particular representative to the member 118, the representative assignment system 104 notifies the member 118 and the particular representative of the pairing. Further, the representative assignment system 104 may establish a chat session or other communications session between the member 118 and the assigned representative to facilitate communications between the member 118 and representative. For instance, via an application provided by the task facilitation service 102 and installed on the computing device 120 or through a web portal provided by the task facilitation service 102, the member 118 may exchange messages with the assigned representative over the chat session or other communication session. Similarly, the representative may be provided with an interface through which the representative may exchange messages with the member 118.

In some instances, the member 118 may initiate or otherwise resume a chat session with an assigned representative. For example, via the application or web portal provided by the task facilitation service 102, the member may transmit a message to the representative over the chat session or other communication session to communicate with the representative. The member 118 can submit a message to the representative to indicate that the member 118 would like assistance with a particular task. As an illustrative example, the member 118 can submit a message to the representative to indicate that the member 118 would like the representative's assistance with regard to an upcoming move to Denver in the coming months. The representative, via an interface provided by the task facilitation service 102, may be presented with the submitted message. Accordingly, the representative may evaluate the message and generate a corresponding task that is to be performed to assist the member 118. For instance, the representative, via the interface provided by the task facilitation service 102, may access a task generation form, through which the representative may provide information related to the task. The information may include information related to the member 118 (e.g., member name, member address, etc.) as well as various parameters of the task itself (e.g., allocated budget, timeframe for completion of the task, and the like). The parameters of the task may further include any member preferences (e.g., preferred brands, preferred third-party services 116, etc.).

In an embodiment, the representative can provide the information obtained from the member 118 for the task specified in the one or more messages exchanged between the member 118 and representative to a task recommendation system 112 of the task facilitation service 102 to dynamically, and in real-time, identify any additional task parameters that may be required for generating one or more proposals for completion of the task. The task recommendation system 112 may be implemented using a computer system or as an application or other executable code implemented on a computer system of the task facilitation service 102. The task recommendation system 112, in an embodiment, provides the representative with an interface through which the representative may generate a task that may be presented to the member over the chat session (e.g., via the application utilized by the member 118, etc.) and that may be completed by the representative and/or one or more third-party services 116 for the benefit of the member 118. For instance, the representative may provide a name for the task, any known parameters of the task as provided by the member (e.g., budgets, timeframes, task operations to be performed, etc.), and the like. As an illustrative example, if the member 118 transmits the message "Hey Russell, can you help with our move to Denver in 2 months," the representative may evaluate the message and generate a task entitled "Move to Denver." For this task, the representative may indicate that the timeframe for completion of the task is two months, as indicated by the member 118. Further, the representative may add additional information known to the representative about the member. For example, the representative may indicate any preferred moving companies, any budgetary constraints, and the like.

In an embodiment, the task recommendation system 112 provides, to the representative, any relevant information from the member profile corresponding to the member 118 that may be used to generate the task. For example, if the representative generates a new task entitled "Move to Denver," the task recommendation system 112 may determine that the new task corresponds to a move to a new city or other location. Accordingly, the task recommendation system 112 may process the member profile to identify portions of the member profile that may be relevant to the task (e.g., the physical location of the member's home, the number of inhabitants in the member's home, the square footage and number of rooms in the member's home, etc.). The task recommendation system 112 may automatically surface these portions of the member profile to the representative in order to allow the representative to use this information to generate the new task. Alternatively, the task recommendation system 112 may automatically use this information to populate one or more fields within a task template for creation of the new task.

In an embodiment, a representative can access a resource library maintained by the task facilitation service 102 to obtain a task template that may be used to generate a new task that may be performed on behalf of the member 118. The resource library may serve as a repository for different task templates corresponding to different task categories (e.g., vehicle maintenance tasks, home maintenance tasks, family-related event tasks, care giving tasks, experience-related tasks, etc.). A task template may include a plurality of task definition fields that may be used to define a task that may be performed for the benefit of the member 118. For example, the task definition fields corresponding to a vehicle maintenance task may be used to define the make and model of the member's vehicle, the age of the vehicle, information corresponding to the last time the vehicle was maintained, any reported accidents associated with the vehicle, a description of any issues associated with the vehicle, and the like. Thus, each task template maintained in the resource library may include fields that are specific to the task category associated with the task template. In some instances, a representative may further define custom fields for a task template, through which the representative may supply additional information that may be useful in defining and completing the task. These custom fields may be added to the task template such that, if the representative obtains the task template in the future to create a similar task, these custom fields may be available to the representative.

In some instances, if the representative selects a particular task template from the resource library, the task recommendation system 112 may automatically identify relevant portions of the member profile corresponding to the member 118. For instance, each template may be associated with a particular task category, as noted above. Further, different portions of a member profile may similarly be associated with different task categories such that, in response to representative selection of a task template, the task recommendation system 112 may identify the relevant portions of the member profile. From these relevant portions of the member profile, the task recommendation system 112 may automatically obtain information that may be used to populate one or more fields of the selected task template. For example, if the member 118 has indicated in their member profile that they drive a 2020 Subaru Outback, and this information is indicated in a portion of the member profile corresponding to the member's vehicle, the task recommendation system 112 may automatically obtain this information from the member profile to populate fields within the task template corresponding to the make, model, and year of the member's vehicle (e.g., "Make=Subaru," "Model=Outback," "Year=2020," etc.). This may reduce the amount of data entry that the representative is required to perform to populate a task template for a new task.

In an embodiment, based on the task template selected by the representative, the task recommendation system 112 automatically determines what portions of the member profile can be accessed by the representative for creation of the task. For instance, if the representative selects, from the resource library, a task template corresponding to vehicle maintenance tasks (e.g., the task category for the template is designated as "vehicle maintenance"), the task recommendation system 112 may process the member profile to identify one or more portions of the member profile that may be relevant to vehicle maintenance tasks (e.g., make and model of the member's vehicle, the age of the vehicle, information corresponding to the last time the vehicle was maintained, etc.). The task recommendation system 112 may present these relevant portions of the member profile to the representative while obscuring any other portions of the member profile that may not be relevant to the task category selected by the representative. This may prevent the representative from accessing any information from the member profile without a particular need for the information, thereby reducing exposure of the member's information.

In an embodiment, the representative can provide the generated task to the task recommendation system 112 to determine whether additional member input is needed for creation of a proposal that may be presented to the member for completion of the task. The task recommendation system 112, for instance, may process the generated task and information corresponding to the member 118 from the user datastore 108 using a machine learning algorithm or artificial intelligence to automatically identify additional parameters for the task, as well as any additional information that may be required from the member 118 for the generation of proposals. For instance, the task recommendation system 112 may use the generated task, information corresponding to the member 118 (e.g., the member profile), and historical data corresponding to tasks performed for other similarly situated members as input to the machine learning algorithm or artificial intelligence to identify any additional parameters that may be automatically completed for the task and any additional information that may be required of the member 118 for defining the task. For example, if the task is related to an upcoming move to another city, the task recommendation system 112 may utilize the machine learning algorithm or artificial intelligence to identify similarly situated members (e.g., members within the same geographic area of member 118, members having similar task delegation sensibilities, members having performed similar tasks, etc.). Based on the task generated for the member 118, characteristics of the member 118 from the member profile stored in the user datastore 108 and data corresponding to these similarly situated members, the task recommendation system 112 may provide additional parameters for the task. As an illustrative example, for the aforementioned task, "Move to Denver," the task recommendation system 112 may provide a recommended budget for the task, one or more moving companies that the member 118 may approve of (as used by other similarly situated members with positive feedback), and the like. The representative may review these additional parameters and select one or more of these parameters for inclusion in the task.

If the task recommendation system 112 determines that additional member input is required for the task, the task recommendation system 112 may provide the representative with recommendations for questions that may be presented to the member 118 regarding the task. Returning to the "Move to Denver" task example, if the task recommendation system 112 determines that it is important to understand one or more parameters of the member's home (e.g., square footage, number of rooms, etc.) for the task, the task recommendation system 112 may provide a recommendation to the representative to prompt the member 118 to provide these one or more parameters. The representative may review the recommendations provided by the task recommendation system 112 and, via the chat session, prompt the member 118 to provide the additional task parameters. This process may reduce the number of prompts provided to the member 118 in order to define a particular task, thereby reducing the cognitive load on the member 118. In some instances, rather than providing the representative with recommendations for questions that may be presented to the member 118 regarding the task, the task recommendation system 112 can automatically present these questions to the member 118 via the chat session. For instance, if the task recommendation system 112 determines that a question related to the square footage of the member's home is required for the task, the task recommendation system 112 may automatically prompt the member 118, via the chat session, to provide the square footage for the member's home. In an embodiment, information provided by the member 118 in response to these questions may be used to automatically supplement the member profile such that, for future tasks, this information may be readily available to the representative and/or to the task recommendation system 112 for defining new tasks.

In an embodiment, the task facilitation service 102 automatically generates a specific chat or other communications session corresponding to the task. This specific chat or other communications session corresponding to the task may be distinct from the chat session previously established between the member 118 and the representative. Through this task-specific chat or other communications session, the member 118 and the representative may exchange messages related to the particular task. For example, through this task-specific chat or other communications session, the representative may prompt the member 118 for information that may be required to determine one or more parameters of the task. Similarly, if the member 118 has questions related to the particular task, the member 118 may provide these questions through the task-specific chat or other communications session. The implementation of task-specific chat or other communications sessions may reduce the number of messages exchanged through other chat or communications sessions while ensuring that communications within these task-specific chat or other communications sessions are relevant to the corresponding tasks.

In an embodiment, once the representative has obtained the necessary task-related information from the member 118 and/or through the task recommendation system 112 (e.g., task parameters garnered via evaluation of tasks performed for similarly situated members, etc.), the representative can utilize a task coordination system 114 of the task facilitation service 102 to generate one or more proposals for resolution of the task. The task coordination system 114 may be implemented using a computer system or as an application or other executable code implemented on a computer system of the task facilitation service 102. In some examples, the representative may utilize a resource library maintained by the task coordination system 114 to identify one or more third-party services 116 and/or resources (e.g., retailers, restaurants, websites, brands, types of goods, particular goods, etc.) that may be used for performance the task for the benefit of the member 118 according to the one or more task parameters identified by the representative and the task recommendation system 112, as described above. A proposal may specify a timeframe for completion of the task, identification of any third-party services 116 (if any) that are to be engaged for completion of the task, a budget estimate for completion of the task, resources or types of resources to be used for completion of the task, and the like. The representative may present the proposal to the member 118 via the chat session to solicit a response from the member 118 to either proceed with the proposal or to provide an alternative proposal for completion of the task.

In an embodiment, the task recommendation system 112 can provide the representative with a recommendation as to whether the representative should provide the member 118 with a proposal and provide the member with an option to defer to the representative with regard to completion of the defined task. For instance, in addition to providing member and task-related information to the task recommendation system 112 to identify additional parameters for the task, the representative may indicate its recommendation to the task recommendation system 112 to present the member 118 with one or more proposals for completion of the task and to either present or omit an option to defer to the representative for completion of the task. The task recommendation system 112 may utilize the machine learning algorithm or artificial intelligence to generate the aforementioned recommendation. The task recommendation system 112 may utilize the information provided by the representative, as well as data for similarly situated members from the user datastore 108 and task data corresponding to similar tasks from a task datastore 110 (e.g., tasks having similar parameters to the submitted task, tasks performed on behalf of similarly situated members, etc.), to determine whether to recommend presentation of one or more proposals for completion of the task and whether to present the member 118 with an option to defer to the representative for completion of the task.

If the representative determines that the member is to be presented with an option to defer to the representative for completion of the task, the representative may present this option to the member over the chat session. The option may be presented in the form of a button or other graphical user interface (GUI) element that the member may select to indicate its approval of the option. For example, the member may be presented with a "Run With It" button to provide the member with an option to defer all decisions related to performance of the task to the representative. If the member 118 selects the option, the representative may present a proposal that has been selected by the representative for completion of the task on behalf of the member 118 and may proceed to coordinate with one or more third-party services 116 for performance and completion of the task according to the proposal. Thus, rather than allowing the member 118 to select a particular proposal for completion of the task, the representative may instead select a particular proposal on behalf of the member 118. The proposal may still be presented to the member 118 in order for the member 118 to verify how the task is to be completed. Any actions taken by the representative on behalf of the member 118 for completion of the task may be recorded in an entry corresponding to the task in the task datastore 110. Alternatively, if the member 118 rejects the option and instead indicates that the representative is to provide one or more proposals for completion of the task, the representative may generate one or more proposals, as described above.

The task recommendation system 112, in an embodiment, records the member's reaction to being presented with an option to defer to the representative for completion of a task for use in training the machine learning algorithm or artificial intelligence used to make recommendations to the representative for presentation of the option. For instance, if the representative opted to present the option to the member 118, the task recommendation system 112 may record whether the member 118 selected the option or declined the offer and requested presentation of one or more proposals related to the task. Similarly, if the representative opted to present one or more proposals without presenting the option to defer to the representative, the task recommendation system 112 may record whether the member 118 was satisfied with the presentation of these one or more proposals or requested that the representative select a proposal on the member's behalf, thus deferring to the representative for completion of the task. These member reactions, along with data corresponding to the task, the representative's actions (e.g., presentation of the option, presentation of proposals, etc.), and the recommendation provided by the task recommendation system 112 may be stored in the task datastore 110 for use by the task recommendation system 112 in training and/or reinforcing the machine learning algorithm or artificial intelligence.

In an embodiment, the representative can suggest one or more tasks based on member characteristics, task history, and other factors. For instance, as the member 118 communicates with the representative over the chat session, the representative may evaluate any messages from the member 118 to identify any tasks that may be performed to reduce the member's cognitive load. As an illustrative example, if the member 118 indicates, over the chat session, that their spouse's birthday is coming up, the representative may utilize its knowledge of the member 118 to develop one or more tasks that may be recommended to the member 118 in anticipation of their spouse's birthday. The representative may recommend tasks such as purchasing a cake, ordering flowers, setting up a unique travel experience for the member 118, and the like. In some embodiments, the representative can generate task suggestions without member input. For instance, as part of the onboarding process, the member 118 may provide the task facilitation service 102 with access to one or more member resources, such as the member's calendar, the member's personal fitness devices (e.g., fitness trackers, exercise equipment having communication capabilities, etc.), the member's vehicle data, and the like. Data collected from these member resources may be monitored by the representative, which may parse the data to generate task suggestions for the member 118.

In an embodiment, the data collected from a member 118 over a chat session with the representative may be evaluated by the task recommendation system 112 to identify one or more tasks that may be presented to the member 118 for completion. For instance, the task recommendation system 112 may utilize natural language processing (NLP) or other artificial intelligence to evaluate received messages or other communications from the member 118 to identify an intent. An intent may correspond to an issue that a member 118 wishes to have resolved. Examples of intents can include (for example) topic, sentiment, complexity, and urgency. A topic can include, but is not limited to, a subject, a product, a service, a technical issue, a use question, a complaint, a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). The intent may be used by the NLP algorithm or other artificial intelligence to identify possible tasks that may be recommended to the member 118. For instance, the task recommendation system 112 may process any incoming messages from the member 118 using NLP or other artificial intelligence to detect, based on an identified intent, a new task or other issue that the member 118 would like to have resolved. In some instances, the task recommendation system 112 may utilize historical task data and corresponding messages from the task datastore 110 to train the NLP or other artificial intelligence to identify possible tasks. If the task recommendation system 112 identifies one or more possible tasks that may be recommended to the member 118, the task recommendation system 112 may present these possible tasks to the representative, which may select tasks that can be shared with the member 118 over the chat session.

In an embodiment, the task recommendation system 112 can generate a list of possible tasks that may be presented to the member 118 for completion to reduce the member's cognitive load. For instance, based on an evaluation of data collected from different member sources (e.g., personal fitness or biometric devices, video and audio recordings, etc.), the task recommendation system 112 may identify an initial set of tasks that may be completed for the benefit of the member 118. Additionally, the task recommendation system 112 can identify additional and/or alternative tasks based on external factors. For example, the task recommendation system 112 can identify seasonal tasks based on the member's geographic location (e.g., foliage collection, gutter cleaning, etc.). As another example, the task recommendation system 112 may identify tasks performed for the benefit of other members within the member's geographic region and/or that are otherwise similarly situated (e.g., share one or more characteristics with the member 118). For instance, if various members within the member's neighborhood are having their gutters cleaned or driveways sealed for winter, the task recommendation system 112 may determine that these tasks may be performed for the benefit of the member 118 and may be appealing to the member 118 for completion.

In an embodiment, the task recommendation system 112 can use the initial set of tasks, member-specific data from the user datastore 108 (e.g., characteristics, demographics, location, historical responses to recommendations and proposals, etc.), data corresponding to similarly-situated members from the user datastore 108, and historical data corresponding to tasks previously performed for the benefit of the member 118 and the other similarly-situated members from the task datastore 110 as input to a machine learning algorithm or artificial intelligence to identify a set of tasks that may be recommended to the member 118 for performance. For instance, while an initial set of tasks may include a task related to gutter cleaning, based on the member's preferences, the member 118 may prefer to perform this task themself. As such, the output of the machine learning algorithm or artificial intelligence (e.g., the set of tasks that may be recommended to the member 118) may omit this task. Further, in addition to the set of tasks that may be recommended to the member 118, the output of the machine learning algorithm or artificial intelligence may specify, for each identified task, a recommendation for presentation of the button or other GUI element that the member 118 may select to indicate that it would like to defer to the representative for performance of the task, as described above.

A listing of the set of tasks that may be recommended to the member 118 may be provided to the representative for a final determination as to which tasks may be presented to the member 118 through task-specific interfaces (e.g., a communications session specific to these tasks, etc.). In an embodiment, the task recommendation system 112 can rank the listing of the set of tasks based on a likelihood of the member 118 selecting the task for delegation to the representative for performance and/or coordination with third-party services 116. Alternatively, the task recommendation system 112 may rank the listing of the set of tasks based on the level of urgency for completion of each task. The level of urgency may be determined based on member characteristics (e.g., data corresponding to a member's own prioritization of certain tasks or categories of tasks) and/or potential risks to the member 118 if the task is not performed. For example, a task corresponding to replacement or installation of carbon monoxide detectors within the member's home may be ranked higher than a task corresponding to the replacement of a refrigerator water dispenser filter, as carbon monoxide filters may be more critical to member safety. As another illustrative example, if a member 118 places significant importance on the maintenance of their vehicle, the task recommendation system 112 may rank a task related to vehicle maintenance higher than a task related to other types of maintenance. As yet another illustrative example, the task recommendation system 112 may rank a task related to an upcoming birthday higher than a task that can be completed after the upcoming birthday.

The representative may review the set of tasks recommended by the task recommendation system 112 and select one or more of these tasks for presentation to the member 118 via task-specific interfaces corresponding to these tasks. Further, as described above, the representative may determine whether a task is to be presented with an option to defer to the representative for performance of the task (e.g., with a button or other GUI element to indicate the member's preference to defer to the representative for performance of the task). In some instances, the one or more tasks may be presented to the member 118 according to the ranking generated by the task recommendation system 112. Alternatively, the one or more tasks may be presented according to the representative's understanding of the member's own preferences for task prioritization. Through an interface provided by the task facilitation service 102, the member 118 may access any of the task-specific interfaces related to these tasks to select one or more tasks that may be performed with the assistance of the representative. The member 118 may alternatively dismiss any presented tasks that the member 118 would rather perform personally or that the member 118 does not otherwise want performed.

In an embodiment, the task recommendation system 112 can automatically select one or more of the tasks for presentation to the member 118 via a task-specific interface without representative interaction. For instance, the task recommendation system 112 may utilize a machine learning algorithm or artificial intelligence to select which tasks from the listing of the set of tasks previously ranked by the task recommendation system 112 may be presented to the member 118 through task-specific interfaces. As an illustrative example, the task recommendation system 112 may use the member profile corresponding to the member 118 (which can include historical data corresponding to member-representative communications, member feedback corresponding to representative performance and presented tasks/proposals, etc.), from the user datastore 108, tasks currently in progress for the member 118, and the listing of the set of tasks as input to the machine learning algorithm or artificial intelligence. The output generated by the machine learning algorithm or artificial intelligence may indicate which tasks of the listing of the set of tasks are to be presented automatically to the member 118 via task-specific interfaces corresponding to these tasks. As the member 118 interacts with these newly presented tasks, the task recommendation system 112 may record these interactions and use these interactions to further train the machine learning algorithm or artificial intelligence to better determine which tasks to present to member 118 and other similarly situated members.

In an embodiment, the task recommendation system 112 can monitor the chat session between the member 118 and the representative, as well as member interactions with task-specific interfaces provided by the task facilitation service 102 and related to different tasks that may be performed on behalf of the member 118 to collect data with regard to member selection of tasks for delegation to the representative for performance. For instance, the task recommendation system 112 may process messages corresponding to tasks presented to the member 118 by the representative over the chat session, as well as any interactions with the task-specific interfaces corresponding to these tasks (e.g., any task-specific communications sessions, member creation of discussions related to particular tasks, etc.) to determine a polarity or sentiment corresponding to each task. For instance, if a member 118 indicates, in a message to the representative, that it would prefer not to receive any task recommendations corresponding to vehicle maintenance, the task recommendation system 112 may ascribe a negative polarity or sentiment to tasks corresponding to vehicle maintenance. Alternatively, if a member 118 selects a task related to gutter cleaning for delegation to the representative and/or indicates in a message to the representative that recommendation of this task was a great idea, the task recommendation system 112 may ascribe a positive polarity or sentiment to this task. In an embodiment, the task recommendation system 112 can use these responses to tasks recommended to the member 118 to further train or reinforce the machine learning algorithm or artificial intelligence utilized to generate task recommendations that can be presented to the member 118 and other similarly situated members of the task facilitation service 102.

In an embodiment, in addition to recommending tasks that may be performed for the benefit of the member 118, a representative may recommend one or more curated experiences that may be appealing to the member 118 to take their mind off of urgent matters and to spend more time on themselves and their families. As noted above, during an onboarding process, a member 118 may be prompted to indicate any of its interests or hobbies that the member 118 finds enjoyable. Further, as the representative continues its interactions with the member 118 over the chat session, the representative may prompt the member 118 to provide additional information regarding its interests in a natural way. For instance, a representative may ask the member 118 "what will you be doing this weekend?" Based on the member response, the representative may update the member profile to indicate the member's preferences. Thus, over time, the representative and the task facilitation service 102 may develop a deeper understanding of the member's interests and hobbies.

In an embodiment, the task facilitation service 102 generates, in each geographic market in which the task facilitation service 102 operates, a set of experiences that may be available to members. For instance, the task facilitation service 102 may partner with various organizations within each geographic market to identify unique and/or time-limited experience opportunities that may be of interest to members of the task facilitation service. Additionally, for experiences that may not require curation (e.g., hikes, walks, etc.), the task facilitation service 102 may identify popular experiences within each geographic market that may be appealing to its members. The information collected by the task facilitation service 102 may be stored in a resource library or other repository accessible to the task recommendation system 112 and the various representatives 106.

In an embodiment, for each available experience, the task facilitation service 102 can generate a template that includes both the information required from a member 118 to plan the experience on behalf of the member 118 and a skeleton of what the proposal for the experience recommendation will look like when presented to the member 118. This may make it easier for a representative to complete definition of task(s) associated with the experience. In some instances, the template may incorporate data from various sources that provide high-quality recommendations, such as travel guides, food and restaurant guides, reputable publications, and the like. In an embodiment, if the representative selects a particular template for creation of a task associated with an experience, the task recommendation system 112 can automatically identify the portions of the member profile that may be used to populate the template. For example, if the representative selects a template corresponding to an evening out at a restaurant, the task recommendation system 112 may automatically process the member profile to identify any information corresponding to the member's dietary preferences and restrictions that may be used to populate one or more fields within the task template selected by the representative.

In an embodiment, the task recommendation system 112, periodically (e.g., monthly, bi-monthly, etc.) or in response to a triggering event (e.g., a set number of tasks are performed, member request, etc.), selects a set of experiences that may be recommended to the member 118. For instance, similar to the identification of tasks that may be recommended to the member 118, the task recommendation system 112 may use at least the set of available experiences and the member's preferences from the user datastore 108 as input to a machine learning algorithm or artificial intelligence to obtain, as output, a set of experiences that may be recommended to the member 118. The task recommendation system 112, in some instances, may present this set of experiences to the member 118 over the chat session on behalf of the representative or through task-specific interfaces corresponding to each of the set of experiences. Each experience recommendation may specify a description of the experience and any associated costs that may be incurred by the member 118. Further, for each experience recommendation presented, the task recommendation system 112 may provide a button or other GUI element that may be selectable by the member 118 to request curation of the experience for the member 118.

If the member 118 selects a particular experience recommendation corresponding to an experience that the member 118 would like to have curated on its behalf, the task recommendation service 112 or representative may generate one or more new tasks related to the curation of the selected experience recommendation. For instance, if the member 118 selects an experience recommendation related to a weekend picnic, the task recommendation system 112 or representative may add a new task to the member's tasks list such that the member 118 may evaluate the progress in completion of the task. Further, the representative may ask the member 118 particularized questions related to the selected experience to assist the representative in determining a proposal for completion of tasks associated with the selected experience. For example, if the member 118 selects an experience recommendation related to the curation of a weekend picnic, the representative may ask the member 118 as to how many adults and children will be attending, as this information may guide the representative in curating the weekend picnic for all parties and to identify appropriate third-party services 116 and possible venues for the weekend picnic. The responses provided by the member 118 may be used to update the member profile such that, for similar experiences and related tasks, these responses may be used to automatically obtain information that may be used for curation of the experience.

Similar to the process described above for the completion of a task for the benefit of a member 118, the representative can generate one or more proposals for curation of a selected experience. For instance, the representative may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member 118 over a chat or communications session specific to the experience (e.g., a task-specific interface corresponding to the particular experience) and via the application or web portal provided by the task facilitation service 102. Based on the member responses to the various options presented in the proposal, the representative may indicate that it is starting the curation process for the experience. Further, the representative may provide information related to the experience that may be relevant to the member 118. For example, if the member 118 has selected an option to pick-up food from a selected restaurant for a weekend picnic, the representative may provide detailed driving directions from the member's home to the restaurant to pick up the food (this would not be presented if the member 118 had selected a delivery option), detailed driving directions from the restaurant to the selected venue, parking information, a listing of the food that is to be ordered, and the total price of the food order. The member 118 may review this proposal and may determine whether to accept the proposal. If the member 118 accepts the proposal, the representative may proceed to perform various tasks to curate the selected experience.

Once a member 118 has selected a particular proposal for a particular task or has selected a button or other GUI element associated with the particular task to indicate that it wishes to defer to the representative for performance of the task, if the task is to be completed using third-party services 116, the representative may coordinate with one or more third-party services 116 for completion of the task for the benefit of the member 118. For instance, the representative may utilize a task coordination system 114 of the task facilitation service 102 to identify and contact one or more third-party services 116 for performance of a task. As noted above, the task coordination system 114 may include a resource library that includes detailed information related to third-party services 116 that may be available for the performance of tasks on behalf of members of the task facilitation service 102. For example, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative may query the resource library to identify the one or more third-party services that are to perform the task and determine an estimated cost for performance of the task. In some instances, the representative may contact the one or more third-party services 116 to obtain quotes for completion of the task and to coordinate performance of the task for the benefit of the member 118.

In some instances, the resource library may further include detailed information corresponding to other services and other entities that may be associated or affiliated with the task facilitation service 102 and that are contracted to perform various tasks on behalf of members of the task facilitation service 102. These other services and other entities may provide their services or goods at rates agreed upon with the task facilitation service 102. Thus, if the representative selects any of these other services or other entities from the resource library, the representative may be able to determine the particular parameters (e.g., price, availability, time required, etc.) for completion of the task.

In an embodiment, for a given task, the representative (such as through a web portal or application provided by the task facilitation service) can query the resource library to identify one or more third-party services and other services/entities affiliated with the task facilitation service 102 from which to solicit quotes for completion of the task. For instance, for a newly created task, the representative may transmit a job offer to these one or more third-party services and other services/entities. The job offer may indicate various characteristics of the task that is to be completed (e.g., scope of the task, general geographic location of the member 118 or of where the task is to be completed, desired budget, etc.). Through an application or web portal provided by the task facilitation service 102, a third-party service or other service/entity may review the job offer and determine whether to submit a quote for completion of the task or to decline the job offer. If a third-party service or other service/entity opts to reject the job offer, the representative may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative may use any provided quotes from the third-party services and/or other services/entities to generate different proposals for completion of the task. These different proposals may be presented to the member 118 through the task-specific interface corresponding to the particular task that is to be completed. If the member 118 selects a particular proposal from the set of proposals presented through the task-specific interface, the representative may transmit a notification to the third-party service or other service/entity that submitted the quote associated with the selected proposal to indicate that it has been selected for completion of the task. Accordingly, the representative may utilize a task coordination system 114 to coordinate with the third-party service or other service/entity for completion of the task, as described in greater detail herein.

In some instances, if the task is to be completed by the representative 106, the representative 106 may utilize the task coordination system 114 of the task facilitation service 102 to identify any resources that may be utilized by the representative 106 for performance of the task. The resource library may include detailed information related to different resources available for performance of a task. As an illustrative example, if the representative 106 is tasked with purchasing a set of filters for the member's home, the representative 106 may query the resource library to identify a retailer that may sell filters of a quality and/or price that is acceptable to the member 118 and that corresponds to the proposal accepted by the member 118. Further, the representative 106 may obtain, from the user datastore 108, available payment information of the member 118 that may be used to provide payment for any resources required by the representative 106 to complete the task. Using the aforementioned example, the representative 106 may obtain payment information of the member 118 from the user datastore 108 to complete a purchase with the retailer for the set of filters that are to be used in the member's home.

In an embodiment, the task coordination system 114 uses a machine learning algorithm or artificial intelligence to select one or more third-party services 116 and/or resources on behalf of the representative for performance of a task. For instance, the task coordination system 114 may utilize the selected proposal or parameters related to the task (e.g., if the member 118 has deferred to the representative for determination of how the task is to be performed), as well as historical task data from the task datastore 110 corresponding to similar tasks as input to the machine learning algorithm or artificial intelligence. The machine learning algorithm or artificial intelligence may produce, as output, a listing of one or more third-party services 116 that may perform the task with a high probability of satisfaction to the member 118. If the task is to be performed by the representative 106, the machine learning algorithm or artificial intelligence may produce, as output, a listing of resources (e.g., retailers, restaurants, brands, etc.) that may be used by the representative 106 for performance of the task with a high probability of satisfaction to the member 118. As noted above, the resource library may include, for each third-party service 116, a rating or score associated with the satisfaction with the third-party service 116 as determined by members of the task facilitation service 102. Further, the resource library may include a rating or score associated with the satisfaction with each resource (e.g., retailers, restaurants, brands, goods, materials, etc.) as determined by members of the task facilitation service 102. For example, when a task is completed, the representative may prompt the member 118 to provide a rating or score with regard to the performance of a third-party service in completing a task for the benefit of the member 118. As another example, if the task is performed by the representative 106, the representative may prompt the member 118 to provide a rating or score with regard to the representative's performance and to the resources utilized by the representative for completion of the task. Each rating or score is associated with the member that provided the rating or score, such that the task coordination system 114 may determine, using the machine learning algorithm or artificial intelligence, a likelihood of satisfaction for performance of a task based on the performance of the third-party service or of the satisfaction with the resources utilized by representatives with regard to similar tasks for similarly situated members. The task coordination system 114 may generate a listing of recommended third-party services 116 and/or resources for performance of a task, whereby the listing may be ranked according to the likelihood of satisfaction (e.g., score or other metric) assigned to each identified third-party service and/or resource.

In some instances, if the task cannot be completed by the third-party service or other service/entity according to the estimates provided in the selected proposal, the member 118 may be provided with an option to cancel the particular task or otherwise make changes to the task. For instance, if the new estimated cost for performance of the task exceeds the maximum amount specified in the selected proposal, the member 118 may ask the representative to find an alternative third-party service or other service/entity for performance of the task within the budget specified in the proposal. Similarly, if the timeframe for completion of the task is not within the timeframe indicated in the proposal, the member 118 can ask the representative to find an alternative third-party service or other service/entity for performance of the task within the original timeframe. The member's interventions may be recorded by the task recommendation system 112 and the task coordination system 114 to retrain their corresponding machine learning algorithms or artificial intelligence to better identify third-party services 116 and/or other services/entities that may perform tasks within the defined proposal parameters.

In an embodiment, once the representative has contracted with one or more third-party services 116 or other services/entities for performance of a task, the task coordination system 114 may monitor performance of the task by these third-party services 116 or other services/entities. For instance, the task coordination system 114 may record any information provided by the third-party services 116 or other services/entities with regard to the timeframe for performance of the task, the cost associated with performance of the task, any status updates with regard to performance of the task, and the like. The task coordination system 114 may associate this information with the data record in the task datastore 110 corresponding to the task being performed. Status updates provided by third-party services 116 or other services/entities may be provided automatically to the member 118 via the application or web portal provided by the task facilitation service 102 and to the representative.

In an embodiment, if the task is to be performed by the representative 106, the task coordination system 114 can monitor performance of the task by the representative 106. For instance, the task coordination system 114 may monitor, in real-time, any communications between the representative 106 and the member 118 regarding the representative's performance of the task. These communications may include messages from the representative 106 indicating any status updates with regard to performance of the task, any purchases or expenses incurred by the representative 106 in performing the task, the timeframe for completion of the task, and the like. The task coordination system 114 may associate these messages from the representative 106 with the data record in the task datastore 110 corresponding to the task being performed.

In some instances, the representative may automatically provide payment for the services and/or goods provided by the one or more third-party services 116 on behalf of the member 118 or for purchases made by the representative for completion of a task. For instance, during an onboarding process, the member 118 may provide payment information (e.g., credit card numbers and associated information, debit card numbers and associated information, banking information, etc.) that may be used by a representative to provide payment to third-party services 116 or for purchases to be made by the representative 106 for the benefit of the member 118. Thus, the member 118 may not be required to provide any payment information to allow the representative 106 and/or third-party services 116 to initiate performance of the task for the benefit of the member 118. This may further reduce the cognitive load on the member 118 to manage performance of a task.

As noted above, once a task has been completed, the member 118 may be prompted to provide feedback with regard to completion of the task. For instance, the member 118 may be prompted to provide feedback with regard to the performance and professionalism of the selected third-party services 116 in performance of the task. Further, the member 118 may be prompted to provide feedback with regard to the quality of the proposal provided by the representative and as to whether the performance of the task has addressed the underlying issue associated with the task. Using the responses provided by the member 118, the task facilitation service 102 may train or otherwise update the machine learning algorithms or artificial intelligence utilized by the task recommendation system 112 and the task coordination system 114 to provide better identification of tasks, creation of proposals, identification of third-party services 116 and/or other services/entities for completion of tasks for the benefit of the member 118 and other similarly-situated members, identification of resources that may be provided to the representative 106 for performance of a task for the benefit of the member 118, and the like.

It should be noted that for the processes described herein, various operations performed by the representative 106 may be additionally, or alternatively, performed using one or more machine learning algorithms or artificial intelligence. For example, as the representative 106 performs or otherwise coordinates performance of tasks on behalf of a member 118 over time, the task facilitation service 102 may continuously and automatically update the member profile according to member feedback related to the performance of these tasks by the representative 106 and/or third-party services 116. In an embodiment, the task recommendation system 112, after a member's profile has been updated over a period of time (e.g., six months, a year, etc.) or over a set of tasks (e.g., twenty tasks, thirty tasks, etc.), may utilize a machine learning algorithm or artificial intelligence to automatically and dynamically generate new tasks based on the various attributes of the member's profile (e.g., historical data corresponding to member-representative communications, member feedback corresponding to representative performance and presented tasks/proposals, etc.) with or without representative interaction. The task recommendation system 112 may automatically communicate with the member 118 to obtain any additional information required for new tasks and automatically generate proposals that may be presented to the member 118 for performance of these tasks. The representative 106 may monitor communications between the task recommendation system 112 and the member 118 to ensure that the conversation maintains a positive polarity (e.g., the member 118 is satisfied with its interaction with the task recommendation system 112 or other bot, etc.). If the representative 106 determines that the conversation has a negative polarity (e.g., the member 118 is expressing frustration, the task recommendation system 112 or bot is unable to process the member's responses or asks, etc.), the representative 106 may intervene in the conversation. This may allow the representative 106 to address any member concerns and perform any tasks on behalf of the member 118.

Thus, unlike automated customer service systems and environments, wherein these systems and environment may have little to no knowledge of the users interacting with agents or other automated systems, the task recommendation system 112 can continuously update the member profile to provide up-to-date historical information about the member 118 based on the member's automatic interaction with the system or interaction with the representative 106 and on the tasks performed on behalf of the member 118 over time. This historical information, which may be automatically and dynamically updated as the member 118 or the system interacts with the representative 106 and as tasks are devised, proposed, and performed for the member 118 over time, may be used by the task recommendation system 112 to anticipate, identify, and present appropriate or intelligent responses to member 118 queries, needs, and/or goals.

Figure 2:
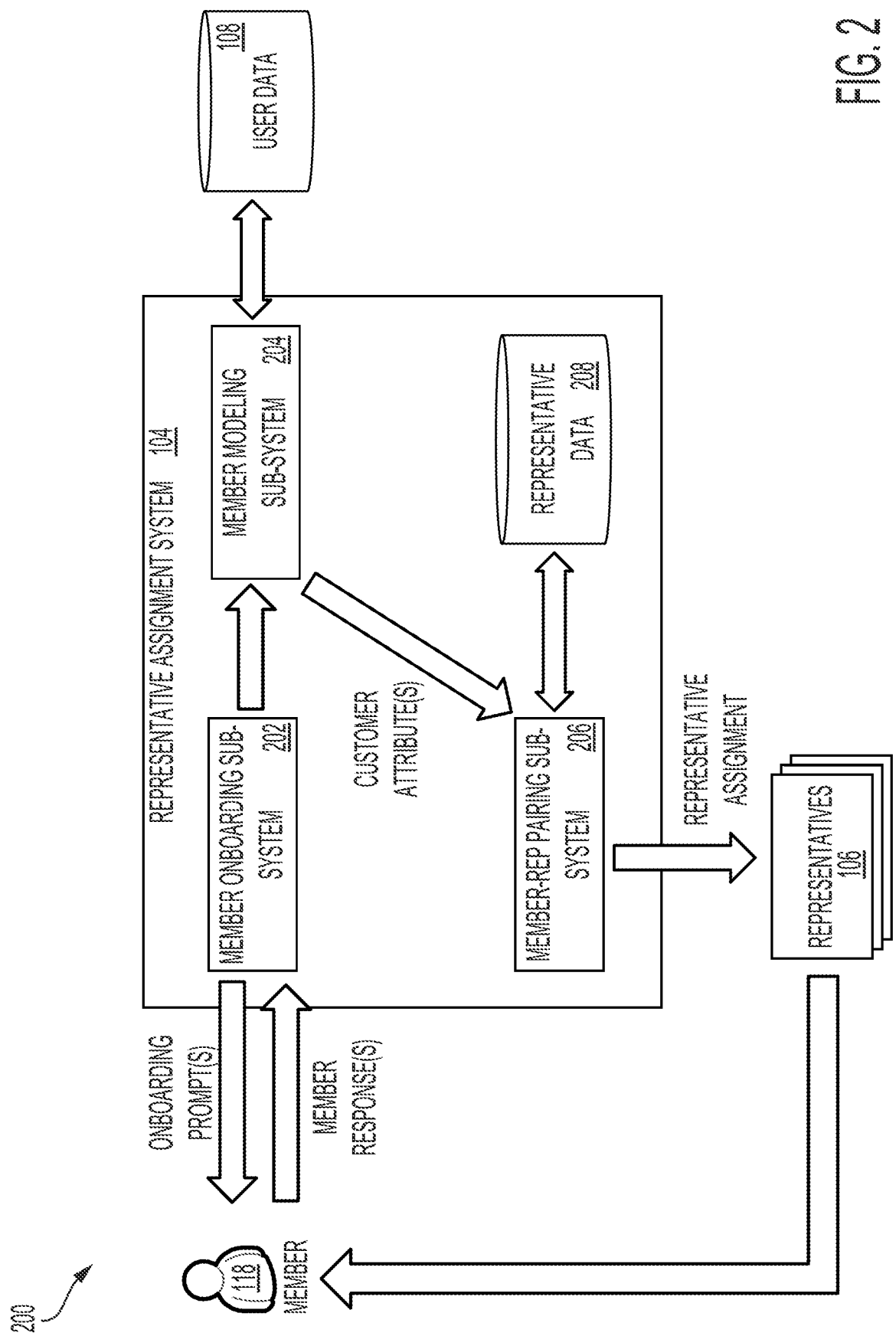
FIG. 2 shows an illustrative example of an environment in which a representative assignment system performs an onboarding process for a member and assigns a representative to the member based on member and representative attributes in accordance with at least one embodiment.

FIG. 2 shows an illustrative example of an environment 200 in which a representative assignment system 104 performs an onboarding process for a member 118 and assigns a representative 106 to the member 118 based on member and representative attributes in accordance with at least one embodiment. In the environment 200, in response to a request from a member 118 to initiate an onboarding process to create an account with the task facilitation service, the representative assignment system 104 of the task facilitation service may transmit one or more onboarding prompts to the member 118 to gather information about the member 118 that may be used to create a member profile and to identify possible tasks that may be presented to the member 118 based on the member profile. For instance, as illustrated in FIG. 2, the member 118 may submit its request to a member onboarding sub-system 202 of the representative assignment system 104. The member on-boarding sub-system 202 may be implemented using a computer system or as an application or other executable code implemented on a computer system of the representative assignment system 104.

In an embodiment, the member onboarding sub-system 202 of the representative assignment system 104 selects one or more questions that can be provided to the member 118 to garner initial information about the member 118 that can be used to generate a member profile for the member 118. For instance, the member onboarding sub-system 202 may initially prompt the member 118 to provide basic demographic information about the member 118. As an illustrative example, the member onboarding sub-system 202 may prompt the member 118 to provide its physical address, age, information regarding other members of the household (e.g., spouse, children, other dependents, etc.), information regarding any interests or hobbies, languages spoken in the household, and the like. Further, the member onboarding sub-system 202 may prompt the member 118 to indicate a comfort level with regard to delegation of particular categories of tasks (e.g., cleaning tasks, repair tasks, maintenance tasks, etc.). In some instances, the member onboarding sub-system 202 may prompt the member 118 to indicate what initial tasks the member 118 would be interested in delegating to others in order to remove their cognitive load.

The member onboarding sub-system 202 may provide responses to these initial prompts to a member modeling sub-system 204 to begin the process of generating a member profile for the member 118. The member modeling sub-system 204 may be implemented using a computer system or as an application or other executable code implemented on a computer system of the representative assignment system 104. In an embodiment, the member modeling sub-system 204 may implement a machine learning algorithm or artificial intelligence trained to identify additional prompts that may be submitted to the member 118 to obtain additional information usable to generate a member profile of the member 118. Further, the machine learning algorithm or artificial intelligence may be configured to use the responses provided by the member 118 in response to the various prompts submitted to the member 118, as well as other member data from a user datastore 108, to generate a member profile of the member 118 that can be used to identify a representative that may be best suited to interact with the member 118 and to execute various tasks for the benefit of the member 118 according to the member's preferences and behavior.

As an illustrative example, if a member 118 provides, in response to initial prompts from the member onboarding sub-system 202, basic information about the member 118, the member modeling sub-system 204 may process the provided information using a classification or clustering algorithm to identify similarly situated members based on one or more vectors (e.g., geographic location, demographic information, likelihood to delegate tasks to others, family composition, home composition, etc.). In some instances, a dataset of input member characteristics corresponding to responses to prompts provided by the member onboarding sub-system 292 provided by sample members (e.g., testers, etc.) may be analyzed using a clustering algorithm to identify different types of members that may interact with the task facilitation service. Further, as actual members complete the onboarding process, the member modeling sub-system 204 may retrain the clustering algorithm and/or adjust the various clusters corresponding to different member types to predict a member type more accurately for an onboarding member, such as member 118.

In an embodiment, based on an initial classification of a member 118 based on the initial responses provided by the member 118 during the onboarding process, the member modeling sub-system 204 may identify additional questions or prompts that may be provided to the member 118 to obtain additional information usable to better classify the member 118 as belong to a particular member type or classification. As an illustrative example, if the member modeling sub-system 204 determines that the member 118 may belong to a particular class of members that share similar basic characteristics with the member 118, the member modeling sub-system 204 may evaluate member profiles corresponding to the members in the particular class of members to identify additional questions or prompts that may be used to determine whether the member 118 shares more in common with these members. For example, if a significant number of members in the particular class have a particular type of vehicle for which tasks are performed, the member modeling sub-system 204 may determine that a question related to the member's vehicle may be highly relevant in identifying possible tasks for the member 118. As another illustrative example, if members in the particular class are known to prefer handling their own landscaping, the member modeling sub-system 204 may determine that a question related to the member's landscaping preferences may be highly relevant in determining whether to recommend delegation of landscaping tasks to others to the member 118 and the frequency in which such recommendations may be provided. This tailored approach to member onboarding may reduce the burden on the member 118 to engage in an onerous process to respond to myriad questions that may include irrelevant or unnecessary questions.

Based on the responses provided by the member 118 to the member onboarding sub-system 202, the member modeling sub-system 204 may generate a member profile or model for the member 118 that may be used to identify and recommend tasks and proposals to the member 118 over time. The member profile or model may define a set of attributes of the member 118 that may be used by a representative to determine how best to approach the member 118 in conversation, in recommending tasks and proposals to the member 118, and in performance of the tasks for the benefit of the member 118. These attributes may include a measure of member behavior or preference in delegating certain categories of tasks to others or in performing certain categories of tasks itself. For instance, a member attribute, as determined by the member modeling sub-system 204, may provide a score or other metric corresponding to the probability of the member 118 delegating different categories of tasks to others to perform. As another example, a member attribute may provide an indication of a member's preference to be presented with proposals for completion of a task (if being delegated) or to simply allow another to decide for the member 118. Other member attributes may indicate whether the member 118 is concerned with budgets, with brand recognition, with reviews (e.g., restaurant reviews, product reviews, etc.), with punctuality, with speed of response, and the like. Member attributes may further include basic information about the member 118 as provided during the onboarding process described above.

In an embodiment, the member modeling sub-system 204 allows the member 118 to access the member profile in order to provide additional information that may be used to supplement the member profile and/or to modify any previously added information. For example, through an application or web portal provided by the task facilitation service, the member 118 may be provided with a link or other interactive element that may be used by the member 118 to access their member profile. Within the member profile, the member 118 may add, remove, or edit any information within the member profile. As noted above, the member profile may be divided into various sections corresponding to different member characteristics, such as personal demographics, family composition, home composition, payment information, and the like. The member modeling sub-system 204 may automatically populate elements of these various sections based on the member's previously provided responses to the prompts provided by the member modeling sub-system 204 during the onboarding process, as well as any responses provided by the member 118 to surveys or questionnaires provided to the member 118 during the onboarding process. Each section of the member profile may further include additional questions or prompts that the member 118 may use to provide additional information that may be used to expand the member profile.

In some instances, the member 118 may designate one or more sections or sub-sections of the member profile as being private, such that these one or more sections or sub-sections are not visible to a representative or any other entity other than the member 118. For instance, the member 118 may indicate that payment information associated with one or more payment methods is to be obscured such that a representative assigned to the member 118 is unable to view the payment information. However, the payment information may be utilized by the task facilitation service for payment processing (e.g., for payment of third-party services, etc.) without the payment information being exposed to the representative.

As noted above, certain information within the member profile can be obscured from the member 118. For instance, as the relationship between member 118 and the assigned representative develops, the assigned representative may add personal notes about the member 118. These personal notes may not be relevant to the member 118 and, thus, may be obscured from the member 118. Thus, when the member 118 accesses the member profile, any sections or sub-sections designated as being accessible only by the representative may be automatically hidden from the member 118.

In an embodiment, the member modeling sub-system 204 provides the identified member attributes to a member-representative pairing sub-system 206 to identify a representative that may be assigned to the member 118. The member-representative pairing sub-system 206 may be implemented using a computer system or as an application or other executable code implemented on a computer system of the representative assignment system 104. The member-representative pairing sub-system 206 may use the provided member attributes to select a representative from a set of representatives 106 that may be assigned to the member 118 to assist the member 118 in identifying tasks, performing tasks for the benefit of the member 118, and to otherwise reduce the cognitive load on the member 118 in their daily life.

In an embodiment, the member-representative pairing sub-system 206 implements a machine learning algorithm or artificial intelligence that utilizes the provided member attributes as input to identify a representative or set of representatives that may be assigned to the member 118 that may provide a high likelihood of a positive relationship between the member 118 and an identified representative. The machine learning algorithm or artificial intelligence may be trained using unsupervised training techniques. For instance, a dataset of input member attributes and representative attributes may be analyzed using a clustering algorithm to identify correlations between different types of members and representatives. Conversely, the dataset of input member attributes and representative attributes may also be analyzed using a clustering algorithm to identify the types of members and types of representatives that are not well-suited for each other. Example clustering algorithms that may be trained using sample member attributes and representative attributes (e.g., historical data, hypothetical data, etc.) to identify potential pairings may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning algorithm generated using the member attributes and data from a representative datastore 208 as input, the member-representative pairing sub-system 206 may identify one or more representatives from a group of representatives 106 that may be assigned to the member 118.

The representative datastore 208 may include an entry for each representative of the group of representatives 106 associated with the task facilitation service. An entry corresponding to a representative may specify various characteristics of the representative. These characteristics may be similar to those collected by the member onboarding sub-system 202 during the onboarding of a member 118. For example, the characteristics for a representative may include the representative's physical address, age, information regarding other members of the household (e.g., spouse, children, other dependents, etc.), information regarding any interests or hobbies, languages spoken in the household, and the like. Further, an entry in the representative datastore 208 corresponding to a particular representative may indicate the representative's performance with regard to other members of the task facilitation service. As described in greater detail herein, the task facilitation service may monitor representative performance and solicit member feedback with regard to the member's relationship with an assigned representative. Based on the provided feedback and evaluation of representative performance, the task facilitation service may determine the representative's performance with regard to their relationship and assistance with the member. One or more metrics associated with the representative's performance may be added to the representative's entry in the representative datastore 208. For instance, an entry may specify a performance score for each member-representative pairing for the particular representative associated with the entry. As an illustrative example, if the representative has had a positive relationship with a particular member and has served to reduce the cognitive load of the member, the pairing may be assigned a high performance score. Alternatively, if the representative has had a neutral or negative relationship with a particular member, the pairing may be assigned a lower score. These performance scores, as well as the representative characteristics, from the representative datastore 208 may be used by the member-representative pairing sub-system 206 as input with the member attributes to identify one or more representatives that may be assigned to the member 118.

Once the member-representative pairing sub-system 206 has identified a set of representatives that may be assigned to the member 118, the member-representative pairing sub-system 206 may select a representative from the one or more representatives for assignment to the member 118. For instance, the member-representative pairing sub-system 206 may rank the set of representatives according to a probability or other metric corresponding to the likely compatibility between the member 118 and each representative of the set of representatives. Based on the ranking of the set of representatives, the member-representative pairing sub-system 206 may select the highest ranked representative from the set of representatives and determine whether the representative is available for assignment. For instance, from the representative datastore 208, the member-representative pairing sub-system 206 may determine whether the representative is currently assigned to a threshold number of other members or is otherwise unavailable for assignment (e.g., on leave, etc.). If the selected representative is unavailable, the member-representative pairing sub-system 206 may select an alternative representative from the identified set of representatives and identify the alternative representative's availability. Once a representative has been selected, the member-representative pairing sub-system 206 may assign the representative to the member 118 and update the entry corresponding to the representative in the representative datastore 208 to indicate the assignment.

In an embodiment, rather than using a machine learning algorithm or artificial intelligence to identify an initial set of representatives from which a representative may be selected for assignment to the member 118, the member-representative pairing sub-system 206 can select an available representative from the group of representatives 106. For instance, the member-representative pairing sub-system 206 may identify a representative from the group of representatives 106 that is available for assignment to the member 118 and assign the representative to the member 118. Similar to the process described above, once the member-representative pairing sub-system 206 has selected a representative, the member-representative pairing sub-system 206 may update an entry corresponding to the selected representative in the representative datastore 208 to record the assignment.

In some instances, rather than using a machine learning algorithm or artificial intelligence to identify an initial set of representatives from which a representative may be selected, the member-representative pairing sub-system 206 can automatically select the first available representative from the group of representatives 106. In some instances, the member-representative pairing sub-system 206 may narrow the group of representatives 106 automatically based on one or more criteria corresponding to the member's identifying information. For example, if the member 118 is located in Seattle, Washington, the member-representative pairing sub-system 206 may automatically narrow the group of representatives 106 such that the pool of representatives that may be assigned to the member 118 includes representatives that are located within geographical proximity of Seattle, Washington (e.g., within 100 miles of Seattle, within 200 miles of Seattle, etc.). As another example, if the member 118 has children, the member-representative pairing sub-system 206 may narrow the group of representatives 106 such that the pool of representatives includes representatives that also have children. From the identified pool, the member-representative pairing sub-system 206 may automatically select the first available representative for assignment to the member 118.

In an embodiment, during the onboarding process, the member 118 can provide information related to one or more tasks that the member 118 wishes to delegate to a representative to the member onboarding sub-system 202. The member onboarding sub-system 202 can provide this information to the member modeling sub-system 204, which may use the information to identify, in addition to the aforementioned member attributes, parameters related to the tasks that the member 118 wishes to delegate to a representative for performance of the tasks. For instance, the parameters related to these tasks may specify the nature of these tasks (e.g., gutter cleaning, installation of carbon monoxide detectors, party planning, etc.), a level of urgency for completion of these tasks (e.g., timing requirements, deadlines, date corresponding to upcoming events, etc.), any member preferences for completion of these tasks, and the like. These parameters, in addition to the member attributes identified by the member modeling sub-system 204, may be used as input to the machine learning algorithm or artificial intelligence to identify an initial set of representatives from which a representative may be selected for assignment to the member 118. Alternatively, the member-representative pairing sub-system 206 may query the representative datastore 208 to identify one or more representatives that may be associated with these particular task parameters (e.g., representatives skilled to handle such tasks, representatives having previously performed similar tasks with positive member feedback, etc.). The member-representative pairing sub-system 206 may select an available representative from the identified one or more representatives for assignment to the member 118.

Once a representative has been assigned to the member 118, the member-representative pairing sub-system 206 may provide the representative with contact information of the member 118 (e.g., phone number, e-mail address, etc.) and instruct the representative to initiate contact with the member 118 to complete the onboarding process. For instance, through an application or web portal provided to the representative by the task facilitation service, the representative may receive information corresponding to the member 118 (e.g., name, demographic information, family information, home information, etc.) and an instruction to initiate a communications session with the member 118. This may allow the selected representative to initiate the relationship with the member 118 and to begin identifying tasks that may be delegated to the representative for performance on behalf of the member 118. In some instances, the member-representative pairing sub-system 206 can establish a communications session between the representative and the member 118. For instance, the member-representative pairing sub-system 206 may initiate a chat session between the representative and the member 118, whereby the member 118 may communicate with the selected representative via an application or web portal provided by the task facilitation service. Further, the representative may communicate with the member 118 over the chat session using an application or web portal provided by the task facilitation service.

In an embodiment, the representative assignment system 104 can further monitor the relationship between the member 118 and an assigned representative to determine whether the member 118 should be reassigned to another representative of the set of representatives 106. For instance, the member 118 may be prompted (periodically and/or in response to a triggering event) by the member-representative pairing sub-system 206 to provide feedback with regard to its relationship with the assigned representative. As an illustrative example, when a representative has completed a particular task for a member 118, the member-representative pairing sub-system 206 may prompt the member 118 to provide feedback with regard to the representative's performance as it related to the completed task. As another example, the member-representative pairing sub-system 206 may prompt the member 118 at particular time intervals (e.g., monthly, bi-monthly, etc.) to provide feedback with regard to the member's relationship with the assigned representative. In some instances, the member 118 may provide feedback with regard to the member's relationship with the assigned representative at any time without being prompted by the member-representative pairing sub-system 206. For instance, via the application provided by the task facilitation service, the member 118 may manually generate a feedback form that may be provided to the member-representative pairing sub-system 206 for evaluation.

In an embodiment, the member-representative pairing sub-system 206 utilizes the feedback provided by the member 118 to determine whether to assign a new representative to the member 118. For instance, the member-representative pairing sub-system 206 may process the obtained feedback using a machine learning algorithm or artificial intelligence to determine a relationship score for the relationship between the member 118 and the assigned representative. The machine learning algorithm or artificial intelligence may be trained using supervised training techniques. For instance, a dataset of input feedback, known member and representative attributes, and resulting relationship scores can be selected for training of the machine learning model. The machine learning model may be evaluated to determine, based on the sample inputs supplied to the machine learning model, whether the machine learning model is producing accurate relationship scores. Based on this evaluation, the machine learning model may be modified to increase the likelihood of the machine learning model generating the desired results. The machine learning model may further be dynamically trained by soliciting feedback from representatives and administrators of the task facilitation service with regard to the evaluations and relationship scores provided by the machine learning algorithm or artificial intelligence for representative reassignment. For instance, if the member-representative pairing sub-system 206 determines, based on the relationship score for a particular member-representative pairing (e.g., the relationship score is below a threshold value, etc.), that the member is to be assigned a new representative, the member-representative pairing sub-system 206 may select a new representative that may be assigned to the member. Further, the member-representative pairing sub-system 206 may obtain new feedback from the member corresponding to the new relationship. The machine learning algorithm or artificial intelligence may use this feedback to determine a new relationship score for this pairing and to determine whether this new relationship score represents an improvement over the previous relationship score that led to representative reassignment. This determination may be used to further train the machine learning algorithm or artificial intelligence to provide more accurate relationship scores that may be used to determine whether to assign a new representative to the member.

In an embodiment, the representative assignment system 104 can process messages exchanged between the member 118 and the assigned representative in real-time to better understand the relationship between the member 118 and the assigned representative and to better identify techniques that may be implemented by the assigned representative to improve its relationship with the member 118. For instance, the representative assignment system 104 may process messages exchanged between the member 118 and the assigned representative using a machine learning algorithm or artificial intelligence to determine various attributes or idiosyncrasies of the member 118. As an illustrative example, if the member 118 indicates to the representative that it prefers to personally handle any automotive tasks (e.g., scheduling maintenance appointments, purchasing oil and filters, etc.), the machine learning algorithm or artificial intelligence may update the member profile to indicate that the representative 106 should not recommend delegation of automotive tasks to the representative 106 and/or third-party services. In some instances, based on the messages exchanged between the member 118 and the assigned representative, the machine learning algorithm or artificial intelligence may generate a behavior profile for the member 118, which may indicate any personality attributes of the member 118 as well as any idiosyncrasies or quirks of the member 118 that may be useful to the representative 106 in approaching the member 118 in conversation. In some instances, the machine learning algorithm or artificial intelligence may generate one or more recommendations based on the member's behavior profile for approaching and communicating with the member 118.

In an embodiment, the representative assignment system 104 can further process the messages exchanged between the member 118 and the assigned representative in real-time to obtain any additional information that may be used to supplement the member profile. For example, if the member 118 expresses, during a conversation with the representative over the communications channel, that a new family member has moved into the member's home, the representative assignment system 104 may automatically, and in real-time, process this message to determine that the member profile can be updated to add information corresponding to this new family member. Accordingly, the representative assignment system 104 may use the information provided by the member 118 to automatically update the appropriate section of the member profile (e.g., a section related to the member's family).

In some instances, the representative assignment system 104, based on the information added to the member profile, may determine whether additional information may be required from the member 118. Returning to the example above associated with the introduction of a new family member to the member's home, the representative assignment system 104 may determine whether to recommend questions or prompts that may be submitted to the member 118 to obtain additional information about the new family member. For example, if the member 118 has not indicated a name and other identifying information corresponding to this new family member, the representative assignment system 104 may recommend questions or prompts that may be used to obtain the new family member's name and other identifying information (e.g., "What is the new family member's name?", "How old is the new family member?", "Does the new family member have any dietary restrictions?", etc.). These recommendations may be provided to the representative, which may communicate these questions or prompts to the member 118 over the communications session.

Figure 3:
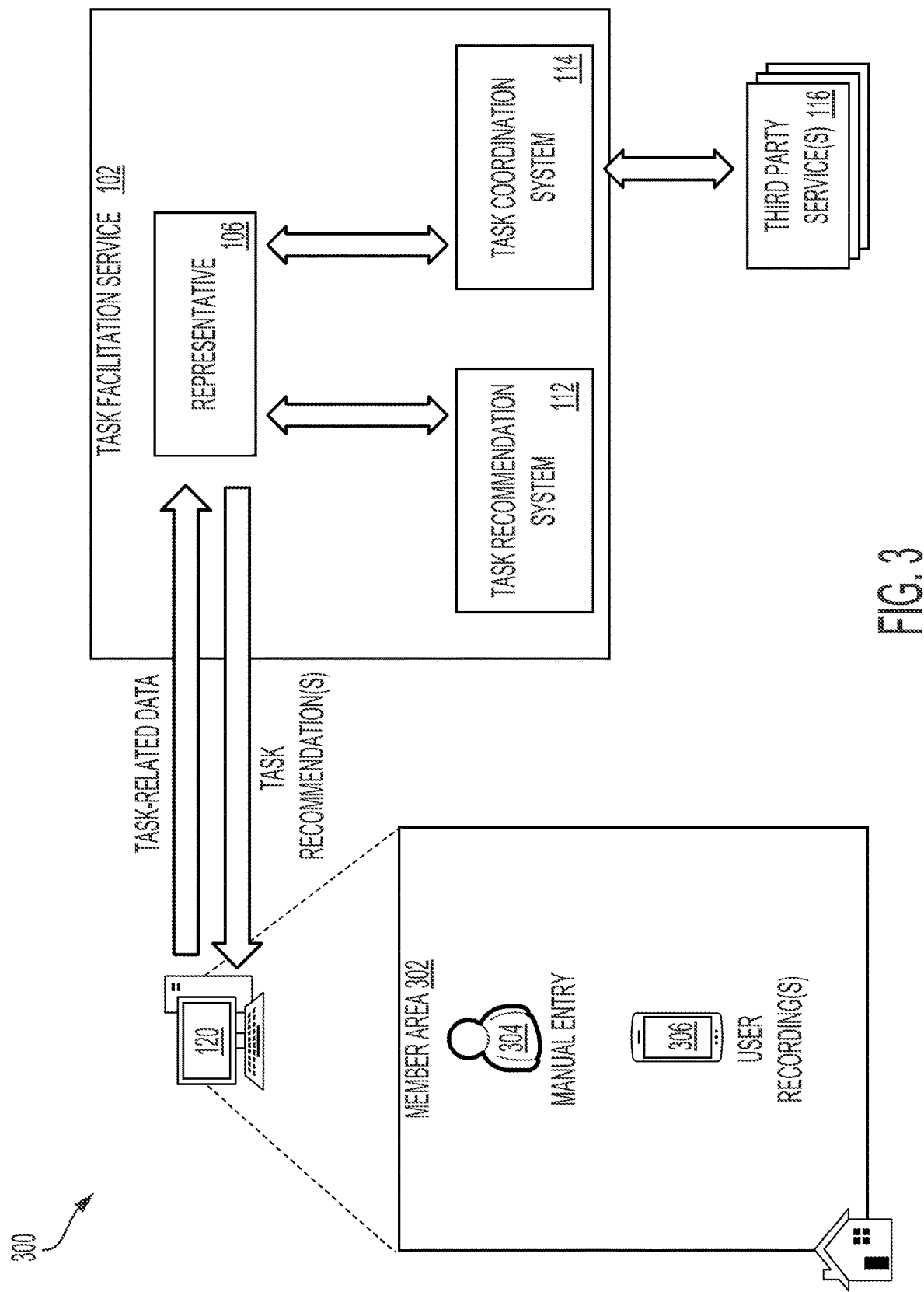
FIG. 3 shows an illustrative example of an environment in which task-related data is collected and aggregated from a member area to identify one or more tasks that can be recommended to the member for delegation and performance by a representative or third-party services in accordance with at least one embodiment.

FIG. 3 shows an illustrative example of an environment 300 in which task-related data is collected and aggregated from a member area 302 to identify one or more tasks that can be recommended to the member for performance by a representative 106 and/or third-party services 116 in accordance with at least one embodiment. In the environment 300, a member, via a computing device 120 (e.g., laptop computer, smartphone, etc.), may transmit task-related data to the representative 106 assigned to the member to identify one or more tasks that may be performed for the benefit of the member. For example, in an embodiment, the member can manually enter one or more tasks that the member would like to delegate to the representative 106 for performance. The task facilitation service 102 may provide, to the member and via an application or web portal provided by the task facilitation service 102, an option for manual entry 304 of a task that may be delegated to the representative 106 or that may otherwise be added to the member's list of tasks.

If the member selects an option for manual entry 304 of a task, the task facilitation service 102 may provide, via an interface of the application or web portal, a task template through which the member may enter various details related to the task. The task template may include various fields through which the member may provide a name for the task, a description of the task (e.g., "I need to have my gutters cleaned before the upcoming storm," "I'd like to have painters touch up my powder room," etc.), a timeframe for performance of the task (e.g., a specific deadline date, a date range, a level of urgency, etc.), a budget for performance of the task (e.g., no budget limitation, a specific maximum amount, etc.), and the like.

In some instances, if the member selects an option for manual entry 304 of a task, the task facilitation service 102 may provide the member with different task templates that may be used to generate a new task. As noted above, the task facilitation service may maintain a resource library that serves as a repository for different task templates corresponding to different task categories (e.g., vehicle maintenance tasks, home maintenance tasks, family-related event tasks, care giving tasks, experience-related tasks, etc.). A task template may include a plurality of task definition fields that may be used to define a task that may be performed for the benefit of the member. For example, the task definition fields corresponding to a vehicle maintenance task may be used to define the make and model of the member's vehicle, the age of the vehicle, information corresponding to the last time the vehicle was maintained, any reported accidents associated with the vehicle, a description of any issues associated with the vehicle, and the like. Thus, each task template maintained in the resource library may include fields that are specific to the task category associated with the task template.

Through the resource library, the member may evaluate each of the available task templates to select a particular task template that may be closely associated with the new task the member wishes to create. Once the member has selected a particular task template, the member may populate one or more task definition fields that may be used to define a task that may be performed for the benefit of the member. These fields may be specific to the task category associated with the task template. In some instances, based on the selected task template, the task facilitation service 102 may automatically populate one or more task definition fields based on information specified within the member profile, as described above.

In an embodiment, the task template provided to the member may be tailored specifically according to the characteristics of the member identified by the task facilitation service 102. As noted above, the task facilitation service 102, during a member onboarding process, may generate a member profile or model for the member that may be used to identify and recommend tasks and proposals to the member over time. The member profile or model may define a set of attributes of the member that may be used by a representative 106 to determine how best to approach the member in conversation, in recommending tasks and proposals to the member, and in performance of the tasks for the benefit of the member. These attributes may include a measure of member behavior or preference in delegating certain categories of tasks to others or in performing certain categories of tasks itself. These member attributes may indicate whether the member is concerned with budgets, with brand recognition, with reviews (e.g., restaurant reviews, product reviews, etc.), with punctuality, with speed of response, and the like. Based on these member attributes, the task facilitation service 102 may omit particular fields from the task template. For example, if a member attribute specifies that the member is not concerned with budgets for completion of tasks, the task facilitation service 102 may omit a field from the task template corresponding to the member's budget for the task. As another illustrative example, if the task facilitation service 102 determines that the member prefers either high-end or top-rated brands for performance of its tasks, the task facilitation service 102 may omit one or more fields corresponding to selection or identification of brands for performance of the task, as the task facilitation service 102 may utilize a resource library to identify high-end or top-rated brands for the performance of the task.

If the member submits, via the computing device 120 or through an interface provided by the task facilitation service 102, a completed task template corresponding to a task that is to be performed for the benefit to the member, the representative 106 assigned to the member may obtain the completed task template and initiate evaluation of the task to determine how best to perform the task for the benefit of the member. For instance, the representative 106 may evaluate the completed task template and generate a new task for the member corresponding to the task-related details provided by the member in the completed task template. Further, based on the representative's knowledge of the member (e.g., from interaction with the member, from the member profile, etc.), the representative 106 may determine whether to prompt the member for additional information that may be used to determine how best to perform the task for the benefit of the member. For instance, if the member has indicated that they wish to have their gutters cleaned but has not indicated when the gutters should be cleaned via the completed task template, the representative 106 may communicate with the member via an active chat session associated with the newly created task to inquire as to the timeframe for cleaning of the member's gutters. As another example, if the member has submitted a task without a particular budget for performance of the task, and the representative 106 knows (e.g., based on the member profile, personal knowledge of the member, etc.) that the member is budget-conscious, the representative 106 may communicate with the member to determine what the budget should be for performance of the task. As noted above, any information obtained in response to these communications may be used to supplement the member profile such that, for future tasks, this newly obtained information may be automatically retrieved from the member profile without requiring additional prompts to the member.

In an embodiment, a member can submit a request to the representative 106 to generate a project for which one or more tasks may be determined by the representative 106 and/or by the task recommendation system 112 or that otherwise may include one or more tasks that are to be completed for the project. For example, via the chat session established between the member and the assigned representative 106, the member may indicate that it would like to initiate a project. As an illustrative example, a member may transmit a message to the representative 106 that the member would like help in planning a move to Denver in August. In response to this message, the representative 106 may identify one or more tasks that may be involved with this project (e.g., move to Denver) and generate these one or more tasks for presentation to the member. For instance, the representative 106 may generate tasks including, but not limited to, defining a moving budget, finding a moving company, purging any unwanted belongings, coordinating utilities at the present location and at the new location, and the like. These tasks may be presented to the member via an interface specific to the project to allow the member to evaluate each of these tasks associated with the project and coordinate with the representative 106 to determine how each of these tasks may be performed (e.g., the member performs certain tasks itself, the member delegates certain tasks to the representative, the member defines parameters for performance of the tasks, etc.).

As noted above, if the member requests creation of a project that includes one or more tasks that are to be performed as part of the project, an interface specific to the project may be created. The project interface may include links or other graphical user interface (GUI) elements corresponding to each of the tasks associated with the project. Selection of a particular link or other GUI element corresponding to a particular task associated with the project may cause the task facilitation service 102 to present an interface specific to the particular task. Through this interface, the member may communicate with the representative 106 to exchange messages related to the particular task, to review proposals related to the particular task, to monitor performance of the particular task, and the like.

In an embodiment, messages exchanged between the member and the representative 106 may be processed by the task recommendation system 112 to identify potential projects and/or tasks that may be recommended to the representative 106 for presentation to the member. As noted above, the task recommendation system 112 may utilize NLP or other artificial intelligence to evaluate exchanged messages or other communications from the member to identify possible tasks that may be recommended to the member. For instance, the task recommendation system 112 may process any incoming messages from the member using NLP or other artificial intelligence to detect a new project, new task, or other issue that the member would like to have resolved. In some instances, the task recommendation system 112 may utilize historical task data and corresponding messages from a task datastore to train the NLP or other artificial intelligence to identify possible tasks. If the task recommendation system 112 identifies one or more possible projects and/or tasks that may be recommended to the member, the task recommendation system 112 may present these possible tasks to the representative 106, which may select projects and/or tasks that can be shared with the member over the chat session.

In an embodiment, if the task recommendation system 112 identifies a project that may be proposed to the member based on messages exchanged between the member and the representative 106, the task recommendation system 112 can utilize a resource library maintained by the task facilitation service 102 to identify one or more tasks associated with the project that may be recommended to the representative 106. For example, if the task recommendation system 112 identifies a project related to the member's indication that it is preparing to move to Denver, the task recommendation system 112 may query the resource library to identify any tasks associated with a move to a new location. In some instances, the query to the resource library may include member attributes from the member profile. This may allow the task recommendation system 112 to identify any tasks that may have been performed or otherwise proposed to similarly situated members (e.g., members in similar geographic locations, members having similar attributes to that of the present member, etc.) for similar projects.

In an embodiment, the task recommendation system 112 uses a machine learning algorithm or other artificial intelligence to identify the tasks that may be recommended to the representative 106 for an identified project. For example, the task recommendation system 112 may identify, from the aforementioned resource library, any tasks that may be associated with the identified project. The task recommendation system 112 may process the identified tasks and the member profile using the machine learning algorithm or other artificial intelligence to determine which of the identified tasks may be recommended to the representative 106 for presentation to the member. Further, the task recommendation system 112 may provide, to the representative 106, any tasks that may need be performed for the benefit of the member with an option to defer to the representative 106 for completion of the task. For example, if the task recommendation system 112 determines that, based on the member profile, that the member is likely to fully delegate a task to the representative 106 without need to review or provide any other input, the task recommendation system 112 may provide the task to the representative 106 with a recommendation to present an option to the member to defer performance of the task to the representative 106 (such as through a "Run With It" button).

In some instances, the task recommendation system 112 may provide a listing of the set of tasks that may be recommended to the member to the representative 106 for a final determination as to which tasks may be presented to the member. As noted above, the task recommendation system 112 can rank the listing of the set of tasks based on a likelihood of the member selecting the task for delegation to the representative for performance and coordination with third-party services 116 or other services/entities affiliated with the task facilitation service 102. Alternatively, the task recommendation system 112 may rank the listing of the set of tasks based on the level of urgency for completion of each task. For example, if the task recommendation system 112 determines that a task corresponding to the hiring of a moving company is of greater urgency that a task corresponding to the coordination of utilities, the task recommendation system 112 may rank the former task higher than the latter task.

In an embodiment, if the task recommendation system 112 identifies a project that may be created based on the messages exchanged between the member and the representative 106, and the task recommendation system 112 identifies one or more tasks associated with the identified project, the task recommendation system 112, via the representative 106, may provide the member with a project definition and the tasks associated with the identified project to obtain the member's approval to proceed with the project. For instance, via an application or web portal provided by the task facilitation service 102 accessed using a computing device 120, the member may review the proposed project and the associated tasks to determine whether to proceed with the proposed project. The member may communicate with the representative 106 through a project-specific communications session to further define the project and/or any tasks associated with the project, including defining the scope of the project and of any of the tasks proposed for completion of the project. As an illustrative example, if the representative 106 proposes a project corresponding to the member's upcoming move to Denver and any tasks associated with this proposed project, the member may communicate with the representative 106 to discuss the proposed project and the associated tasks (e.g., inquire about timelines, inquire about budgets, etc.). Based on the member's communications with the representative 106, the representative 106 and/or task recommendation system 112 may identify any questions that may be provided to the member to further define the scope of the project and any associated tasks. For example, the representative 106 may prompt the member to indicate the amount of square footage in their existing home, which may be useful in determining the scope of moving services that may be required for the project corresponding to the upcoming move to Denver. Information obtained through member responses to these prompts may be used to supplement the member profile, as described above.

In an embodiment, once the member has approved a particular project that is to be executed for the benefit of the member, the task recommendation system 112 assigns a priority to the project and the associated tasks based on input from the member (e.g., deadlines, desired priority, etc.). For example, if the member has indicated that the project associated with an upcoming move to Denver is more pressing than projects related to vehicle maintenance, the task recommendation system 112 may prioritize the project associated with the upcoming move to Denver over other projects related to vehicle maintenance. This may cause the application or the web portal accessed by the member via the computing device 120 to more prominently display the project related to the upcoming move to Denver over these other projects. In some instances, the priority assigned to a particular project may further be assigned to the tasks associated with the project. For example, the task recommendation system 112 may use the priority of each of the projects created for the member as another factor in ranking the various tasks identified by the representative 106 and/or task recommendation system 112.

Tasks associated with a project may be added to an active queue that may be used by the task recommendation system 112 to determine which tasks a representative 106 may work on for the benefit of the member. For instance, a representative 106 may be presented with a limited set of tasks that the representative 106 based on the prioritization or ranking of tasks performed by the task recommendation system 112. The selection of a limited set of tasks may limit the number of tasks that may be worked on by the representative 106 at any given time, which may reduce the risk to the representative 106 of being overburdened with working on a member's task list.

In an embodiment, the task facilitation service 102 can present the member, via the application implemented on the member's computing device 120 or accessed via a web portal provided by the task facilitation service 102, a task list corresponding to the member's current and upcoming tasks. The task facilitation service 102 may provide, via the task list, the status of each task (e.g., created, in-progress, recurring, completed, etc.). In some instances, the task facilitation service 102 may allow the member to filter tasks as needed such that the member can customize and determine which tasks are to be presented to the member via the application or web portal.

The task facilitation service 102, in addition to presenting the task list corresponding to the member's current and upcoming tasks, may signal which of these tasks are assigned to the member or to the representative 106. For instance, the task facilitation service 102 may display an assignment tag to each task presented to the member via the application or web portal. The assignment tag may explicitly indicate whether a corresponding task is assigned to the member or to the representative 106. Additionally, or alternatively, a task may be presented to the member via the application or web portal using color coding, wherein the color used for the task may further indicate whether the task is assigned to the member or to the representative 106. As an illustrative example, if a task is assigned to the representative 106, the task may be presented with a "REPRESENTATIVE" attribute tag and within a task bubble using a shade of orange to further indicate that the task is assigned to the representative 106. Alternatively, if a task is assigned to the member, the task may be presented with a "MEMBER" attribute tag and within a task bubble using a shade of green to further indicate that the task is assigned to the member. It should be noted that while attribute tags and color indicators are used throughout the present disclosure for the purpose of illustration, other assignment indicators may be utilized to differentiate tasks assigned to the member and tasks assigned to the representative 106.

In an embodiment, the task facilitation service 102 can provide members, via the application or web portal, with options to obtain more information about specific tasks from the task list. For instance, each task presented via the task list may include an option to obtain more information related to the task. In an embodiment, if a member selects an option to obtain more information for a particular task, the task facilitation service 102 can evaluate the member profile to determine how much information is to be provided to the member without increasing the likelihood of cognitive overload for the member. For instance, if the member has a propensity to delegate tasks to the representative 106 and generally delegates all aspects of a task to the representative 106, the task facilitation service 102 may provide basic information associated with the task (e.g., short task description, estimated completion time for the task, etc.). However, if the member is more detail oriented and is heavily involved in the completion of tasks, the task facilitation service 102 may provide more information associated with the task (e.g., detailed task description, steps being performed to complete the task, any budget information for the task, etc.). In an embodiment, the task facilitation service 102 can utilize a machine learning algorithm or artificial intelligence to determine how much information related to a task should be presented to the member 102. For instance, the task facilitation service 102 may use the member profile and data corresponding to the task as input to the machine learning algorithm or artificial intelligence. The resulting output may provide a recommendation as to what information regarding the task should be presented to the member. In some instances, the recommendation can be provided to the representative 106, which may evaluate the recommendation and determine what information may be presented to the member for the selected task. When information for a task is provided to the member, the task facilitation service 102 may monitor member interaction with the representative 106 to identify the member's response to the presentation of the information. The response may be used to further train the machine learning algorithm or artificial intelligence to provide better recommendations with regard to task information that may be presented to members of the task facilitation service 102.

In an embodiment, a member, via a computing device 120, can submit one or more user recordings 306 that may be used to identify tasks that can be performed for the benefit of the member. For instance, a member may upload, to the task facilitation service 102, one or more digital images of the member area 302 that may be indicative of issues within the member area 302 for which tasks may be created. As an illustrative example, the member may capture an image of a broken baseboard that needs repair. As another illustrative example, the member may capture an image of a clogged gutter. The representative 106 may obtain these digital images and manually identify one or more tasks that may be performed to address the issues represented in the uploaded digital images. For instance, if the representative 106 receives a digital image that illustrates a broken baseboard, the representative 106 may generate a new task corresponding to the repair of the broken baseboard. Similarly, if the representative 106 receives a digital image that illustrates a clogged gutter, the representative 106 may generate a task corresponding to the cleaning of the member's gutters.

User recordings 306 may further include audio and/or video recordings within the member area 302 corresponding to possible issues for which tasks may be generated. For instance, the member may utilize their smartphone or other recording device to generate an audio and/or video recording of different portions of the member area 302 to highlight issues that may be used to generate one or more tasks that may be performed to address the issues. As an illustrative example, during a chat session with the representative 106, a member may walk through the member area 302 with their smartphone and record a video highlighting issues that the member would like addressed by the task facilitation service 102. During this walkthrough of the member area 302, the member may indicate (e.g., by speaking into the smartphone, pointing at issues, etc.) what these issues are and possible instructions or other parameters for addressing these issues (e.g., timeframes, budgets, level of urgency, etc.). Using the example of the broken baseboard described above, the member may record a video highlighting the broken baseboard while indicating "I would like to have this baseboard fixed soon as we're getting ready to sell the house." This video, thus, may highlight an issue related to a broken baseboard and a level of urgency in having the baseboard repaired within a short timeframe due to the member selling their home.

The member, via the computing device 120, may provide the user recordings 306 to the representative 106, which may review the user recordings 306 to identify any tasks that may be recommended to the member to address any of the issues indicated by the member in the user recordings 306. For instance, the representative 106 may analyze the provided user recordings 306 and identify tasks that may be performed to address any issues identified by the member in the user recordings 306 and/or detected by the representative 106 based on its analysis of the user recordings 306. As an illustrative example, if the member provider a user recording 306 in which the member indicates that there is a broken baseboard that the member would like repaired, the representative 106 may additionally determine, based on the user recording 306, that the member's home may have a termite issue (e.g., presence of termites or termite damage in the broken baseboard). As such, the representative 106 may communicate with the member over the chat session to indicate the additional issue and recommend a task to address the additional issue.

In some instances, the representative 106 may prompt the member to generate one or more user recordings 306 that may be used to assist the representative 106 in defining one or more tasks that may be performed for the benefit of the member. For example, if the member indicates, via the chat session, that it is preparing to move to Denver, the representative 106 may request that the member generate one or more user recordings 306 related to the member area 302 (e.g., home, apartment, etc.) so that the representative 106 may identify tasks that may be associated with this project. For instance, using the user recordings 306 provided by the member, the representative 106 may determine the square footage of the member area 302, identify any special moving requirements for completion of the project (e.g., special moving instructions for fragile items, insurance, etc.), identify any repair or maintenance items that may need to be addressed for the project, and the like. In some instances, the representative 106 may use the user recordings 306 to identify one or more task parameters that may be used in defining a task to be performed for the benefit of the member. For instance, if the member has manually entered a new task related to repairing their broken baseboard, the representative 106 may use any user recordings 306 associated with the broken baseboard to identify the type of baseboard that is to be repaired, the scope of the repair, the timeframe for the repair, and the like.

In an embodiment, a representative 106 can generate one or more proposals for completion of any given task presented to the member via the application or web portal provided by the task facilitation service 102. A proposal may include one or more options presented to a member that may be created and/or collected by a representative 106 while researching a given task. In some instances, a representative 106 may be provided with one or more templates that may be used to generate these one or more proposals. For example, the task facilitation service 102 may maintain proposal templates for different task types, whereby a proposal template for a particular task type may include various data fields associated with the task type. As an illustrative example, for a task associated with planning a birthday party, a representative 106 may utilize a proposal template corresponding to event planning. The proposal template corresponding to event planning may include data fields corresponding to venue options, catering options, entertainment options, and the like.

In an embodiment, the data fields within a proposal template can be toggled on or off to provide a representative 106 with the ability to determine what information is presented to the member in a proposal. For example, for a task associated with renting a balloon jump house for a party, a corresponding proposal template may include data fields corresponding to the location/address of a rental business, the business hours and availability of the rental business, an estimated cost, ratings/reviews for the rental business, and the like. The representative 106, based on its knowledge of the member's preferences, may toggle on or off any of these data fields. For example, if the representative 106 has established a relationship with the member whereby the representative 106, with high confidence, knows that the member trusts the representative 106 in selecting reputable businesses for its tasks, the representative 106 may toggle off a data field corresponding to the ratings/reviews for corresponding businesses from the proposal template. Similarly, if the representative 106 knows that the member is not interested in the location/address of the rental business for the purpose of the proposal, the representative 106 may toggle off the data field corresponding to the location/address for corresponding businesses from the proposal template. While certain data fields may be toggled off within the proposal template, the representative 106 may complete these data fields to provide additional information that may be used by the task facilitation service 102 to supplement a resource library of proposals as described in greater detail herein.

In an embodiment, the task facilitation service 102 utilizes a machine learning algorithm or artificial intelligence to generate recommendations for the representative 106 regarding data fields that may be presented to the member in a proposal. For example, the task facilitation service 102 may use, as input to the machine learning algorithm or artificial intelligence, a member profile or model associated with the member, historical task data for the member (e.g., previously completed tasks, tasks for which proposals have been provided, etc.), and information corresponding to the task for which a proposal is being generated (e.g., a task type or category, etc.). The output of the machine learning algorithm or artificial intelligence may define which data fields of a proposal template should be toggled on or off. For example, if the task facilitation service 102 determines, based on an evaluation of the member profile or model, historical task data for the member, and the information corresponding to the task for which the proposal is being generated, that the member is likely not interested in viewing information related to the ratings/reviews for the business nor the location/address of the business, the task facilitation service 102 may automatically toggle off these data fields from the proposal template. The task facilitation service 102, in some instances, may retain the option to toggle on these data fields in order to provide the representative 106 with the ability to present these data fields to the member in a proposal. For example, if the task facilitation service 102 has automatically toggled off a data field corresponding to the estimated cost for a balloon jump house rental from a particular business, but the member has expressed an interest in the possible cost involved, the representative 106 may toggle on the data field corresponding to the estimated cost.

In some instances, when a proposal is presented to a member, the task facilitation service 102 may monitor member interaction with the representative 106 and with the proposal to obtain data that may be used to further train the machine learning algorithm or artificial intelligence. For example, if a representative 106 presents a proposal without any ratings/reviews for a particular business based on the recommendation generated by the machine learning algorithm or artificial intelligence, and the member indicates (e.g., through messages to the representative 106, through selection of an option in the proposal to view ratings/reviews for the particular business, etc.) that they are interested in ratings/reviews for the particular business, the task facilitation service may utilize these feedback to further train the machine learning algorithm or artificial intelligence to increase the likelihood of recommending presentation of ratings/reviews for businesses selected for similar tasks or task types.

In an embodiment, the task facilitation service 102 maintains, via the task coordination system 114, a resource library that may be used to automatically populate one or more data fields of a particular proposal template. The resource library may include entries corresponding to businesses and/or products previously used by representatives for proposals related to particular tasks or task types or that are otherwise associated with particular tasks or task types. For instance, when a representative 106 generates a proposal for a task related to repairing a roof near Lynnwood, Washington, the task coordination system 114 may obtain information associated with the roofer selected by the representative 106 for the task. The task coordination system 114 may generate an entry corresponding to the roofer in the resource library and associate this entry with "roof repair" and "Lynnwood, Washington." Thus, if another representative receives a task corresponding to repairing a roof for a member located near Lynnwood, Washington (e.g., Everett, Washington), the other representative may query the resource library for roofers near Lynnwood, Washington. The resource library may return, in response to the query, an entry corresponding to the roofer previously selected by the representative 106. If the other representative selects this roofer, the task coordination system 114 may automatically populate the data fields of the proposal template with the information available for the roofer from the resource library.

In an embodiment, the task facilitation service 102 can utilize a machine learning algorithm or artificial intelligence to automatically process the member profile associated with the member 118, the selected proposal template, and the resource library to dynamically identify any resources that may be relevant for preparation of the proposal. The machine learning algorithm or artificial intelligence may be trained using supervised training techniques. For instance, a dataset of sample member profiles, proposal templates and/or tasks, available resources (e.g., entries corresponding to third-party services, other services/entities, retailers, goods, etc.), and completed proposals can be selected for training of the machine learning model. The machine learning model may be evaluated to determine, based on the sample inputs supplied to the machine learning model, whether the machine learning model is identifying appropriate resources that may be used to automatically complete a proposal template for presentation of a proposal. Based on this evaluation, the machine learning model may be modified to increase the likelihood of the machine learning model generating the desired results. The machine learning model may further be dynamically trained by soliciting feedback from representatives and members of the task facilitation service with regard to the identification of resources from the resource library and to the proposals automatically generated by the task facilitation service 102 using these resources. For instance, if the task facilitation service 102 generates, based on the member profile associated with the member 118 and the selected resources from the resource library, a proposal that is not appealing to the member 118 (e.g., the proposal is not relevant to the task, the proposal corresponds to resources that are not available to the member 118, the proposal includes resources that the member 118 disapproves of, etc.), the task facilitation service 102 may update the machine learning algorithm or artificial intelligence based on this feedback to reduce the likelihood of similar resources and proposals being generated for similarly-situated members.

The representative 106, via a proposal template, may generate additional proposal options for businesses and/or products that may be used for completion of a task. For instance, for a particular proposal, the representative 106 may generate a recommended option, which may correspond to the business or product that the representative 106 is recommending for completion of a task. Additionally, in order to provide the member with additional options or choices, the representative 106 can generate additional options corresponding to other businesses or products that may complete the task. In some instances, if the representative 106 knows that the member has delegated the decision-making with regard to completion of a task to the representative 106, the representative 106 may forego generation of additional proposal options outside of the recommended option. However, the representative 106 may still present, to the member, the selected proposal option for completion of the task in order to keep the member informed about the status of the task.

In an embodiment, once the representative 106 has completed defining a proposal via use of a proposal template, the task facilitation service 102 may present the proposal to the member through the application or web portal provided by the task facilitation service 102. In some instances, the representative 106 may transmit a notification to the member to indicate that a proposal has been prepared for a particular task and that the proposal is ready for review via the application or web portal provided by the task facilitation service 102. The proposal presented to the member may indicate the task for which the proposal was prepared, as well as an indication of the one or more options that are being provided to the member. For instance, the proposal may include links to the recommended proposal option and to the other options (if any) prepared by the representative 106 for the particular task. These links may allow the member to navigate amongst the one or more options prepared by the representative 106 via the application or web portal.

For each proposal option, the member may be presented with information corresponding to the business (e.g., third-party service or other service/entity associated with the task facilitation service 102) or product selected by the representative 106 and corresponding to the data fields selected for presentation by the representative 106 via the proposal template. For example, for a task associated with a roof inspection at the member's home, the representative 106 may present for a particular roofer (e.g., proposal option) one or more reviews or testimonials for the roofer, the rate and availability for the roofer subject to the member's task completion timeframe (if any), the roofer's website, the roofer's contact information, any estimated costs, and an indication of next steps for the representative 106 should the member select this particular roofer for the task. In some instances, the member may select what details or data fields associated with a particular proposal are presented via the application or web portal. For example, if the member is presented with the estimated total for each proposal option and the member is not interested in reviewing the estimated total for each proposal option, the member may toggle off this particular data field from the proposal via the application or web portal. Alternatively, if the member is interested in reviewing additional detail with regard to each proposal option (e.g., additional reviews, additional business or product information, etc.), the member may request this additional detail to be presented via the proposal.

In an embodiment, based on member interaction with a provided proposal, the task facilitation service 102 can further train a machine learning algorithm or artificial intelligence used to determine or recommend what information should be presented to the member and to similarly situated members for similar tasks or task types. As noted above, the task facilitation service 102 may use a machine learning algorithm or artificial intelligence to generate recommendations for the representative 106 regarding data fields that may be presented to the member in a proposal. The task facilitation service 102 may monitor or track member interaction with the proposal to determine the member's preferences regarding the information presented in the proposal for the particular task. Further, the task facilitation service 102 may monitor or track any messages exchanged between the member and the representative 106 related to the proposal to further identify the member's preferences. For example, if the member sends a message to the representative 106 indicating that the member would like to see more information with regard to the services offered by each of the businesses specified in the proposal, the task facilitation service 102 may determine that the member may want to see additional information with regard to the services offered by businesses associated with the particular task or task type. In some instances, the task facilitation service 102 may solicit feedback from the member with regard to proposals provided by the representative 106 to identify the member's preferences. This feedback and information garnered through member interaction with the representative 106 regarding the proposal and with the proposal itself may be used to retrain the machine learning algorithm or artificial intelligence to provide more accurate or improved recommendations for information that should be presented to the member and to similarly situated members in proposals for similar tasks or task types.

In some instances, each proposal presented to the member may specify any costs associated with each proposal option. These costs may be presented in different formats based on the requirements of the associated task or project. For instance, if a task or project corresponds to the purchase of an airline ticket, each proposal option for the corresponding proposal may present a fixed price for the airline ticket. As another illustrative example, a representative 106 can provide, for each proposal option, a budget for completion of the task according to the selected option (e.g., "will spend up to $150 on Halloween decorations for the party"). As yet another illustrative example, for tasks or projects where payment schedules may be involved, proposal options for a proposal related to a task or project may specify the payment schedule for each of these proposal options (e.g., "$100 for the initial consultation, with $300 for follow-up servicing," "$1,500 up-front to reserve the venue, with $1,500 due after the event," etc.).

If a member accepts a particular proposal option for a task or project, the representative 106 may communicate with the member to ensure that the member is consenting to payment of the presented costs and any associated taxes and fees for the particular proposal option. In some instances, if a proposal option is selected with a static payment amount (e.g., fixed price, "up to $X," phased payment schedules with static amounts, etc.), the member may be notified by the representative 106 if the actual payment amount required for fulfillment of the proposal option exceeds a threshold percentage or amount over the originally presented static payment amount. For example, if the representative 106 determines that the member may be required to spend more than 120% of the cost specified in the selected proposal option, the representative 106 may transmit a notification to the member to re-confirm the payment amount before proceeding with the proposal option.

In an embodiment, if a member accepts a proposal option from the presented proposal, the task facilitation service 102 moves the task associated with the presented proposal to an executing state and the representative 106 can proceed to execute on the proposal according to the selected proposal option. For instance, the representative 106 may contact one or more third-party services 116 to coordinate performance of the task according to the parameters defined in the proposal accepted by the member.

In an embodiment, the representative 106 utilizes the task coordination system 114 to assist in the coordination of performance of the task according to the parameters defined in the proposal accepted by the member. For instance, if the coordination with a third-party service 116 may be performed automatically (e.g., third-party service 116 provides automated system for ordering, scheduling, payments, etc.), the task coordination system 114 may interact directly with the third-party service 116 to coordinate performance of the task according to the selected proposal option. The task coordination system 114 may provide any information (e.g., confirmation, order status, reservation status, etc.) to the representative 106. The representative 106, in turn, may provide this information to the member via the application or web portal utilized by the member to access the task facilitation service 102. Alternatively, the representative 106 may transmit the information to the member via other communication methods (e.g., e-mail message, text message, etc.) to indicate that the third-party service 116 has initiated performance of the task according to the selected proposal option. If the representative 106 is performing the task for the benefit of the member 118, the representative 106 may provide status updates with regard to its performance of the task to the member 118 via the application or web portal provided by the task facilitation service 102.

In an embodiment, the task coordination system 114 can monitor performance of tasks by the representative 106, third-party services 116, and/or other services/entities associated with the task facilitation service 102 for the benefit of the member. For instance, the task coordination system 114 may record any information provided by the third-party services 116 with regard to the timeframe for performance of the task, the cost associated with performance of the task, any status updates with regard to performance of the task, and the like. The task coordination system 114 may associate this information with a data record corresponding to the task being performed. Status updates provided by third-party services 116 may be provided automatically to the member via the application or web portal provided by the task facilitation service 102 and to the representative 106. Alternatively, the status updates may be provided to the representative 106, which may provide these status updates to the member over a chat session established between the member and the representative 106 for the particular task/project or through other communication methods. In some instances, if the task is to be performed by the representative 106, the task coordination system 114 may monitor performance of the task by the representative 106 and record any updates provided by the representative 106 to the member via the application or web portal.

Once a task has been completed, the member may provide feedback with regard to the performance of the representative 106, third-party services 116, and/or other services/entities associated with the task facilitation service 102 that performed the task according to the proposal option selected by the member. For instance, the member may exchange one or more messages with the representative 106 over the chat session corresponding to the particular task/project being completed to indicate its feedback with regard to the completion of the task. For instance, a member may indicate that they are pleased with how the task was completed. The member may additionally, or alternatively, provide feedback indicating areas of improvement for performance of the task. For instance, if a member is not satisfied with the final cost for performance of the task and/or has some input with regard to the quality of the performance (e.g., timeliness, quality of work product, professionalism of third-party services 116, etc.), the member may indicate as such in one or more messages to the representative 106. In an embodiment, the task facilitation service uses a machine learning algorithm or artificial intelligence to process feedback provided by the member to improve the recommendations provided by the task facilitation service 102 for proposal options, third-party services 116 or other services/entities, and/or processes that may be performed for completion of similar tasks. For instance, if the task facilitation service 102 detects that the member is unsatisfied with the result provided by a third-party service 116 or other service/entity for a particular task, the task facilitation service 102 may utilize this feedback to further train the machine learning algorithm or artificial intelligence to reduce the likelihood of the third-party service 116 or other service/entity being recommended for similar tasks and to similarly situated members. As another example, if the task facilitation service 102 detects that the member is pleased with the result provided by a representative 106 for a particular task, the task facilitation service 102 may utilize this feedback to further train the machine learning algorithm or artificial intelligence to reinforce the operations performed by representatives for similar tasks and/or for similarly situated members.

Figure 4:
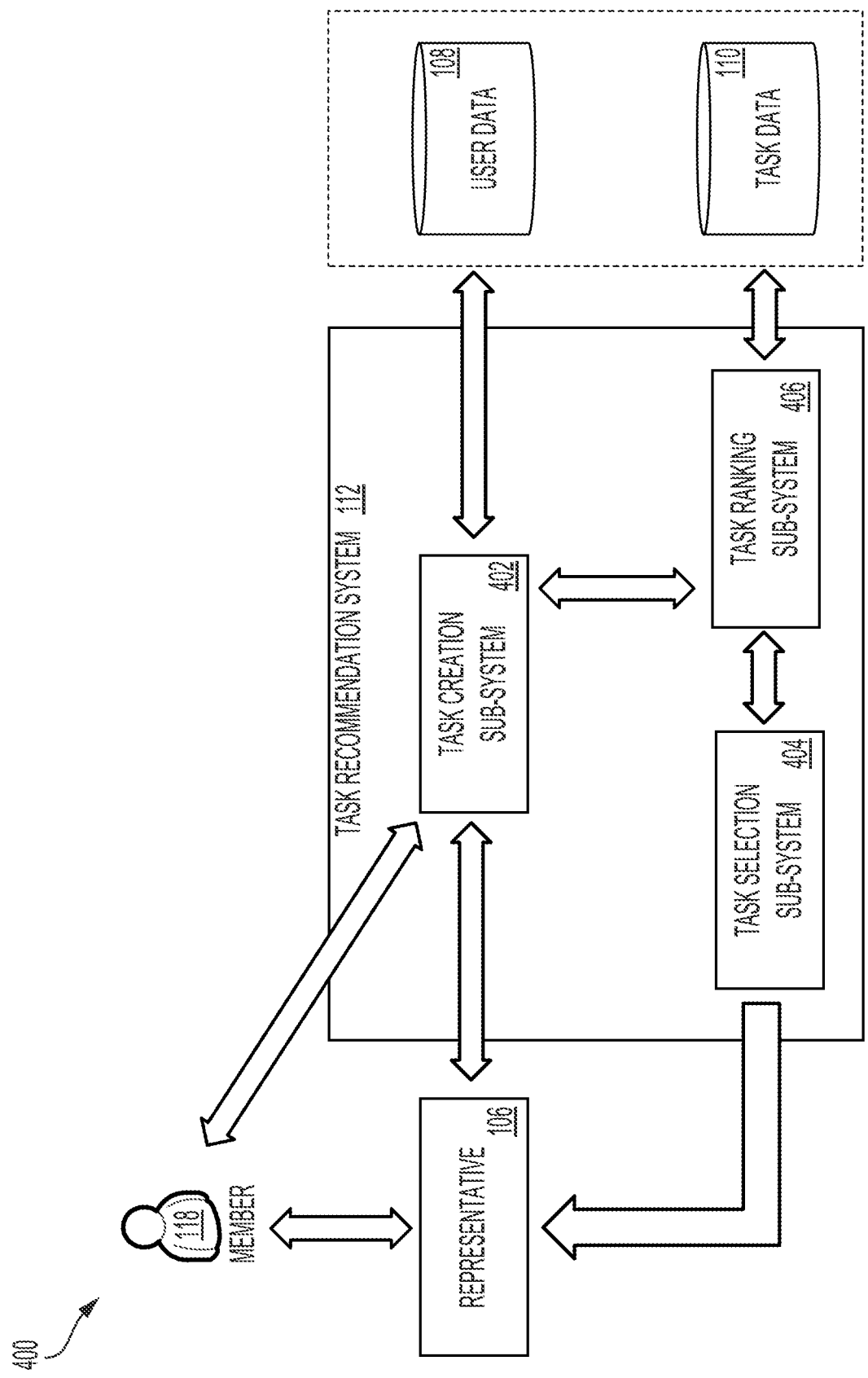
FIG. 4 shows an illustrative example of an environment in which a task recommendation system generates and ranks recommendations for tasks to be performed for the benefit of a member in accordance with at least one embodiment.

FIG. 4 shows an illustrative example of an environment 400 in which a task recommendation system 112 generates and ranks recommendations for tasks to be performed for the benefit of a member 118 in accordance with at least one embodiment. In the environment 400, a member 118 and/or representative 106 interacts with a task creation sub-system 402 of the task recommendation system 112 to generate a new task or project that can be performed for the benefit of the member 118. The task creation sub-system 402 may be implemented using a computer system or as an application or other executable code implemented on a computer system of the task recommendation system 112.

In an embodiment, the member 118 can access the task creation sub-system 402 to request creation of one or more tasks as part of an onboarding process implemented by the task facilitation service. For instance, during an onboarding process, the member 118 can provide information related to one or more tasks that the member 118 wishes to possibly delegate to a representative 106. The task creation sub-system 402 may utilize this information to identify parameters related to the tasks that the member 118 wishes to delegate to a representative 106 for performance of the tasks. For instance, the parameters related to these tasks may specify the nature of these tasks (e.g., gutter cleaning, installation of carbon monoxide detectors, party planning, etc.), a level of urgency for completion of these tasks (e.g., timing requirements, deadlines, date corresponding to upcoming events, etc.), any member preferences for completion of these tasks, and the like. The task creation sub-system 402 may utilize these parameters to automatically create the task, which may be presented to the representative 106 once assigned to the member 118 during the onboarding process.

The member 118 may further access the task creation sub-system 402 to generate a new task or project at any time after completion of the onboarding process. For example, the task facilitation service may provide, via an application or web portal of the task facilitation service, a widget or other user interface element through which a member 118 may generate a new task or project manually. In an embodiment, the task creation sub-system 402 provides various task templates that may be used by the member 118 to generate a new task or project. The task creation sub-system 402 may maintain, in a task datastore 110, task templates for different task types or categories. Each task template may include different data fields for defining the task, whereby the different task fields may correspond to the task type or category for the task being defined. The member 118 may provide task information via these different task fields to define the task that may be submitted to the task creation sub-system 402 or representative 106 for processing. The task datastore 110, in some instances, may be associated with a resource library. This resource library may maintain the various task templates for the creation of new tasks.

As noted above, each task template may be associated with a particular task category. Thus, the plurality of task definition fields within a particular task template may be associated with the task category assigned to the task template. For example, the task definition fields corresponding to a vehicle maintenance task may be used to define the make and model of the member's vehicle, the age of the vehicle, information corresponding to the last time the vehicle was maintained, any reported accidents associated with the vehicle, a description of any issues associated with the vehicle, and the like. In some instances, a member accessing a particular task template may further define custom fields for the task template, through which the member may supply additional information that may be useful in defining and completing the task. These custom fields may be added to the task template such that, if a member and/or representative obtains the task template in the future to create a similar task, these custom fields may be available to the member and/or representative.

In an embodiment, the data fields presented in a task template used by the member 118 to manually define a new task can be selected based on a determination generated using a machine learning algorithm of artificial intelligence. For example, the task creation sub-system 402 can use, as input to the machine learning algorithm or artificial intelligence, a member profile from the user datastore 108 and the selected task template from the task datastore 110 to identify which data fields may be omitted from the task template when presented to the member 118 for definition of a new task or project. For instance, if the member 118 is known to delegate maintenance tasks to a representative 106 and is indifferent to budget considerations, the task creation sub-system 402 may present, to the member 118, a task template that omits any budget-related data fields and other data fields that may define, with particularity, instructions for completion of the task. In some instances, the task creation sub-system 402 may allow the member 118 to add, remove, and/or modify the data fields for the task template. For example, if the task creation sub-system 402 removes a data field corresponding to the budget for the task based on an evaluation of the member profile, the member 118 may request to have the data field added to the task template to allow the member 118 to define a budget for the task. The task creation sub-system 402, in some instances, may utilize this member change to the task template to retrain the machine learning algorithm or artificial intelligence to improve the likelihood of providing task templates to the member 118 without need for the member 118 to make any modifications to the task template for defining a new task.

In some instances, if the member selects a particular task template for creation of a task associated with an experience, the task creation sub-system 402 can automatically identify the portions of the member profile that may be used to populate the selected task template. For example, if the member selects a task template corresponding to an evening out at a restaurant, the task creation sub-system 402 may automatically process the member profile to identify any information corresponding to the member's dietary preferences and restrictions that may be used to populate one or more fields within the task template selected by the member. The member may review these automatically populated data fields to ensure that these data fields have been populated accurately. If the member makes any changes to the information within an automatically populated data field, the task creation sub-system 402 may use these changes to automatically update the member profile to incorporate these changes.

In an embodiment, the task creation sub-system 402 further enables a representative 106 to create a new task or project on behalf of a member 118. The representative 106 may request, from the task creation sub-system 402, a task template corresponding to the task type or category for the task being defined. The representative 106, via the task template, may define various parameters associated with the new task or project, including assignment of the task (e.g., to the representative 106, to the member 118, etc.). In some instances, the task creation sub-system 402 may use a machine learning algorithm or artificial intelligence to identify which data fields are to be presented in the task template to the representative 106 for creation of a new task or project. For example, similar to the process described above related to member creation of a task or project, the task creation sub-system 402 may use, as input to the machine learning algorithm or artificial intelligence, a member profile from the user datastore 108 and the selected task template from the task datastore 110. However, rather than identifying which data fields may be omitted from the task template, the task creation sub-system 402 may indicate which data fields may be omitted from the task when presented to the member 118 via the application or web portal provided by the task facilitation service. Thus, the representative 106 may be required to provide all necessary information for a new task or project regardless of whether all information is presented to the member 118 or not.

Similar to the process described above in connection with a member's selection of a particular task template, the task creation sub-system 402 may automatically identify the portions of the member profile that may be used to populate the selected task template. The representative 106 may review these automatically populated data fields to ensure that these data fields have been populated accurately. If the representative 106 makes any changes to the information within an automatically populated data field (based on the representative's personal knowledge of the member 118, etc.), the task creation sub-system 402 may use these changes to automatically update the member profile to incorporate these changes. In some instances, if changes are to be made to the member profile as a result of the changes made to the task template by the representative 106, the task creation sub-system 402 may prompt the member 118 to verify that the proposed change to the member profile is accurate. If the member 118 indicates that the proposed change is inaccurate, or the member 118 provides an alternative change, the task creation sub-system 402 may automatically update the corresponding data fields in the task template and the member profile to reflect the accurate information, as indicated by the member 118.

In an embodiment, the task creation sub-system 402 can monitor, automatically and in real-time, messages exchanged between the member 118 and the representative 106 to identify tasks that may be recommended to the member 118. For instance, the task creation sub-system 402 may utilize natural language processing (NLP) or other artificial intelligence to evaluate received messages or other communications from the member 118 to identify possible tasks that may be recommended to the member 118. For instance, the task creation sub-system 402 may process any incoming messages from the member 118 using NLP or other artificial intelligence to detect a new task or other issue that the member 118 would like to have resolved. In some instances, the task creation sub-system 402 may utilize historical task data from the task datastore 110 and corresponding messages from the task datastore 110 to train the NLP or other artificial intelligence to identify possible tasks. If the task creation sub-system 402 identifies one or more possible tasks that may be recommended to the member 118, the task creation sub-system 402 may present these possible tasks to the representative 106, which may select tasks that can be shared with the member 118 over the chat session.

The task recommendation system 112 may further include a task ranking sub-system 406, which may be configured to rank the set of tasks of a member 118, including tasks that may be recommended to the member 118 for completion by the member 118 or the representative 106. The task ranking sub-system 406 may be implemented using a computer system or as an application or other executable code implemented on a computer system of the task recommendation system 112. In an embodiment, the task ranking sub-system 406 can rank the listing of the set of tasks based on a likelihood of the member 118 selecting the task for delegation to the representative for performance and coordination with third-party services and/or other services/entities associated with the task facilitation service. Alternatively, the task ranking sub-system 406 may rank the listing of the set of tasks based on the level of urgency for completion of each task. The level of urgency may be determined based on member characteristics from the user datastore 108 (e.g., data corresponding to a member's own prioritization of certain tasks or categories of tasks) and/or potential risks to the member 118 if the task is not performed.

In an embodiment, the task ranking sub-system 406 provides the ranked list of the set of tasks that may be recommended to the member 118 to a task selection sub-system 404. The task selection sub-system 404 may be implemented using a computer system or as an application or other executable code implemented on a computer system of the task recommendation system 112. The task selection sub-system 404 may be configured to select, from the ranked list of the set of tasks, which tasks may be recommended to the member 118 by the representative 106. For instance, if the application or web portal provided by the task facilitation service is configured to present, to the member 118, a limited number of task recommendations from the ranked list of the set of tasks, the task selection sub-system 404 may process the ranked list and the member's profile from the user datastore 108 to determine which task recommendations should be presented to the member 118. In some instances, the selection made by the task selection sub-system 404 may correspond to the ranking of the set of tasks in the list. Alternatively, the task selection sub-system 404 may process the ranked list of the set of tasks, as well as the member profile and the member's existing tasks (e.g., tasks in progress, tasks accepted by the member 118, etc.), to determine which tasks may be recommended to the member 118. For instance, if the ranked list of the set of tasks includes a task corresponding to gutter cleaning but the member 118 already has a task in progress corresponding to gutter repairs due to a recent storm, the task selection sub-system 404 may forego selection of the task corresponding to gutter cleaning, as this may be performed in conjunction with the gutter repairs. Thus, the task selection sub-system 404 may provide another layer to further refine the ranked list of the set of tasks for presentation to the member 118.

The task selection sub-system 404 may provide, to the representative 106, a new listing of tasks that may be recommended to the member 118. The representative 106 may review this new listing of tasks to determine which tasks may be presented to the member 118 via the application or web portal provided by the task facilitation service. For instance, the representative 106 may review the set of tasks recommended by the task selection sub-system 404 and select one or more of these tasks for presentation to the member 118 via individual interfaces corresponding to these one or more tasks. Further, as described above, the representative 106 may determine whether a task is to be presented with an option to defer to the representative 106 for performance of the task (e.g., with a button or other GUI element to indicate the member's preference to defer to the representative 106 for performance of the task). In some instances, the one or more tasks may be presented to the member 118 according to the ranking generated by the task ranking sub-system 406 and refined by the task selection sub-system 404. Alternatively, the one or more tasks may be presented according to the representative's understanding of the member's own preferences for task prioritization. Through the interfaces corresponding to the one or more tasks recommended to the member 118, the member 118 may select one or more tasks that may be performed with the assistance of the representative 106. The member 118 may alternatively dismiss any presented tasks that the member 118 would rather perform personally or that the member 118 does not otherwise want performed.

In an embodiment, the task selection sub-system 404 monitors the different interfaces corresponding to the recommended tasks, including any corresponding chat or other communications sessions between the member 118 and the representative 106, to collect data with regard to member selection of tasks for delegation to the representative 106 for performance. For instance, the task selection sub-system 404 may process messages corresponding to tasks presented to the member 118 by the representative 106 over the different interfaces corresponding to the recommended tasks to determine a polarity or sentiment corresponding to each task. For example, if a member 118 indicates, in a message to the representative 106 transmitted through a communications session associated with a particular task, that it would prefer not to receive any task recommendations corresponding to vehicle maintenance, the task selection sub-system 404 may ascribe a negative polarity or sentiment to tasks corresponding to vehicle maintenance. Alternatively, if a member 118 selects a task related to gutter cleaning for delegation to the representative 106 and/or indicates in a message to the representative 106 (such as through a communications session associated with a gutter cleaning task presented to the member 118) that recommendation of this task was a great idea, the task selection sub-system 404 may ascribe a positive polarity or sentiment to this task. In an embodiment, the task selection sub-system 404 can use these responses to tasks recommended to the member 118 to further train or reinforce the machine learning algorithm or artificial intelligence utilized by the task ranking sub-system 406 to generate task recommendations that can be presented to the member 118 and other similarly situated members of the task facilitation service. Further, the task selection sub-system 404 may update the member's profile or model to update the member's preferences and known behavior characteristics based on the member's selection of tasks from those recommended by the representative 106 and/or sentiment with regard to the tasks recommended by the representative 106.

Figure 5:
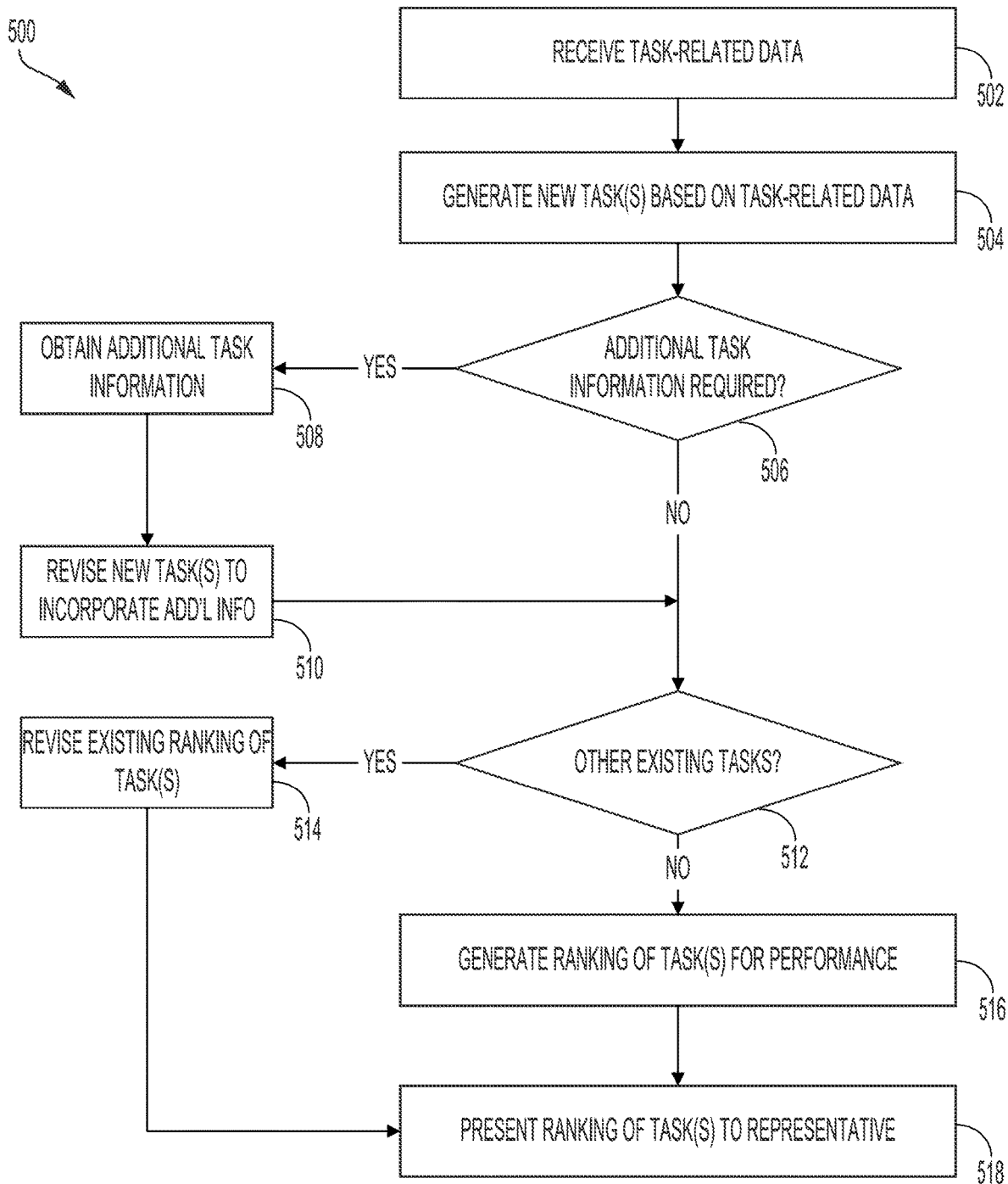
FIG. 5 shows an illustrative example of a process for generating new tasks and a ranking of tasks that can be used to determine what tasks are to be presented to a member in accordance with at least one embodiment.

FIG. 5 shows an illustrative example of a process 500 for generating new tasks and a ranking of tasks that can be used to determine what tasks are to be presented to a member in accordance with at least one embodiment. The process 500 may be performed by a task recommendation system of the task facilitation service. At step 502, the task recommendation system may receive task-related data. As noted above, a member of the task facilitation service may manually provide task-related data via a task template corresponding to a particular task category or type. The task template may include various fields through which the member may provide a name for the task, a description of the task, a timeframe for performance of the task, a budget for performance of the task, and the like. The task template provided to the member may be tailored specifically according to the characteristics of the member identified by the task facilitation service and to the characteristics corresponding to the particular task category or type associated with the selected task template. The member may provide the completed task template to the task recommendation system for generation of new tasks.

In some instances, the representative assigned to the member may provide the task-related data to the task recommendation system. For instance, the representative assigned to the member may obtain the task template from the member and initiate evaluation of the task to determine how best to perform the task for the benefit of the member. For instance, the representative may evaluate the task template and transmit a request to the task recommendation system to generate a new task for the member corresponding to the task-related details provided by the member in the task template.

At step 504, the task recommendation system may generate one or more new tasks based on the task-related data provided by the member and/or the representative assigned to the member. For instance, the task recommendation system may generate a new entry in a task datastore corresponding to the new task. Further, the task recommendation system may assign a unique identifier to the newly generated task. This may facilitate tracking of a particular task associated with a member of the task facilitation service.

At step 506, the task recommendation system may determine whether additional task information is required for the newly created task. For instance, the task recommendation system may evaluate the member profile or model to determine whether to recommend, to the representative, obtaining additional information that may be used to determine how best to perform the task for the benefit of the member. For instance, if the member has indicated that they wish to have their gutters cleaned but has not indicated when the gutters should be cleaned via the task template, the task recommendation system may prompt the representative to obtain this information from the member. As another example, if the member has submitted a task without a particular budget, and the task recommendation system determines that the member is budget-conscious, the task recommendation system may prompt the representative to communicate with the member to determine what the budget should be for performance of the task. In some embodiments, the determination as to whether additional task information is required may be performed by the representative based on the representative's knowledge of the member. Any information obtained in response to these communications may be used to supplement the member profile such that, for future tasks, this newly obtained information may be automatically retrieved from the member profile without requiring additional prompts to the member.

If the task recommendation system determines that additional task information is required for the new task, the task recommendation system, at step 508, may obtain the additional task information from either the member or the representative and, at step 510, revise the new task to incorporate this additional information. For instance, the representative may prompt the member to provide this additional information based on the determination by the task recommendation system. Alternatively, the task recommendation system may communicate with the member directly to obtain the additional task information.

At step 512, the task recommendation system determines whether there are any other existing tasks associated with the member that are yet to be performed (e.g., not in progress). As noted above, the task recommendation system can rank the listing of the set of tasks based on a likelihood of the member selecting the task for delegation to the representative for performance and coordination with third-party services. Alternatively, the task recommendation system may rank the listing of the set of tasks based on the level of urgency for completion of each task. Thus, if there are currently other existing tasks for the member, the task recommendation system, at step 514, may revise an existing ranking of tasks to incorporate the new tasks into the ranking. For instance, if a new task has a greater level of urgency compared to the pending tasks in the existing ranking of tasks, the task recommendation system may revise the ranking such that the new task is given a greater ranking, or priority, for future performance.

If the task recommendation system determines that there are no other existing tasks, the task recommendation system, at step 516, may generate a ranking of the newly generated tasks for performance of these tasks. The task recommendation system can rank the listing of the set of tasks based on a likelihood of the member selecting the task for delegation to the representative for performance and coordination with third-party services and/or other services/entities associated with the task facilitation service that may be assigned to perform the task. Alternatively, the task recommendation system may rank the listing of the set of tasks based on the level of urgency for completion of each task. At step 518, the task recommendation system can present the ranking of the set of tasks to the representative. In an embodiment, the task recommendation system, at step 518, presents the ranked list of the set of tasks that may be recommended to the member 118 to the representative. The representative may select, from the ranked list of the set of tasks, which tasks may be recommended to the member.

Figure 6:
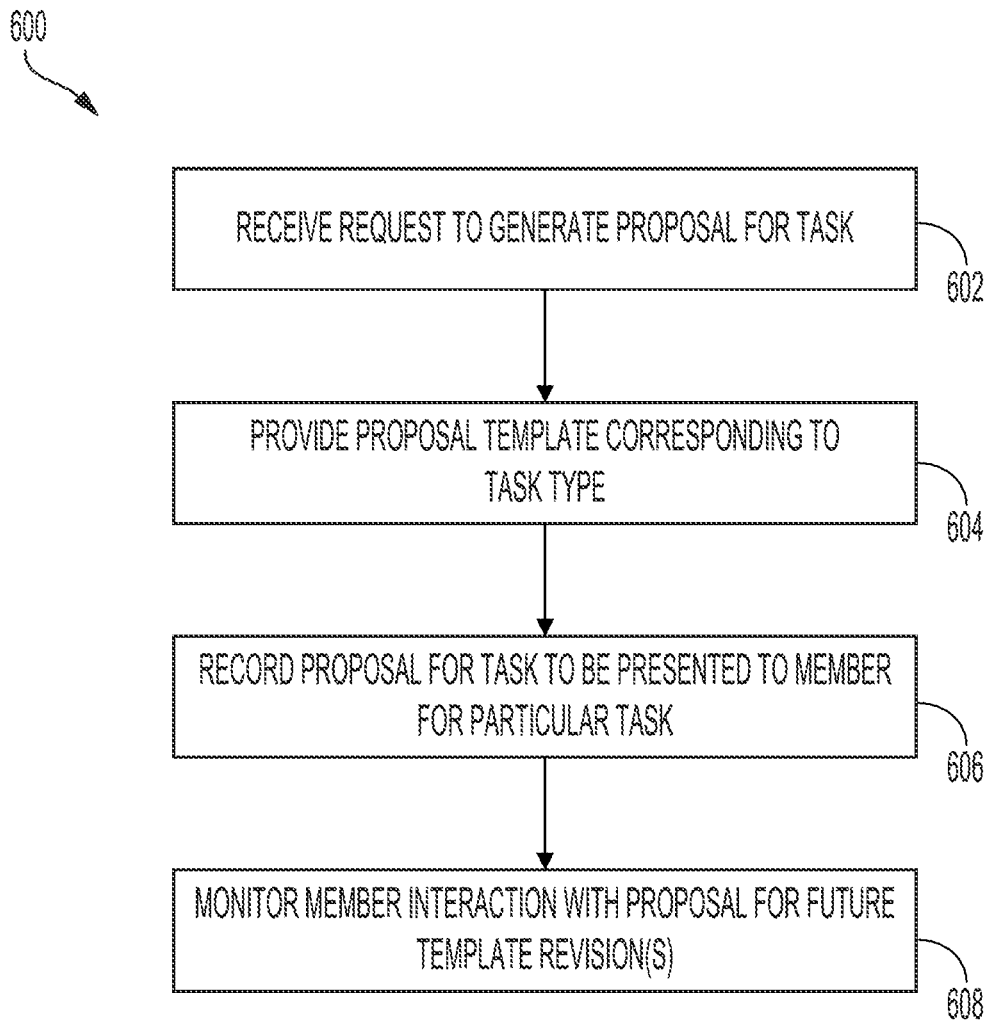
FIG. 6 shows an illustrative example of a process for generating a proposal and monitoring member interaction with the generated proposal in accordance with at least one embodiment.

FIG. 6 shows an illustrative example of a process 600 for generating a proposal and monitoring member interaction with the generated proposal in accordance with at least one embodiment. The process 600 may be performed by a task coordination system of the task facilitation service. At step 602, the task coordination system may receive a request to generate a proposal for a particular task. The request may be submitted by a representative, which may have received authorization from a member to perform a task for the benefit of the member. For instance, once the representative has obtained the necessary task-related information from the member and/or through the task recommendation system (e.g., task parameters garnered via evaluation of tasks performed for similarly situated members, etc.), the representative can utilize the task coordination system to generate one or more proposals for resolution of the task.

At step 604, the task coordination system provides a proposal template corresponding to the task type to the representative. The proposal template may be provided via a user interface provided to the representative by the task facilitation service. As noted above, a proposal may include one or more options presented to a member that may be created and/or collected by a representative while researching a given task. In some instances, a representative may access, via the task coordination system, one or more templates that may be used to generate these one or more proposals. For example, the task coordination system may maintain proposal templates for different task types, whereby a proposal template for a particular task type may include various data fields associated with the task type.

At step 606, the task coordination system may record a proposal generated by the representative for a particular task so that the proposal can be presented to the member for the particular task. For instance, the task coordination system may add the proposal to a task datastore such that member interaction with the proposal may be recorded for further training of the aforementioned machine learning algorithms or artificial intelligence used to generate and maintain member profiles and to define individualized proposal templates for different task types and for different members. Additionally, the task coordination system may store the proposal in the user datastore in association with a member entry in the user datastore, as described above.

At step 608, the task coordination system may monitor member interaction with the proposal to identify possible future proposal template revisions. As noted above, when a proposal is presented to a member, the task coordination system may monitor member interaction with the representative and with the proposal to obtain data that may be used to further train a machine learning algorithm or artificial intelligence utilized to define a proposal template for a particular member. For example, if a representative presents a proposal without any ratings/reviews for a particular business based on the recommendation generated by the task coordination system, and the member indicates (e.g., through messages to the representative, through selection of an option in the proposal to view ratings/reviews for the particular business, etc.) that they are interested in ratings/reviews for the particular business, the task coordination system may utilize this feedback to further train the machine learning algorithm or artificial intelligence to increase the likelihood of recommending presentation of ratings/reviews for businesses selected for similar tasks or task types.

As noted above, at least certain embodiments of the present disclosure may include a button or similar functionality that allows a member to defer or delegate tasks to a representative for completion. More generally, embodiments of the present disclosure may include delegation controls presented to or otherwise available to the member (e.g., through a user interface) that, when activated, automatically delegate a task for completion by the task facilitation service. For example, in some embodiments, the delegation control may be an interactive control element (e.g., button, checkbox, selectable icon, etc.) visually associated with task information presented on a graphical user interface (GUI) executed on a computing device associated with a member. In response to activation of the delegation control (e.g., by clicking or otherwise manipulating the interactive element associated with the delegation control), the computing device associated with the member may generate, update, transmit, etc. an indication receivable by the task facilitation service and that communicates to the task facilitation service that the task is to be delegated to the task facilitation service for completion. The task facilitation service may then proceed with completing the task with no or only minimal interaction with the member. Stated differently, activation of the delegation control may grant the task facilitation service permission to identify potential options for completing the task, to select an option for completing the task, to complete the task according to a selected option, or to otherwise complete any aspect of the task with no or limited additional interaction with the member.

When a member delegates a task, the cognitive load associated with that task should be reduced because of the member's reduced role in completing the task. However, delegating a task generally involves relinquishing some degree of control over the task and, as a result, may be a source of stress, anxiety, and/or additional cognitive load for the member. This is particularly the case when the member delegates a task that may be beyond his or her comfort level to delegate. To address this issue, among others, certain embodiments of the present disclosure may include delegation controls at the computing device of the member that are dynamically enabled by the task facilitation service. Stated differently, the task facilitation service permits delegation of only certain tasks by the member and does so by selectively enabling and disabling corresponding functionality at the computing device of the member. For example, the task facilitation service may only permit delegation of and enable delegation controls for tasks that meet certain criteria. Such criteria may include, but are not limited to, the type of task involved, what additional information may be required by the task facilitation service to complete the task, the likelihood that the member will actually delegate the task, and the member's past history of delegation. In at least certain embodiments, the task facilitation service may progressively broaden the scope of tasks that may be delegated, thereby increasing the member's comfort level with delegating certain tasks and mitigating the stress and cognitive load that may be associated with delegation.

In certain embodiments, a representative associated with the task facilitation service and assigned to the member may selectively enable delegation controls for the member. For example, in one embodiment, models of the task facilitation service may use data associated with the member, task, etc. to provide a recommendation to the representative regarding whether a delegation control for a task should be enabled. The representative may then enable or disable the delegation for the task based on the recommendation and the representative's experience with the member. In other embodiments, the task facilitation service may automatically enable or disable delegation controls independent of a representative.

Enablement of a delegation control for a member may be facilitated, at least in part, by one or more models, algorithms, etc. that determine whether a member is likely to delegate a given task. For example, the task facilitation service may include a profile associated with the member that reflects and/or predicts behaviors and preferences of the member. Among other things, a member profile may be based on information provided by the member (e.g., during onboarding), information provided by a representative that has worked with the member, tracked activity of the member, data obtained from external sources (e.g., social media accounts, productivity software, calendar software, etc.), data associated with other members (including, but not necessarily, other members having a similar demographic as the member), and any other similar data source. The member profile or an additional model, algorithm, etc., may also assesses the likelihood that a member will delegate a task. For example, the model may rely on the member profile (and/or other profiles of similar members) and information regarding the task (and/or similar tasks) to generate a metric indicating the likelihood that the member will delegate the task. In embodiments in which a representative enables delegation controls, the metric (or a secondary value or recommendation based on the metric) may be provided to the representative to inform the representative's decision regarding enablement of the delegation control. In other embodiments, the task facilitation service may automatically enable the delegation control if the metric meets a certain threshold.

In at least certain embodiments, interaction with a delegation control by the member may be used to provide feedback to the task facilitation service for use in updating the various models, algorithms, etc., maintained by the task facilitation service. For example, when a member activates a delegation control, the task facilitation service may use that activation as positive feedback that the associated task is one that the member is likely to delegate. Conversely, if the member does not activate the delegation control, the task facilitation service may use such non-activation as negative feedback. In either case, the task facilitation service may use the member's actions to update and refine models, algorithms, etc., including, but not limited to the member profile associated with the member and the delegation control model used to determine whether a member is likely to delegate a task.

As noted above, the task facilitation service may be configured to gradually train/coach the member into delegating a broader range of tasks. For example, the task facilitation service may generally enable delegation controls (or strongly recommend enablement of delegation controls to the representative) for tasks with a high likelihood of delegation by the member (e.g., 90% or more). However, the task facilitation service may also be configured to occasionally enable delegation controls (or recommend enablement of delegation controls to the representative) for a task when there is less certainty that the member will delegate the task (e.g., 70-90%). By doing so, the task facilitation service may gradually expand the boundaries of what the member is willing to delegate and, as a result, to lessen the member's overall cognitive load surrounding task delegation.

In the context of the present disclosure, delegation of a task by a member refers generally to the process by which some or all of a task is identified for completion by the task facilitation service with no or relatively little involvement by the member following delegation. Delegation of a task may include delegation of any or all parts of the task to the task facilitation service. For example, delegating a task may include delegating any of defining/scoping the task, generating options for completion of the task, selecting an option for completing the task, coordinating completion of the task, overseeing completion of the task including, and coordinating payment associated with completion of the task.

In a first example, a member may have a task related to making a reservation for a birthday dinner that the member delegates to the task facilitation service. The member may provide a few details (e.g., who the dinner is for, a list of attendees, a date or range of dates, etc.), but may otherwise delegate the remainder of the birthday reservation task to the task facilitation service. For example, the task facilitation service may select a type of cuisine, a restaurant/location, and time for the dinner and may coordinate transportation to and from the dinner. The task facilitation service may further contact the restaurant to make the reservation, generate and send invitations to the attendees, and other similar tasks generally related to organizing the dinner.

In another example, a member may identify and delegate a home maintenance task, such as gutter cleaning. The member may not provide any specific details and, as a result, the task facilitation service may research, identify, and contact reputable gutter cleaning companies in the area of the member; coordinate a day and time for the gutter cleaning; and handle payment for the cleaning once completed.

In yet another example, a member may work with the task facilitation service (e.g., a representative associated with the task facilitation service) to scope a task in detail and then, once the task has been defined, delegate selection of options for completing the task and general execution of the task to the task facilitation service. For example, the member may provide a date range, location, budget, and list of interests for a vacation to the task facilitation service and then delegate booking transportation, lodging, activities, and other arrangements to the task facilitation service to be consistent with the details provided by the member.

In certain embodiments, a delegated task may involve at least some interaction between the member and the task facilitation service. For example, the task facilitation service may scope and select an option for completing a task but may still present the option to the member for approval. In certain embodiments, conditions (e.g., member-specific conditions or general conditions/rules of the task facilitation service) may exist that specify cases where member feedback or approval is required. For example, if an option selected by the task facilitation service exceeds a certain cost, the task facilitation service may require approval by the member to proceed with the option. Similarly, if an option selected by the task facilitation service exceeds a certain timeframe or is for goods and services subject to certain legal restrictions, the task facilitation service may also require approval by the member to proceed with the selected option. Accordingly, in certain instances, the task facilitation service may still interact with the member despite a task being delegated by the member.

When a task is delegated, the task facilitation service may generally attempt to complete the delegated task in accordance with information about the member that is accessible the task facilitation service. Such information may include a member profile associated with the member (e.g., the member profile created during onboarding and subsequently updated based on activity of the member), historical interactions between the member and the task facilitation service, information regarding previous tasks completed by the member and task facilitation service, information regarding other members sharing a demographic with the member, and external information (e.g., weather reports, traffic reports, news, community calendars, etc.) accessible by the task facilitation service 102. So, while a member may delegate a task for completion by the task facilitation service, the task facilitation service may nevertheless complete the delegated task based on an informed prediction of how the member would prefer the task be completed.

Further aspects of task delegation controls and their enablement and use are now provided with reference to the figures.

Referring to FIG. 1, embodiments of the present disclosure may include dynamically enabled task delegation controls at the computing device 120 of the member 118. Each delegation control may generally be associated with a corresponding task such that, when the delegation control is activated, the task is delegated to the task facilitation service 102 (including by a representative 106 of the task facilitation service 102) for completion. Such delegation generally permits the task facilitation service 102 to complete the task with no or only limited additional interaction with the member 118. As a result, the delegation control allows the member 118 to quickly and efficiently delegate tasks for completion by the task facilitation service 102, thereby reducing or eliminating cognitive load of the member 118 related to the task.

Enablement of the delegation control at the computing device 120 of the member 118 may be controlled by the task facilitation service 102 and may be based, at least in part, on a member model associated with the member 118. In certain embodiments, the member model may be or may be a part of the member profile created during onboarding of the member 118 or another model that is updated and maintained by the task facilitation service 102. In general, however, the terms "member model" and "user model" are used herein to refer to a model specifically associated with the member that models characteristics of the member for purposes of predicting behavior, preferences, and other aspects of the member.

In certain embodiments, the task facilitation service 102 may determine, based on the member model, whether the member 118 is likely to delegate a given task. If so, the task facilitation service 102 may enable a delegation control for the task at the computing device 120. Alternatively, enablement of the task delegation control at the computing device 120 may be at the discretion of a representative 106 of the task facilitation service 102. In such embodiments, the task facilitation service 102 may provide a metric, a value, a recommendation, or similar data corresponding to the likelihood that the member 118 will delegate the task to the representative 106. The representative 106 may then make an informed decision regarding whether to enable the delegation control for the task at the computing device 120.

The member model associated with the member 118 may be based on past activity and interactions between the member 118 and the task facilitation service 102, such as past delegation activity of the member 118. As a result, whether the task facilitation service 102 enables a delegation control for a task may also be based on past delegation activity of the member 118. Stated differently, whether the member 118 activates a delegation control may be used as feedback for the member model. Doing so updates the member model to reflect the evolving tendencies and preferences of the member 118 with respect to task delegation. As a result, determinations by the task facilitation service 102 to enabled delegation controls for the member 118 are similarly based on the evolving tendencies and preferences of the member 118.

The task facilitation service 102 may also determine whether to enable a delegation control for a task based on task data associated with the task. Task data generally refers to any information related to the task and generally includes information related to the nature and scope of the task as well as data for similar tasks, including those of the member 118 and other members associated with the task facilitation service 102. In one example, the task facilitation service 102 may only recommend delegation of tasks for which the task facilitation service 102 has sufficient task data or for which the task facilitation service 102 may be able to predict sufficient task data that may be missing. For example, the task facilitation service 102 may generally recommend tasks related to purchasing gifts to a member; however, the task facilitation service 102 may only do so if information regarding the recipient is provided by the member 118 or otherwise available to the task facilitation service 102 (e.g., included in a profile of the member 118). As another example, the member 118 may have a task to book a date night with their spouse. If the task facilitation service 102 is able to independently gather or predict sufficient information to complete the task (e.g., available dates based on a calendar of the member 118 accessible by the task facilitation service 102, food and budget preferences of the member 118 according to the member's profile, etc.), the task facilitation service 102 may enable a delegation control for the date night task.

Certain task data may preclude a task from being delegated and, as a result, may preclude a corresponding delegation control from being enabled by the task facilitation service 102. For example, in certain embodiments, a task may not be delegated and a delegation control may not be enabled if a budget for the task is unknown or exceeds a pre-defined threshold. In such cases, delegation may not be available and delegation controls may not be enabled unless and until the member 118 provides a budget or authorizes a budget that exceeds the pre-defined threshold. In other embodiments, delegation controls for a task may not be enabled if the budget for the task exceeds a pre-defined threshold, regardless of whether the member 118 authorizes spending above the pre-defined threshold. Accordingly, if the task data for a task indicates that the task has an unknown or high budget, the task facilitation service 102 may not enable a delegation control for the task.

As another example, delegation controls may not be available for tasks that are relatively simple and/or that do not require payment. For example, a member 118 may have a research-type task that involves determining the answer to a question or collecting information on a certain topic. In such cases, the task facilitation service 102 may simply complete the task (e.g., by researching and providing an answer to the member's question) without delegation of the task to the task facilitation service 102 by the member 118. Accordingly, if the task data indicates that the task is a simple task or does not require payment, the task facilitation service 102 may not enable a delegation control for the task.

In still other embodiments, delegation may not be available for tasks that meet certain criteria related to performance of the task, such as the time required to complete the task or the general complexity of the task. For example, a task to plan a road trip may be particularly complex (e.g., include multiple sub-tasks related to booking lodgings, transportation, activities, etc.) and may take the task facilitation service 102 (e.g., the representative 106) a substantial amount of time to complete. In such cases, review by the member 118 may be required at one or more times during completion of the task by the task facilitation service 102 to ensure that the task is being completed according to the member's expectations. Among other things, doing so reduces the likelihood that the task facilitation service 102 will waste resources pursuing completion of the task in a way that is unsatisfactory to the member 118 and improves the likelihood that the task will be completed in a timely manner by avoiding having to repeat aspects of the task. Accordingly, if the task data for the task indicates that the task may be particularly time consuming or complex, the task facilitation service 102 may not enable a delegation control for the task.

In other embodiments, delegation of tasks may be limited by policies and legal requirements regarding third-party purchases. For example, purchases of alcohol, purchases exceeding a certain dollar amount (e.g., $1000), or other purchases that may be subject to legal and general policies of the task facilitation service 102 may not be performed by the task facilitation service 102 or may require explicit authorization from the member 118 to be completed by the task facilitation service 102. Accordingly, if the task data indicates that the task may be subject to restrictions or policies regarding third-party purchases, the task facilitation service 102 may enable a delegation control for the task.

In still other embodiments, delegation of tasks may be limited based on the feasibility of the task. For example, if a task has a deadline that is unrealistic (e.g., planning a month-long road trip by tomorrow), is impossible to complete (e.g., purchasing tickets for an event that has been cancelled or is sold out), or is outside the scope of tasks that may be completed by the task facilitation service 102, the task facilitation service 102 may not permit delegation of the task. Accordingly, if the task data indicates that the task is not feasible or is outside the scope of work for the task facilitation service 102, the task facilitation service 102 may not enable a delegation control for the task.

In another embodiment, delegation of tasks may be limited based on the history of the member 118. For example, in certain embodiments, the task facilitation service 102 may not permit delegation of tasks by new members. In such cases, a member may be considered new if the member has been engaged with the task facilitation service 102 for less than a threshold amount of time (e.g., less than a month), if the member has completed fewer than a threshold number of tasks using the task facilitation service 102 (e.g., fewer than 5 tasks), if the member has completed fewer than a threshold number of tasks using the task facilitation service 102 with a certain rating (e.g., fewer than 5 tasks with a 4- or 5-star rating by the member following completion of the task), or other similar metrics. Similarly, delegation of tasks may be limited based on the member's history, including the member's history of delegated tasks. For example, the task facilitation service 102 may limit the number of tasks that may be delegated at any time based on when delegation became available to the member 118, how many tasks the member 118 has delegated in the past, how the member 118 rated completion of previously delegated tasks, and the like.

In still other embodiments, delegation of tasks may be limited based on preferences or settings provided by the member 118 to the task facilitation service 102. For example, the member 118 may provide a preference or configure a setting at the computing device 120 regarding whether and what type of tasks may be delegated. In one such case, the member 118 may simply disable delegation for all tasks. As a result of such a setting, the task facilitation service 102 may not enable delegation controls at the computing device 120. In another case, the member 118 may provide criteria (e.g., budgets, time, types of tasks, etc.) that may be used to identify when delegation may be enabled for a task. The task facilitation service 102 may then enable a delegation control if the task meets the criteria provided by the member 118 in addition to being recommended by the various models and processes of the task facilitation service 102 related to enabling delegation controls.

As noted above, activation or non-activation of an enabled delegation control may be used to update the member model of the member 118. For example, in response to activation of the delegation control by the member 118, the task facilitation service 102 may initiate a task delegation process and may also update the member model with data corresponding to the delegated task. Stated differently, in response to the member 118 delegating a task, the member model may be updated such that the task facilitation service 102 is more likely to enable a delegation control for similar tasks. In embodiments in which enablement of the delegation control is at the discretion of a representative 106, updating the member model may cause stronger recommendations to be provided to the representative 106 for similar tasks. Conversely, if the member 118 elects not to activate a delegation control for a given task, the member model may be updated such that the likelihood of enabling a delegation control or the strength of recommendations provided to the representative 106 for similar tasks may be reduced.

In at least certain embodiments, the task facilitation service 102 may be configured to gradually encourage the member 118 to delegate tasks to the task facilitation service 102 more often over time. Stated differently, the task facilitation service 102 may selectively use delegation controls to train, coach, or otherwise encourage the member 118 to delegate tasks, thereby reducing the cognitive load of the member 118. For example, in certain implementations, the task facilitation service 102 may be configured to be biased towards enabling the delegation control for the member 118 or providing a positive recommendation to a representative 106 in favor of enabling the delegation control. In other embodiments, the task facilitation service 102 may provide rewards to the member 118 in response to the member 118 delegating tasks. Such rewards may include, without limitation, monetary rewards (e.g., prizes, discounts, coupons, gift cards, etc.), congratulatory messages, gamification-style rewards (e.g., badges, medals, levels), and the like. As a result, the task facilitation service 102 may not only reduce cognitive load of the member 118 with respect to current tasks but may also assist the member 118 to expand the range of tasks the member 118 is willing to delegate over time, thereby further reducing the cognitive load of the member 118.

For various and notable reasons, the delegation controls and related processes disclosed herein are distinct from conventional controls, such as those directed to expediting purchases of products or services by a customer. For example, conventional controls for expediting purchases are generally enabled based only on the availability of customer shipping and purchase information. Accordingly, enablement of such conventional controls does not rely on modeling of the customer and, in particular, modeling of the customer based on the customer's past behavior. In contrast, enablement of delegation controls disclosed herein is customized based on one or more models that reflect the behaviors, preferences, etc. of the member. As a result, the delegation controls reflect the dynamic behavior and preferences of the member and, in certain embodiments, may be used to encourage the member towards certain behavior. For example, and among other things, by customizing enablement of delegation controls for a specific member, the member may be encouraged to delegate more tasks over time to the task facilitation service and ultimately reduce the member's overall cognitive load.

Another distinction over conventional purchase expediting controls is that, by relying on a member model, enablement of delegation controls in embodiments of the present disclosure may be tied to the likelihood that the member will actually activate the delegation control. For example, a delegation control may be enabled for a task that is similar to one or more tasks that the member had previously delegated on the premise that the member is more likely to activate the delegation control for the task in light of the member's past behavior. In contrast, conventional purchase expediting controls are not enabled based on a likelihood that a customer will actually use the control. Rather, if the customer has supplied the requisite purchase and shipping information, the control is enabled, regardless of whether the customer is likely to actually activate the control. This additional distinction enhances the capability of the systems and methods disclosed herein to be tailored to particular members and facilitates use of the delegation controls to direct and encourage behavior of the member.

In addition to being distinct over conventional purchasing controls, the techniques for control enablement provided by implementations of the present disclosure are distinguishable over conventional user interfaces and provide improved dynamism and user-specific tailoring of interfaces. For example, many conventional user interfaces always enable all controls and features and, as a result, can result in cluttered interfaces, steep learning curves, and poor user experience, particularly when controls an interface presents controls unintuitively or based without concern for preferences and needs. In contrast, implementations of this disclosure permit enabling of specific user interface controls for specific user interface items (e.g., delegation controls for tasks) based on user-specific data and in response to changes in the user-specific data. Stated differently, in contrast to conventional and substantially static user interfaces, implementations of the present disclosure include user interfaces that include controls that may be specifically enabled and disabled to fit a user's preferences without direct intervention by the user and in a way that can change or evolve with the user over time.

Although provided in the context of task delegation for a task facilitation service, the systems and methods included in this disclosure more generally provide an approach for selectively enabling user interface functionality based on user preferences, historical user activity, and the like. The systems and methods included in this disclosure also provide an approach for dynamically enabling user interface functionality on a highly granular (e.g., task-by-task) basis. Although these outcomes are separately beneficial, when considered in combination, they provide a substantial improvement to user experience and substantial savings in computing resources.

Among other things, implementations of this disclosure improve user experience and conserve computing resources by providing a streamlined user interface and by reducing the likelihood that a user/member will unintentionally delegate a task (including subsequently reneging on his or her decision to delegate a task). Regarding streamlining of the user interface, for example, at least certain implementations include dynamic controls and corresponding visual indicators that clearly indicate whether a task can and should be delegated. For example, the user interface may include a dynamic icon or visual control element for delegating a task and presented based on historic user activity and preferences. As a result, a user/member can clearly determine whether a task can and should be delegated without having to drill down into the task or otherwise access details regarding the task. Doing so not only improves the overall effectiveness and navigability of the user interface, but also conserves computing resources that would other be required to access and present the task details.

Another way in which implementations of the present disclosure improve user experience and conserve computing resources is by reducing the likelihood that a user/member will unintentionally delegate a task. As described below in further detail, delegating tasks initiates various resource-intensive processes including generating proposals, updating user-specific data, updating task data, and the like. When a user/member undelegates a task, a similarly resource intensive may be required to undo, reset, delete, or otherwise revert the task. For example, in addition to deleting or reopening a task, undelegation may require deleting records of user or system data. Moreover, to the extent the system relies on delegation data for other reasons, such as training machine learning models, a user undelegating a task can undermine the predictive capabilities or accuracy of those models and, in certain instances, may require retraining of the model. For at least these reasons, increasing the likelihood that tasks delegated by a user/member remain delegated can substantially conserve computing resources and improve the overall performance of the task delegation system in addition to improving the user's experience with the system. Accordingly, by incorporating dynamic task delegation controls that are selectively enabled based on user-specific preferences, historic user activity, and other similar data, implementations of this disclosure provide a technical solution for improving the overall performance, efficiency, and accuracy.

The foregoing are merely examples of technical improvements and benefits provided by implementations of the present disclosure. Other improvements provided by implementations of this disclosure related to computing resource conservation, model training and accuracy, user interface navigability, and the like should be apparent to one of skill in the art having the benefit of this disclosure.

Figure 7:
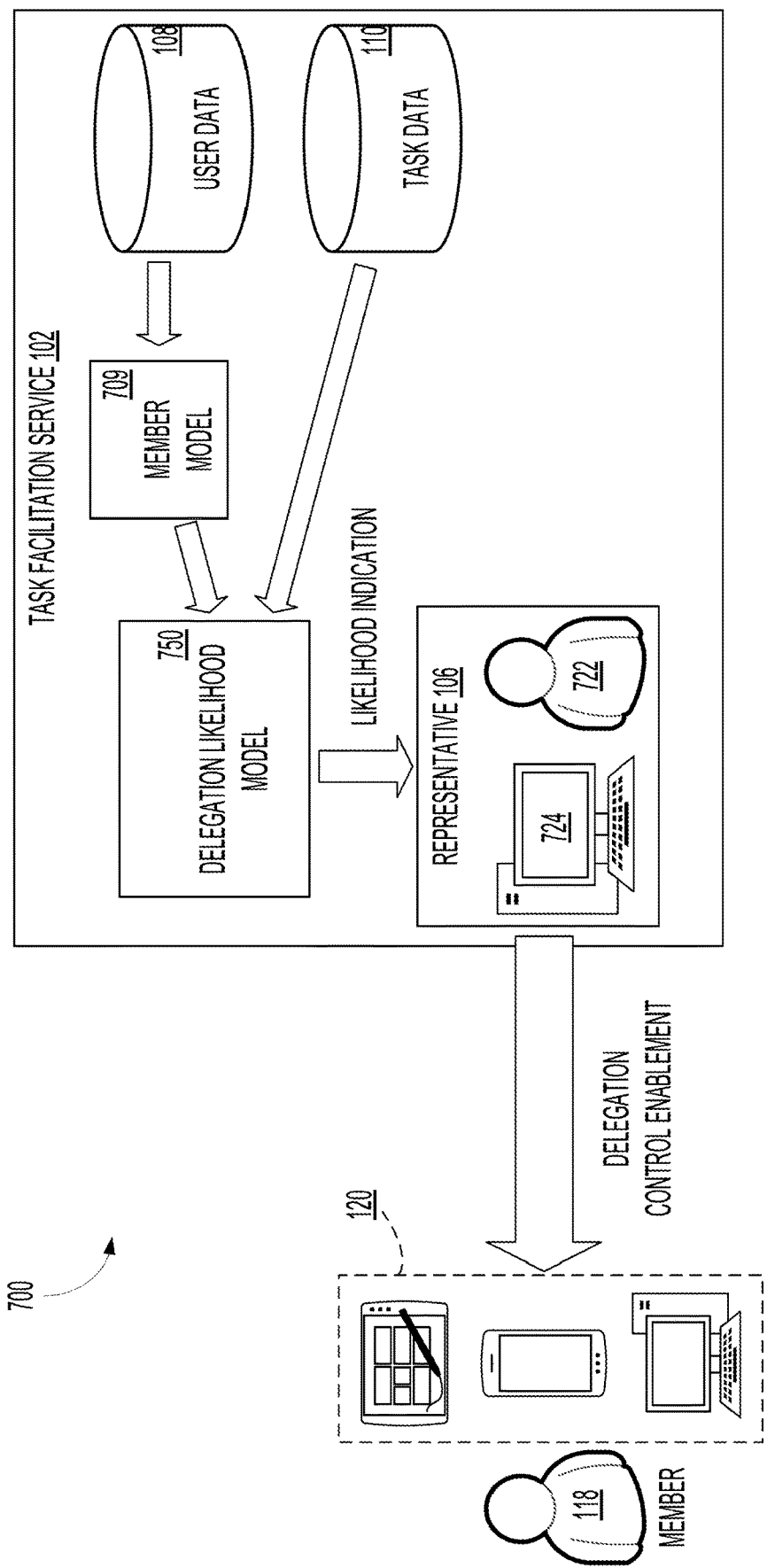
FIG. 7 shows an illustrative example of an environment in which a task facilitation service selectively enables a delegation control at a computing device of a member at the discretion of a representative associated with the task facilitation service.

FIG. 7 shows an illustrative example of an environment 700 including the task facilitation service 102 discussed in the context of FIG. 1 and is intended to illustrate a first example approach for dynamically enabling delegation controls at a computing device 120 of the member 118. Accordingly, for purposes of clarity only, certain elements of the task facilitation service 102 included in FIG. 1 are omitted from FIG. 7.

As previously discussed, and among other things, the task facilitation service 102 generally assists a member 118 to identify, delegate, and complete tasks. To that end, the task facilitation service 102 collects and stores member data, e.g., in the user datastore 108, and task data, e.g., in the task datastore 110. As illustrated in FIG. 1, the task facilitation service 102 may further include one more representatives 106, with which the member 118 may interact and communicate. In the embodiment of FIG. 7, a representative 106 is illustrated as a representative user 722 and a corresponding representative computing device 724; however, in other embodiments, the representative 106 may instead be a virtual entity. Moreover, while FIG. 7 includes only a single representative 106, the task facilitation service 102 may include multiple representatives with each member 118 being assigned to or otherwise being able to interact with one or more of the multiple representatives. Similarly, a given representative may be responsible for communicating and interacting with multiple members.

The member 118 may interact and communicate with the task facilitation service 102 (including with the representative 106) using a computing device 120. In at least certain embodiments, the task facilitation service 102 may host an account for the member 118 that is accessible by the member 118 from multiple computing devices (e.g., a laptop, tablet, smartphone, desktop) associated with the member 118. For purposes of simplicity and clarity, the suite of computing devices available to the member 118 is referred to herein as a singular computing device 120; however, it should be understood that any operations or functionality discussed herein with respect to the computing device 120 may be distributed or duplicated across any number of computing devices associated with the member 118. So, for example and as discussed below in further detail, enablement of a delegation control by the representative 106 may enable the delegation control at any or all of multiple computing devices associated with the member 118 but will nevertheless be referred to herein as enabling the delegation control at the computing device 120.

Embodiments of the present disclosure may include systems and processes for enabling delegation controls at the computing device 120 associated with the member 118. Although specific examples and additional details regarding delegation controls are provided later in this disclosure, the term "delegation control" refers to functionality at the computing device 120 that allows the member 118 to delegate a task associated with the member 118 to be completed by the task facilitation service 102 (including completion by the representative 106). Accordingly, enabling a given delegation control for a given task at the computing device 120 generally refers to making the delegation control accessible to or otherwise capable of being activated by the member 118. In contrast, activating a delegation control generally refers to a member providing a suitable input to an enabled delegation control that communicates that the member 118 would like to delegate the corresponding task. As a result, a delegation control is referred to herein as being "activated" when the corresponding task is in the process of or has been delegated for completion by the task facilitation service 102.

In certain embodiments, a delegation control may include a visual interactive control element of a user interface presented to the member 118 by the member computing device 120. Examples of visual interactive control elements include, but are not necessarily limited to, buttons, radio buttons, check boxes, icons, and the like. In such embodiments, the member 118 may activate the delegation control by clicking, tapping, or otherwise interacting with the visual interactive control element. In other embodiments, delegation controls may encompass other input modalities. In general, any input modality available at the computing device 120 may provide the basis of a delegation control. For example, and without limitation, delegation controls according to the present disclosure may be activated using audio inputs (e.g., by the member 118 saying "Delegate Task: 'Buy Mom's birthday present'"), gestures (e.g., swiping in a certain direction or pattern on a touchscreen), movement (e.g., shaking or tapping a device in a prescribed manner that includes an accelerometer or similar motion-based sensor), physical inputs (e.g., buttons), manipulating visual elements of an interface (e.g., dragging and dropping items from one location on a screen to another), or any other suitable input modality. Regardless of the input modality forming the basis of the delegation control, when the member provides the requisite input associated with the delegation control, the delegation control is activated and initiates delegation of the corresponding task. If a delegation control is disabled, the computing device 120 may not take any action when the member 118 attempts to activate the delegation control. Alternatively, the computing device 120 may provide feedback (e.g., in the form of an error or similar message) to the member 118 communicating that delegation of the task is currently not available and/or that the member 118 should contact the representative 106 if the member 118 would like to delegate the task.

In general, the process for enabling a delegation control at the computing device 120 includes the task facilitation service 102 identifying a task associated with the member 118. The task facilitation service 102 then determines whether to enable a delegation control for the task at the computing device 120 associated with the member 118. If the task facilitation service 102 determines the delegation control should be enabled, the task facilitation service 102 generates or updates a corresponding indication that, when received by the computing device 120, enables the delegation control at the computing device 120.

The present disclosure uses the term "indication" to refer to a mechanism that facilitates communication between computing devices, software applications, and the like. Generally, an indication may be generated, updated, transmitted, etc., responsive to operation of a first computing device and may be subsequently received, read, accessed, etc. by a second computing device. For example, an indication may be a message, data packet, or similar object generated or populated by the first computing device and transmitted to the second computing device. As another example, an indication may be based on creation or modification of a stored value. In such cases, the stored value may be created or updated by the first computing device and subsequently accessed by the second computing device. The stored value may be stored at the first computing device, the second computing device, or at a location mutually accessible (directly or indirectly) by both the first computing device and the second computing device (e.g., a database or similar datastore). Accordingly, to the extent the present disclosure refers to receiving an indication, such reference to receiving includes receiving transmitted data (e.g., receiving data at the second computing device transmitted to the second computing device from the first computing device), but further encompasses more generally accessing or obtaining data, e.g., by reading data from a data source. Similarly, transmitting an indication includes sending data from a computing device but may further include generating or updating a value. Stated differently, to the extent the present disclosure refers to transmitting and receiving an indication, such references should be interpreted broadly to include any suitable mechanism for providing data between computing devices and are not limited to implementations in which data is provided directly between computing devices over a communication link established between the computing devices.

Figure 8:
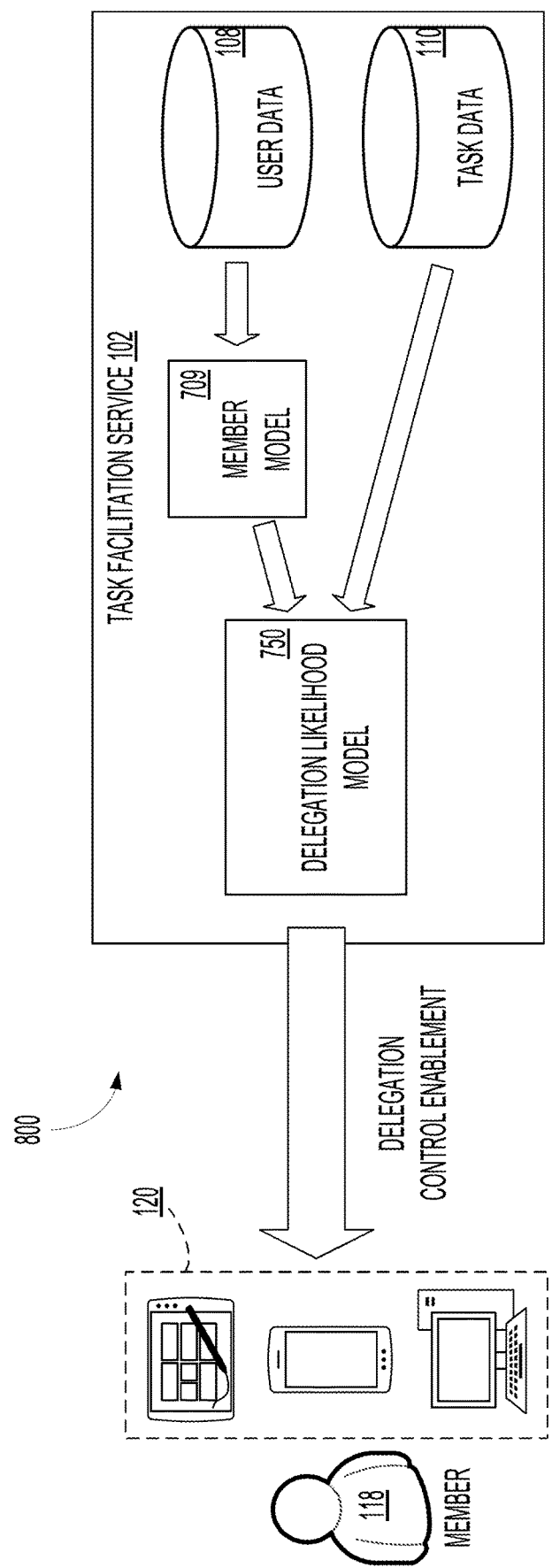
FIG. 8 shows an illustrative example of an environment in which a task facilitation service selectively enables a delegation control at a computing device of a member without a representative.

Examples of the foregoing processes related to enablement of delegation controls are illustrated in each of FIGS. 7 and 8. Referring first to FIG. 7, a process for enabling a delegation control at the computing device 120 is illustrated that relies on a decision by the representative 106 to enable a delegation control at the computing device 120.

In FIG. 7, a member model 709 corresponding to the member 118 is updated using member data stored in the user datastore 108. The member model 709 is associated with the member 118 and captures various aspects of the member 118 including, but not limited to, the behaviors, preferences, personality, or similar aspects of the member 118 including, but not limited to, the behaviors, preferences, tendencies, etc. of the member 118 with respect to task delegation. Among other things, the user datastore 108 stores data related to previous task-related activity of the member 118 and, more specifically, details related to past delegation activity of the member 118. For example, the user datastore 108 may include details regarding different tasks, whether a delegation control was enabled for those tasks, whether the member 118 activated the delegation control for the task, and any feedback received from the member 118 regarding the completion of the delegated task. The member model 709 may be updated with the delegation-related activity such that the member model 709 may be used to predict the likelihood that the member 118 will delegate a particular task. In certain embodiments, the member model 709 may be the member profile generated during onboarding; however, in other embodiments, the member model 709 may instead be a separate model, algorithm, etc. for use in predicting delegation activity. In such cases, the member model 709 may be updated and trained separately from the member profile or may be linked to or otherwise informed by the member profile such that the member model 709 is dynamically updated as the member profile changes.

A delegation control model 750 may rely on the member model 709 and task data for a task associated with the member 118 to determine the likelihood that the member 118 will delegate the task to the task facilitation service 102. In the embodiment illustrated in FIG. 7, the delegation control model 750 outputs a recommendation to the representative 106. The representative 106 may then decide whether to enable a delegation control for the task at the computing device 120 based on the recommendation provided by the delegation control model 750.

In at least one example embodiment, the recommendation may be presented to the representative user 722 via the representative computing device 724. The representative user 722 may then decide to generate or update an indication to enable a delegation control for the task at the computing device 120. The computing device 120 associated with the member 118 is generally configured to receive or access the indication for the delegation control and to selectively enable the delegation control in response to the indication.

FIG. 8 shows an alternative illustrative example of an environment 800 including the task facilitation service 102 discussed in the context of FIG. 1. In contrast to the environment 700 of FIG. 7, the environment 800 omits the representative 106, at least to the extent the representative 106 is involved in enabling delegation controls. Stated differently, in the embodiment of FIG. 8, the indication for enabling a delegation control at the computing device 120 of the member 118 may be based on the output of the delegation control model 750 and not subject to the discretion of any intermediaries (e.g., the representative 106).

Similar to the example of FIG. 7, the delegation control model 750 may rely on a member model 709 (updated using member data stored in user datastore 108 and including data pertaining to prior delegation activity of the member 118) and task data store in task datastore 110 for a task to determine the likelihood that the member will delegate the task for completion by the task facilitation service 102. If the output of the delegation control model 750 meets applicable criteria, the task facilitation service 102 may then generate or update an indication regarding enablement of the delegation control for the task at the member computing device 120. For example, if the output of the delegation control model 750 indicates that the member 118 is more likely than not to activate the delegation control, the task facilitation service 102 may update or generate an indication that, when received by the member computing device 120, causes the member computing device 120 to enable the delegation control. Accordingly, instead of merely providing a recommendation regarding whether a delegation control should be enabled at the computing device 120 (as in the case of the embodiment of FIG. 7), the output of the delegation control model 750 in the embodiment of FIG. 8 is used directly by the task facilitation service 102 to selectively enable the delegation control.

Similar processes to those illustrated in FIGS. 7 and 8 may also occur to disable a delegation control at the computing device 120. Following enablement of a delegation control for a task, the task facilitation service 102 may determine that task should no longer be delegated by the member 118. For example, the task facilitation service 102 may determine, based on changes to the user datastore 108, the task datastore 110, the member model 709, or other data and models of the task facilitation service 102, that a task is unlikely to be delegated by the members (e.g., by determining that the likelihood of delegation falls below a certain threshold). Responsive to this determination, the task facilitation service 102 may update an indication associated with the delegation control to disable the delegation control at the computing device 120. Similar to enablement of delegation controls, disablement of delegation controls may be performed automatically by the task facilitation service 102 or based on a decision by an intermediate, such as the representative 106. In embodiments in which the representative 106 is involved, the task facilitation service 102 may provide an alert, message, or other communication to the representative 106 if the task facilitation service 102 determines a delegation control should be disabled to help inform the decision of the representative 106.

Figure 9:
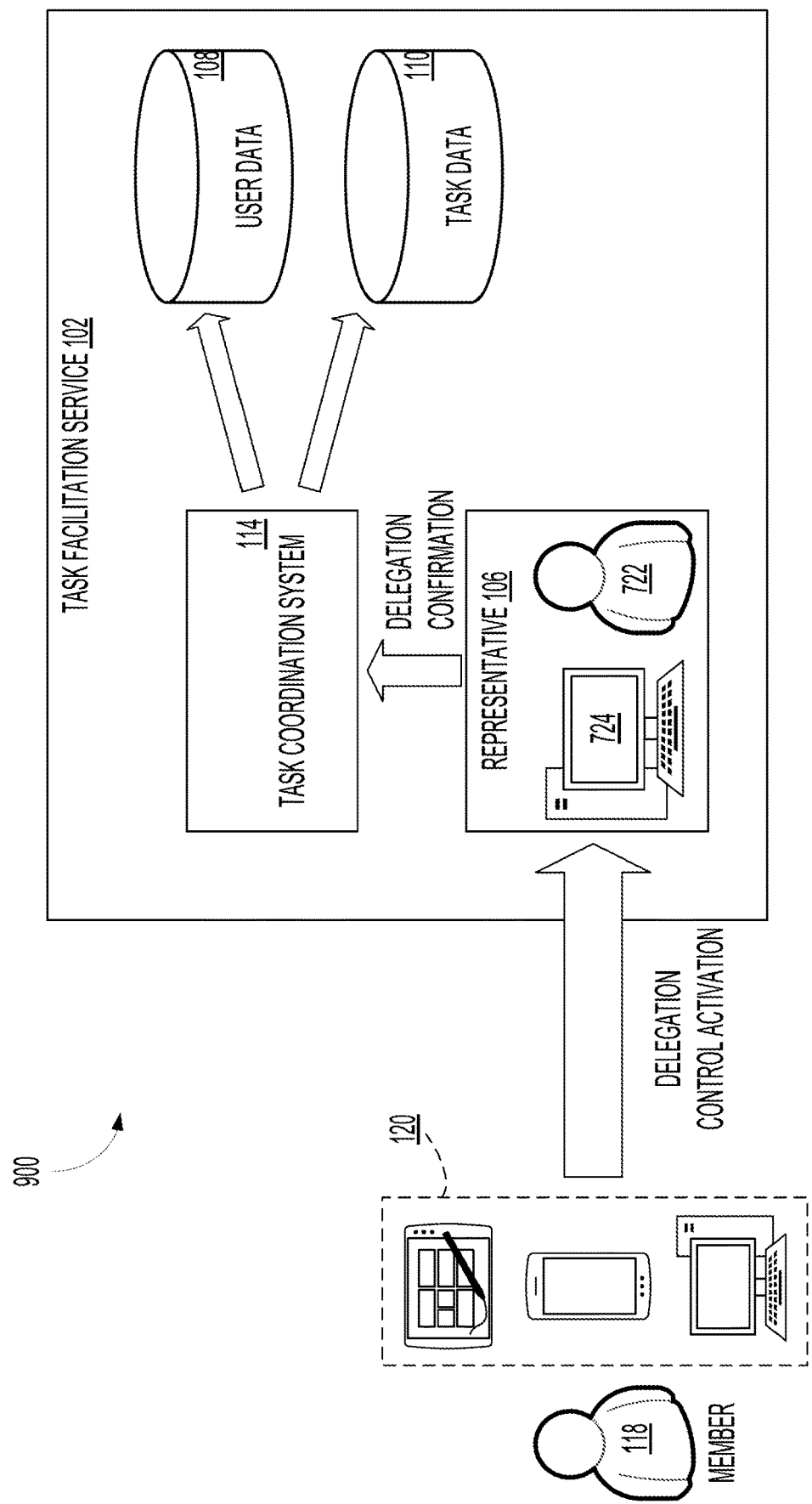
FIG. 9 shows an illustrative example of an environment in which a delegation control at a computing device of a member is activated to delegate a task.

FIG. 9 shows another illustrative example of an environment 900 including aspects of the task facilitation service 102 discussed in the context of FIG. 1 and is intended to illustrate activation of a delegation control at the member computing device 120 by the member 118. In general, activation of a delegation control for a given task by the member 118 causes the computing device 120 to generate or update an indication that the delegation control has been activated and that the corresponding task should be delegated. Responsive to the indication, the task facilitation service 102 updates task data for the task to indicate that the task has been delegated. The task facilitation service 102 may also store data related to the member's interactions with the delegation control. As previously discussed, such interaction data may be used by the task facilitation service 102 to update the member model 709 corresponding to the member 118, the delegation control model 750 (each shown in FIGS. 7 and 8), and other delegation-related models of the task facilitation service 102. Accordingly, activation of the delegation control by the member 118 is used to further refine the models of the task facilitation service 102, thereby improving the models and the overall predictive capabilities of the task facilitation service 102 with respect to delegation.

In addition to updating the models in response to activation of a delegation control by the member, the task facilitation service 102 may also be configured to update models in response to non-activation of an enabled delegation control. For example, in certain embodiments, the member 118 may be able to explicitly reject delegation of a task, e.g., by clicking a button or other user interface element indicating that the member does not want to delegate the task. As another example, non-activation of the delegation control may be determined based on the member 118 initiating completion of a task without activating an enabled delegation control for the task. In yet another example, the delegation control may be subject to a "timeout" in which non-activation is deemed to have occurred if an enabled delegation control is not activated within a certain time. In any of the foregoing cases, non-activation of the delegation control may generally result in the task facilitation service 102 determining the member 118 is unwilling or uninterested in delegating the task and may use such a determination as negative feedback to train models of the task facilitation service 102. In certain embodiments, non-activation of the delegation control may also result in disablement of the delegation control at the computing device 120.

In still other embodiments, models of the task facilitation service 102 may also be updated in response to feedback provided by the representative 106. For example, the member 118 may directly request the representative 106 to delegate a task and may make such a request without a delegation control for the task being enabled or without activating an enabled delegation control for the task. In such cases, the representative 106 may modify the task data for the task to provide that the task is delegated without enabling a delegation control and/or without the member 118 activating a delegation control. As another example, the member 118 may directly instruct the representative 106 that a task is not to be delegated. In such cases, the representative 106 may similarly modify the task data for the task to provide that the task is not to be delegated or, if the task has already been delegated, to undelegate the task. Again, this may occur without enabling a delegation control at the computing device 120 of the member 118. Regardless of a how such delegation-related instructions are provided to the representative 106, subsequent modifications to task data to indicate the delegation status of a task made by the representative 106 may also be used the task facilitation service 102 to inform and update the various delegation-related models of the task facilitation service 102.

As illustrated in the specific example of FIG. 9, following activation of a delegation control at the computing device 120, an indication that the delegation control was activated by the member 118 using computing device 120 is generated, updated, provided, or otherwise made available to the task facilitation service 102. In the specific embodiment of FIG. 9, the indication is received by the representative 106 and presented to a representative user 722 via the representative computing device 724. In response to the representative user 722 confirming delegation of the task, a corresponding indication is provided to the task coordination system 114 which updates each of the user datastore 108 and the task datastore 110 to reflect activation of the delegation control by the member 118 and delegation of the task, respectively. In an alternative embodiment, the representative 106 and confirmation by the representative 106 may be omitted from the process such that receipt of the indication by the task facilitation service 102 causes the task to be delegated and the various datastores to be updated without additional approval or confirmation by the representative 106.

Certain embodiments may support a similar process to that illustrated in FIG. 9 to undelegate a previously delegated task. In at least some embodiments, following activation of a delegation control for a task, the member 118 may provide a second input that toggles the delegation control or activates a second control with toggling the delegation control or activating the second control an undelegation process. In response to toggling of the delegation control or activation of the second control, the computing device 120 may generate, updated, etc. an indicator corresponding to the task to indicate that the task should be undelegated. In response to receiving the indicator, the task facilitation service 102 may undelegate the task, e.g., by updating the task data associated with the task. In certain embodiments, undelegation of a task may be facilitated by the representative 106. For example, in response to receiving the indication from the computing device 120, the task facilitation service 102 may alert the representative 106 and the representative may subsequently initiate communication with the member 118 to collect additional information regarding the task and the member's request to undelegate the task. The representative 106 may subsequently confirm that the task is to be undelegated and the task facilitation service 102 may update the relevant data. Undelegation of a task may also cause the task facilitation service 102 to update delegation-related models such as, but not limited to, the member model 709 and the delegation control model 750 (shown in FIGS. 7 and 8).

As discussed in FIG. 9, member 118 may activate a delegation control enabled at computing device 120 and associated with the task to delegate that task for completion by task facilitation service 102. In general, delegation of the task provides authorization to task facilitation service 102 to complete the task on behalf of member 118 with reduced interaction between task facilitation service 102 and member 118. In certain implementations, delegation may include task facilitation service 102 performing all subsequent steps necessary to complete a task. In other implementations, task delegation may include task facilitation service 102 performing at least certain portions of a task or making certain task-related decisions that would otherwise require input or feedback from member 118 absent delegation.

Figure 10:
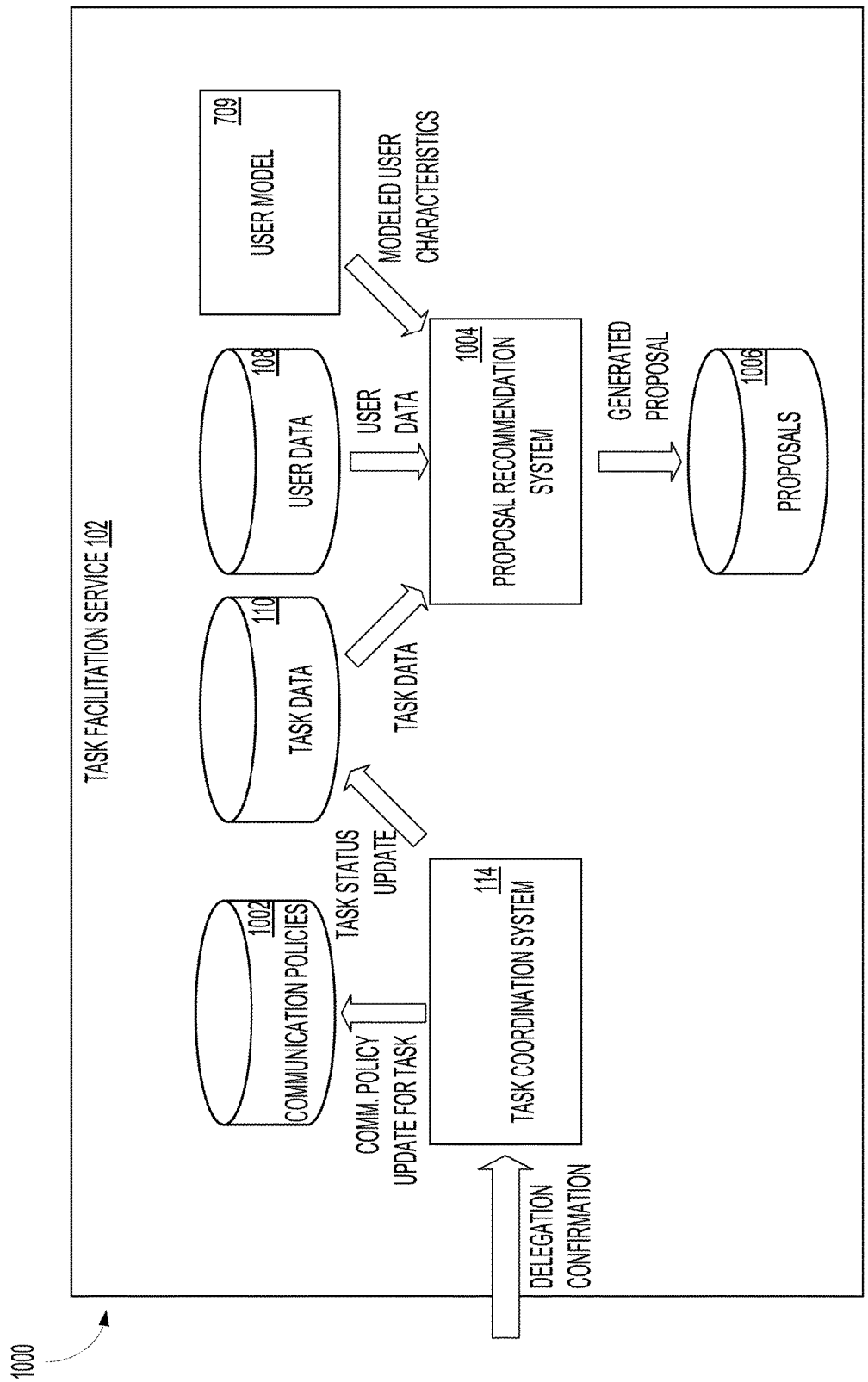
FIG. 10 shows an illustrative example of an environment in which a task delegation service processes a delegation confirmation for a task.

FIG. 10 illustrates an example computing environment 1000 including task facilitation service 102. As illustrated in FIG. 10, task facilitation service 102 may include task coordination system 114. Task coordination system 114 is illustrated as having access to or otherwise being able to update task datastore 110 and communication policies 1002, as further described below. Computing environment 1000 further illustrates task facilitation service 102 including a proposal recommendation system 1004. Proposal recommendation system 1004 is also discussed below in further detail below; however, by way of introduction, proposal recommendation system 1004 generally accesses task data for the delegated task from task datastore 110 and user data from user datastore 108 to generate a proposal for completing the delegated task. Following generation of a proposal, task facilitation service 102 may store the proposal in a proposal datastore 1006.

As shown in FIG. 10, task coordination system 114 (or other element of task facilitation service 102) may receive a delegation confirmation for a task. Such confirmation may be received, for example, in response to member 118 activating a delegation control at computing device 120 corresponding to the task. Notably, while this disclosure primarily discusses task delegation occurring in response to activation of a delegation control presented to member 118 at computing device 120, tasks may be delegated in other ways. For example, member 118 may request that representative 106 delegate a task for completion by task facilitation service 102 and representative 106 may subsequently update the task accordingly. Such interactions may occur independent of enablement or activation of a delegation control at computing device 120. Similarly, while the process of making delegation available is generally discussed herein as being selectively controlled by task facilitation service 102 (e.g., by selectively enabling delegation controls), in certain embodiments, delegation may be more generally available. So, for example, member 118 may be free to indicate that a task is to be delegated at any time, including at creation of the task or during completion of the task. Delegation may still be subject to certain restrictions, such as legal or policy restrictions (e.g., age or budget restrictions for certain purchases), timing limitations, or practicality. In such cases, delegation may not be made available or attempts to delegate the task by the member 118 may be met with an error or notification from task facilitation service 102 indicating that the task may not be delegated, initiation of communication with representative 106 to discuss delegation in further detail, or similar steps.

Considering the foregoing, while this disclosure describes enablement and activation of delegation controls to delegate tasks, certain aspects of this disclosure are directed to processes and features related to post-delegation activity. Such post-delegation activity may occur regardless of the mechanism by which a task has been delegated and, as a result, may be implemented separately and independently from other aspects of this disclosure related to enablement and activation of delegation controls.

Task coordination system 114 may also update a communication policy of communication policies 1002 associated with the task in response to receiving the delegation confirmation. In the context of the present disclosure, communication policies 1002 refer to rules, logic, models, or similar elements used by task facilitation service 102 to determine when communications with member 118 are to occur and the nature of those communications. For example, communication policies 1002 may include rules for use by task facilitation service 102 that dictate whether a communication is to be provided to member 118 through computing device 120 and the contents of such communication. In the context of task delegation, task facilitation service 102 may update communication policies 1002 in response to receiving a delegation confirmation from member 118 such that at least some communications between task facilitation service 102 and member 118 that would have occurred absent delegation no longer occur. Stated differently, when member 118 delegates a task to task facilitation service 102, task facilitation service 102 reduces communications with member 118 and corresponding involvement by member 118 in completing the associated task. By doing so, cognitive load on member 118 may be reduced.

Delegation of a task will generally result in task facilitation service 102 determining and applying a communication policy for the task that reduces communication between task facilitation service 102 and member 118 relative to a communication policy applied to the task prior to delegation. The reduction in communication may be complete or substantially complete in cases where task facilitation service 102 has sufficient information and authorization to complete the task. In such cases, communication following delegation may be limited to a confirmatory notification or similar message upon completion of the task. At the other extreme, the communication policy applied by task facilitation service 102 following delegation may cause only a partial or relatively nominal reduction of communication between task facilitation service 102 and member 118. For example, even though member 118 may delegate a task, task facilitation service 102 may lack sufficient information or authorization to effectively determine the scope and/or complete the task. In such cases, communication between task facilitation service 102 and member 118 may not substantially change before and after delegation unless and until additional information and/or authorization is provided by member 118. Notably, in at least certain implementations, task facilitation service 102 may dynamically determine and apply communication policies as information and/or authorization are provided by member 118. Stated differently, task facilitation service 102 may reevaluate the communication policy applied to a delegated task to ensure that the communication policy best reflects the delegated task. In general, however, task facilitation service 102 may be biased toward communication policies that reduce communication between task facilitation service 102 and member 118 with the goal of reducing involvement by and cognitive load of member 118.

After task facilitation service 102 updates task data for the task to indicate delegation and determines what communication policy to apply to the delegated task, task facilitation service 102 may generate a proposal using proposal recommendation system 1004. For purposes of the present disclosure, a proposal generally refers to a fully or substantially defined plan for completing a task. In general, a proposal will include substantially all details necessary for task facilitation service 102 to complete a particular task and may further include a general course of action for completing the task. In instances when a task is not delegated, task facilitation service 102 may generate multiple proposals for a particular task, with each proposal corresponding to an option for completing the task. Member 118 may then review and select one of the generated proposals for execution by task facilitation service 102.

As previously discussed herein, generating a proposal may include accessing and completing a relevant proposal template. For example, task facilitation service 102 may maintain a store of templates for different task types. Proposal recommendation system 1004 may then determine and select one of the available templates for use with the current task. For example, proposal recommendation system 1004 may determine which template to use based on the task data associated with the task or parameters of the task. Task facilitation service 102 may then fill fields, select options, or otherwise modify the template to generate a complete proposal for the task. In certain implementations, the process of generating a proposal may be performed, at least in part, by representative 106. For example, representative 106 may be prompted to select a template for a task and complete the template to the extent possible. To aid in completion of the proposals, representative 106 may be given access to task data, user data, and predictions from member model 709. Alternatively, one or more of selecting and completing a template may be performed by an artificial intelligence or machine learning model/algorithm based on available task data, user data, and modeled user characteristics. The general process of completing a proposal, particularly as it relates to determining missing information for delegated tasks, is described below in further detail in the context of FIG. 11.

When member 118 delegates a task to task facilitation service 102, task facilitation service 102 may have sufficient authority and information to complete the delegated task. In such instances, generating and presenting multiple proposals may not be necessary; however, task facilitation service 102 may nevertheless generate a proposal for the delegated task. For example, in certain embodiments, task facilitation service 102 may be configured to generate a single proposal for a delegated task which will be followed by task facilitation service 102 to complete the task or may generate multiple proposals for a delegated task and select one proposal for completing the task independent of any input from member 118.

Although proposal generation may not be necessary for a delegated task, generating and storing proposals for delegated tasks has several benefits. Among other things, a proposal for a delegated task may act as a record of the delegated task and its completion. The proposal may further serve as a guide for completing the task for representative 106 or third parties. In certain implementations, proposals for delegated tasks may also provide data for training and updating models of task facilitation service 102, such as models related to generating proposals for either of delegated or undelegated tasks. Accordingly, after proposal recommendation system 1004 generates a proposal, proposal recommendation system 1004 may transmit or otherwise provide the generated proposal to a proposal datastore 1006. As previously noted, proposals stored in proposal datastore 1006 may subsequently be accessed by member 118, representative 106, or other parties, e.g., to facilitate completion of the corresponding task, to review the task and its completion, and the like.

Figure 11:
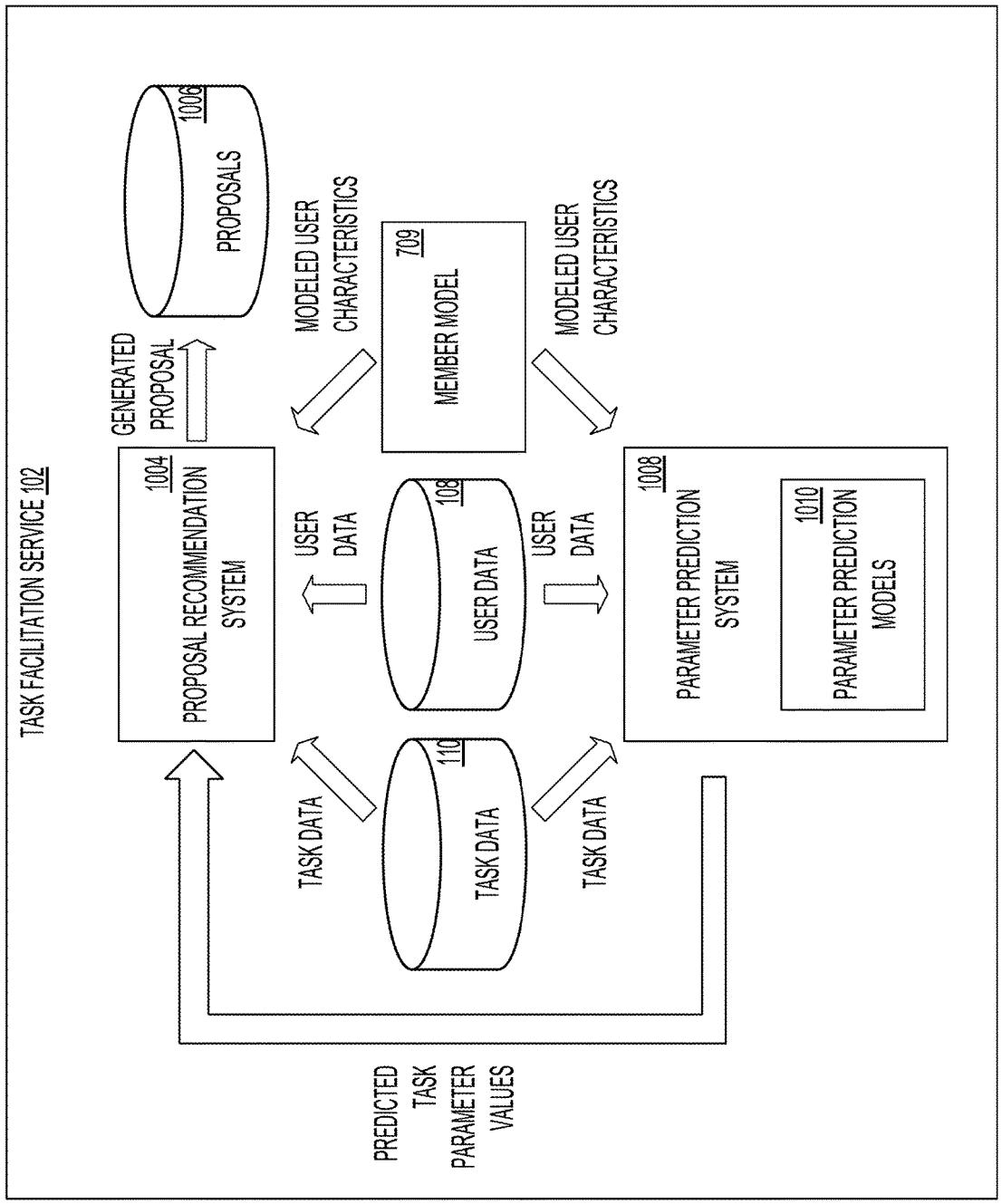
FIG. 11 shows an illustrative example of an environment in which a task delegation service generates a proposal for a delegated task including prediction of missing task parameter values.

Referring to FIG. 11, another illustration of an environment 1100 including task facilitation service 102 is provided to further illustrate generation of proposals for delegated tasks. In general, environment 1100 assumes that task facilitation service 102 has received an indicator that a task is to be delegated. In response task facilitation service 102 has updated task data for the task (e.g., stored in task datastore task datastore 110) to indicate that the task is to be delegated and has selected and applied a corresponding communication policy (e.g., as maintained in communication policies 1002, shown in FIG. 10) to the task to inhibit communication between task facilitation service 102 and member 118.

As shown in FIG. 11, task facilitation service 102 includes a proposal recommendation system 1004 that may receive data from each of task datastore 110, user datastore 108, and member model 709 to generate a proposal for completing the delegated task. Notably, depending on when member 118 delegated the task, task facilitation service 102 may not have sufficient information or authority to generate a proposal. In such instances, task facilitation service 102 may take various actions to obtain the outstanding information to complete the proposal generation process.

With respect to authority from member 118, task facilitation service 102 may generally maintain a list of permissions, settings, etc., for member 118 that preemptively authorize task facilitation service 102 to complete one or more tasks on behalf of member 118 that are within the scope of the permissions. For example, member 118 may set a maximum budget for tasks involving purchases. Task facilitation service 102 may subsequently make a purchase below the budget without any additional approval or permission from member 118. As another example, member 118 may provide certain permissions or authority to task facilitation service 102 such that task facilitation service 102 may act on behalf of member 118 when performing certain tasks. For example, member 118 may authorize task facilitation service 102 to make certain appointments (e.g., doctor, dentist, etc.) or similar commitments on behalf of member 118.

To the extent task facilitation service 102 does not have authority for an aspect of a proposal, task facilitation service 102 may solicit authority from member 118. In certain implementations, task facilitation service 102 may transmit a notification, message, or similar communication to member 118 via computing device 120 that prompts member 118 to provide the required authority. In other implementations, task facilitation service 102 may transmit a notification, message, or similar communication to representative 106 to prompt representative 106 to contact member 118 regarding authority to complete the delegated task. If task facilitation service 102 receives authority from member 118, task facilitation service 102 may proceed with completing the task as delegated. Alternatively, if task facilitation service 102 does not receive sufficient authority from or is denied authority by member 118, task facilitation service 102 may revoke delegation for the task. As discussed below in further detail, revocation of delegation may include updating a status of the task in task datastore 110 to indicate that the task is no longer delegated and applying a new communication policy for the task that generally increases communication between task facilitation service 102 and member 118. Stated differently, if task facilitation service 102 does not receive proper authority to complete a delegated task, task facilitation service 102 may automatically undelegate the task, but may still proceed with completion of the undelegated task albeit with any increased interaction with member 118 required to do so.

In addition to having proper authority to complete a delegated task, task facilitation service 102 must also have sufficient information regarding the task and the user to properly scope the task for completion and generate a corresponding proposal. In at least certain implementations, when proposal recommendation system 1004 begins generating a new proposal, proposal recommendation system 1004 may populate a proposal template with relevant information available to proposal recommendation system 1004. For example, proposal recommendation system 1004 may access a proposal template that includes checkboxes, fields, etc. for information about member 118 (e.g., name, address, etc.) and task-specific details. Proposal recommendation system 1004 may then access task datastore 110, user datastore 108, and other information available to task facilitation service 102 to populate the template. For example, when member 118 originally created the delegated task, member 118 may have provided information regarding the type of task, a deadline for the task, a budget for the task, and any special conditions or instructions that may apply to the task. Accordingly, when proposal recommendation system 1004 generates a proposal for the task, proposal recommendation system 1004 may use the information provided by member 118 during task creation to populate the proposal template to the extent possible.

In at least certain instances, member 118 may not have provided all information required to complete the proposal. For example, for a birthday party planning task, member 118 may provide general information about who the party is for and when and where the party is to be held but may not specify details regarding what food to order. As another example, member 118 may have a task to plan a vacation to a particular city and may provide general details about the timing of the vacation but may not provide any specific instructions regarding accommodations or an itinerary for the trip.

For purposes of the following discussion, task details are generally referred to as task parameters and each task parameter of a task is generally referred to as having a task parameter value. Accordingly, when a task is delegated and substantially all task parameters values are available to task facilitation service 102, task facilitation service 102 may proceed with generating a corresponding proposal (e.g., using proposal recommendation system 1004). If, on the other hand, certain task parameter values have not been provided or are otherwise unavailable, task facilitation service 102 may take additional steps to determine or predict the missing task parameter values.

In certain implementations, task facilitation service 102 may present task parameters for which values are missing to representative 106. Representative 106 may then provide the missing information based on past experiences of representative 106 with member 118. For example, task facilitation service 102 may present the missing information/details to representative 106 for review and completion. To do so, representative 106 may be presented with a user interface in which tasks of member 118 are displayed. To the extent information is missing for a delegated task, the user interface may include a corresponding indicator for the delegated task. Representative 106 may then select the delegated task to be prompted with the missing information or presented with a task detail screen listing the missing information. Representative 106 may then be given an opportunity to provide the missing information. As another example, representative 106 may be presented with a preliminary draft of the proposal for review. The preliminary draft may highlight or otherwise note missing information for review and resolution by representative 106. Representative 106 may then select any fields, etc. for which information is missing to be prompted to provide the missing information.

In certain implementations, task facilitation service 102 may instead infer task parameter values from past activity of member 118. As illustrated in FIG. 11, for example, task facilitation service 102 may include a parameter prediction system 1008 that may receive any of task data, user data, and modeled user characteristics (e.g., from member model 709) to predict missing task parameter values.

Parameter prediction system 1008 may include or have access to various prediction models and algorithms, which are collectively referred to herein as parameter prediction models 1010, to facilitate prediction of task parameter values. Parameter prediction models 1010 may include different models to predict different parameters and may further include models specific to member 118. However, in general, models of parameter prediction models 1010 may receive a feature vector of task data and/or user data as input and output a corresponding predicted value for a task parameter.

Although parameter prediction models 1010 may use any suitable model to predict a parameter value, in implementations in which the parameter value is binary or otherwise limited to predetermined values, parameter prediction models 1010 may implement a classification model or algorithm that identifies one of the limited values based on the provided feature vector.

By way of example, task facilitation service 102 may be tasked with ordering a family dinner for a date provided by member 118. User datastore 108 may generally include details regarding the family of member 118 including the number of family members, their ages, and general food preferences. However, member 118 may not provide any specific details regarding the type of food to be ordered. Stated differently, the type of food to be ordered is a parameter of the delegated task for which a parameter value is missing. Accordingly, task facilitation service 102 may rely on parameter prediction system 1008 to predict a satisfactory type of food for the dinner. To do so, parameter prediction system 1008 may access details of prior dinner orders completed by task facilitation service 102 maintained in task datastore 110 and determine what types of foods member 118 tends to order to generate an initial shortlist of food types. Parameter prediction system 1008 may then rely on a model of parameter prediction models 1010 to determine which food type to order. As a non-limiting example, the model may receive as input preference data for family members (e.g., as maintained in user datastore 108) as well as task data for the present ordering task. The feature vector may also include details for the last meal ordered on behalf of member 118 to prevent reordering food that the family may have only recently enjoyed. The model may then output a selection (e.g., a food type parameter value) from the shortlist of food types.

In other cases, parameter values may be continuous or otherwise fall within a range of potential values. In such cases, parameter prediction system 1008 may instead rely on a regression-type model to predict the corresponding parameter value.

Again, by way of example, member 118 may delegate a task to purchase a birthday present to task facilitation service 102. Member 118 may provide some details regarding who the gift is for and the relationship of member 118 to the recipient but may not specify a budget for the gift. Stated differently, the budget is a parameter of the delegated task for which a parameter value is missing. To determine a budget, parameter prediction system 1008 may rely on a gift budget model of parameter prediction models 1010. Among other things, the gift budget model may receive as input a feature vector including available details for the gift to be purchased. The feature vector may also include other data such as a maximum authorized budget that may be generally applicable to member 118. In response to receiving the feature vector, the gift budget model may generate and output a budget amount (e.g., a budget amount parameter value) for inclusion in the proposal for the generated task.

As noted above, models of parameter prediction models 1010 may consider either or both of task data and user data when determining a missing parameter value for a delegated task. Task data may include any parameters and corresponding parameter value that for the task. For example, task data may include a deadline for the task, a cost of completing the task, a type of the task, a complexity of the tasks (e.g., the number of steps or sub-tasks that may be involved), a geographic location associated with the task, a current status of the task, and any other similar information regarding the nature and scope of the task. User data, on the other hand, may correspond to specific information about member 118, such as information regarding the preferences, behavior, personality, demographics, and other similar characteristics of member 118. Such user data may be incorporated into or generated by member model 709 such that the parameter value generated by parameter prediction system 1008 may be tailored specifically to member 118. For example, member model 709 may include various parameters corresponding to various aspects of member 118, such as whether member 118 tends to be budget conscious, prefers tasks be completed with relatively immediacy, is generally open minded and tolerant of deviation from past activity, and the like. Such user-specific parameters may accordingly be provided to parameter prediction system 1008 and parameter prediction models 1010 for use by parameter prediction models 1010 in predicting task parameter values. For example, in the context of the previous budget example, the gift budget model of parameter prediction models 1010 may be configured to receive a metric indicating the budget consciousness of member 118, which, in turn, may be one of several parameters maintained in member model 709. As another example and referring to the previous dinner choice example, member model 709 may include a metric indicating how adventurous or novelty seeking member 118 tends to be. This novelty seeking metric may be used by a model of parameter prediction models 1010 to influence whether to select a food option that is "tried and true" for member 118 and his or her family or to select a food option that may be atypical for member 118.

As another example, parameter prediction models 1010 may include various weightings, coefficients, or similar parameters that may be modified based on characteristics of member 118 captured in member model 709. For example, when determining a particular parameter value, a model of parameter prediction models 1010 may receive a feature vector including features of the corresponding task as well as a coefficient/weighting vector that may be based, at least in part, on user-specific characteristics of member 118 as captured in member model 709. The feature vector of task data may subsequently be used as input to the model while the coefficient vector based on member model 709 may be used to tune the model for a prediction tailored to member 118.

Parameter prediction models 1010 may include models and algorithms that rely on either supervised or unsupervised learning. To the extent parameter prediction models 1010 include models or algorithms based on supervised learning, training data for such models may be based on previous interactions with and activity of member 118. For example, in certain implementations, training data may be generated by member 118 or representative 106 providing missing parameter values. Alternatively, parameter values be inferred from communications between member 118 and representative 106, e.g., by analyzing chat logs or similar communications (e.g., using a suitable natural language processing algorithm) from when the task was created.

In at least certain implementations, training data for parameter prediction models 1010 may be based on data collected from other members, particularly when member 118 does not have a long history of interactions with task facilitation service 102. Notably, to the extent parameter prediction models 1010 rely on other members for training data, such training data may be tailored such that the other members are from a similar demographic or share characteristics with member 118 (e.g., as captured by the member models for the other members).

Task facilitation service 102 may also request missing parameter values directly from member 118, such as when a task is generated and delegated with missing parameters that are relatively critical to completing the task but cannot be ascertained by representative 106 based on his or her experience with member 118, inferred using parameter prediction models 1010, or otherwise determined without interaction with member 118. For example, member 118 may be associated with a task to purchase a gift, but the task may lack information regarding who the gift is for or relevant characteristics of the recipient. In certain implementations, such tasks may be precluded from delegation to task facilitation service 102 in the first instance. Alternatively, member 118 may delegate such tasks to task facilitation service 102 subject to or pending provision of the additional information. To obtain the missing information, task facilitation service 102 may transmit a request, message, notification, or similar communication to member 118 through computing device 120 or may otherwise indicate that information is required from member 118 before the task. The user interface presented at computing device 120 may then permit member 118 to directly input the missing details, to open a communication session with representative 106 to provide the missing details, etc.

Figure 12A:
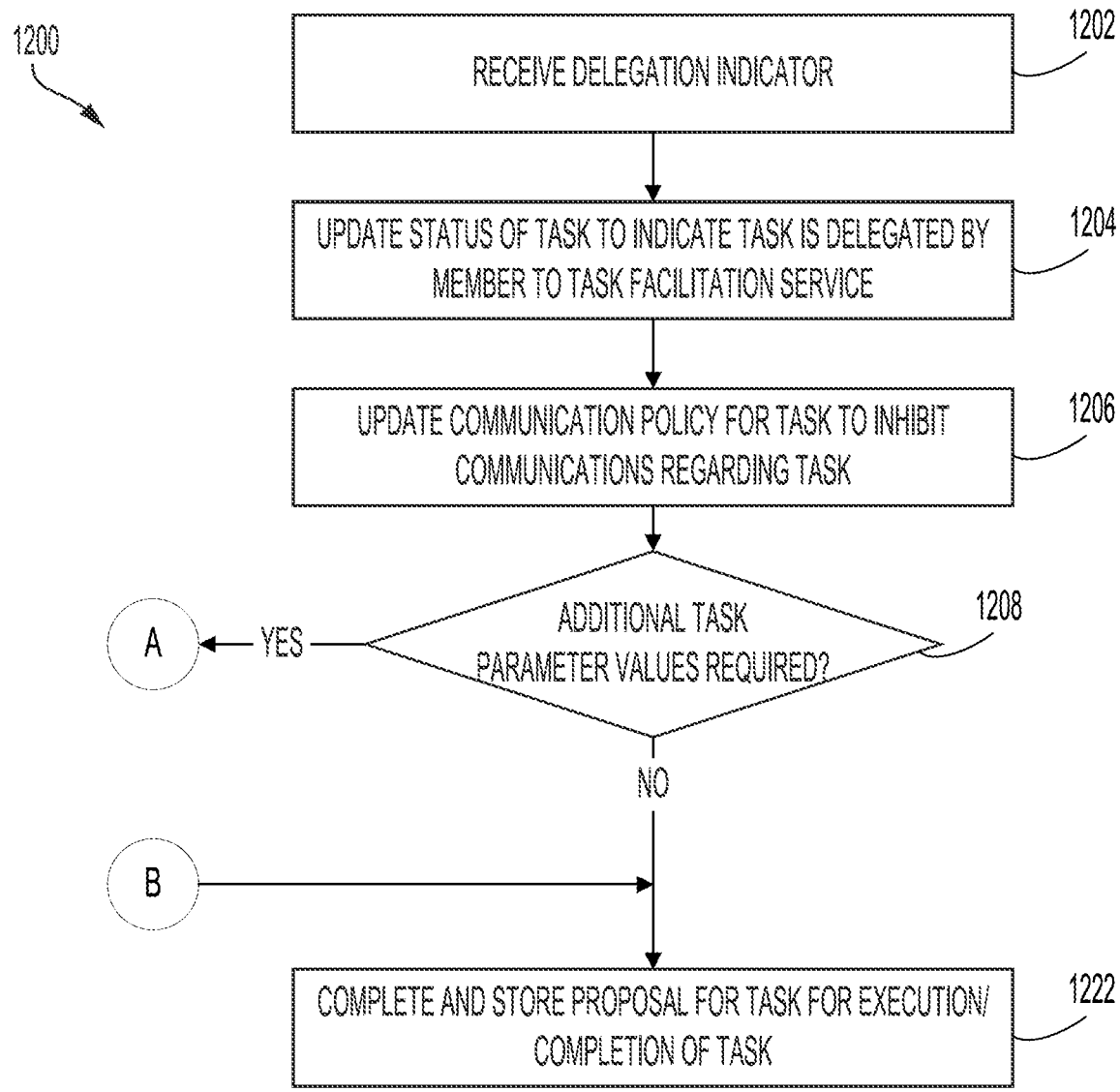
FIGS. 12A and 12B show a flow chart illustrating a method for updating communication policies and generating a proposal for a task in response to delegation of the task.
Figure 12B:
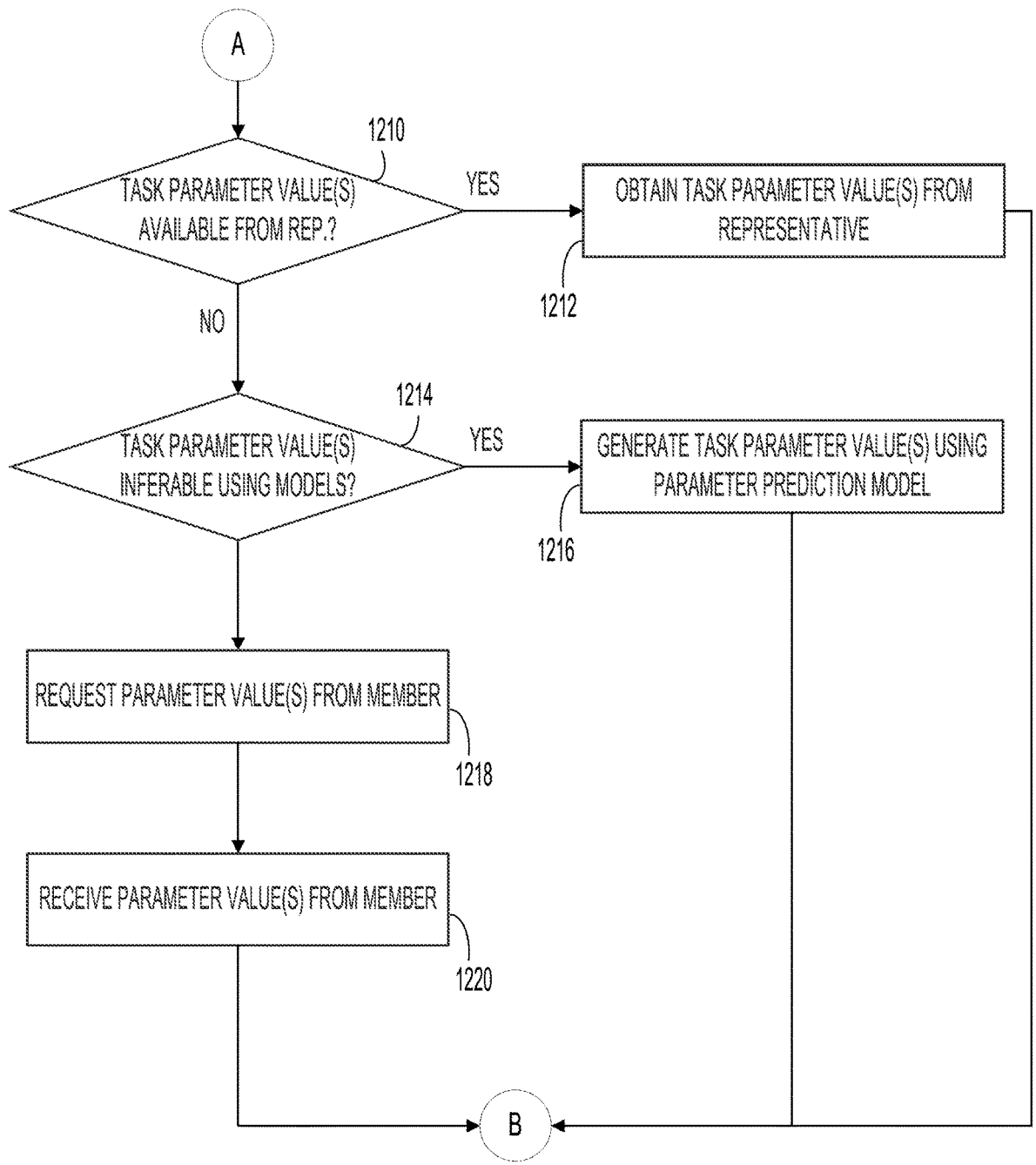

FIGS. 12A and 12B illustrate a flow chart for a method 1200 for delegating a task for completion by a task facilitation service. Reference in the following discussion is made to certain elements and features of the preceding figures, specifically elements of FIGS. 7-11. Any such references are intended to provide context to method 1200 and are intended to be non-limiting.

At step 1202, task facilitation service 102 receives a delegation indicator for a task from member 118. In at least certain implementations, the delegation indicator may be generated in response to member 118 activating a delegation control for a task presented at computing device 120. As discussed herein, task facilitation service 102 (including representative 106) may dynamically enable the delegation control for the task at computing device 120 in response to determining that delegation of the corresponding task is possible and/or recommended.

Implementations of the present disclosure are not limited to task facilitation service 102 receiving the delegation indicator in response to member 118 activating a delegation control. Rather, task facilitation service 102 may receive any suitable delegation indicator from any suitable source. For example, in certain instances, the delegation indicator for a task may be received from representative 106 instead of from member 118, e.g., in response to member 118 communicating to representative 106 that a given task should be delegated.

At step 1204, task facilitation service 102 updates task data associated with the task to indicate that the task is delegated to task facilitation service 102 for completion. For example, task datastore 110 may include records for each task associated with member 118 with each record including a delegation status field, flag, value, etc. Accordingly, in response to task facilitation service 102 receiving a delegation indicator for a task at step 1202, task facilitation service 102 may update the delegation status of the task in task datastore 110 to indicate the task is delegated.

At step 1206, task facilitation service 102 determines and applies a communication policy for communications related to the delegated task. As discussed herein, communication policies generally refer to rules, logic, models, or similar elements used by task facilitation service 102 to determine when communications with member 118 are to occur and the nature of those communications. Accordingly, prior to delegation, a task may be subject to a first communication policy that may permit relatively liberal communication between task facilitation service 102 and member 118. Following delegation of the task, task facilitation service 102 may identify and apply a second communication policy for communications related to the delegated task. In general, the second communication policy may be stricter in the sense that it may reduce, restrict, or otherwise inhibit communication between task facilitation service 102 and member 118 relative to the first communication policy.

As discussed herein, inhibiting communication between task facilitation service 102 and member 118 may include anything up to and including preclusion of all communication between task facilitation service 102 and member 118 relative to the task. However, inhibition may also include allowing all communications that would have been permitted prior to delegation, albeit with an added check, confirmation, or similar step required. For example, representative 106 may try to open communications with or transmit a message to member 118 related to a delegated task. In response, task facilitation service 102 may prompt representative 106, reminding representative 106 that the task is delegated and requesting confirmation to initiate/transmit the communication. Although task facilitation service 102 does not completely prohibit communication between representative 106 and member 118 in this case, task facilitation service 102 injects additional friction into the communication process such that representative 106 is encouraged to consider whether the communication with member 118 is necessary.

In a basic example, task facilitation service 102 may be configured to implement only two communication policies: a first communication policy for undelegated tasks and a second communication policy for delegated tasks. Accordingly, determining which communication policy applies may include task facilitation service 102 checking whether a delegation status, flag, etc. of the task indicates the task is delegated. If so, task facilitation service 102 may implement the second communication policy.

In other instances, task facilitation service 102 may implement multiple communication policies which may vary according to any relevant parameter in addition to whether a task has been delegated to task facilitation service 102. For example, task facilitation service 102 may be configured to implement communication policies for delegated tasks that differ based on the type of delegated task, the complexity of the delegated task, the budget for the delegated task, the deadline for the delegated task, and the like.

By way of non-limiting example, task facilitation service 102 may be configured to implement different communication policies based on task budget. To the extent a delegated task has a higher task budget, the communication policy may include transmitting general updates and notifications regarding the status of the delegated task. Among other things, such nominal communications may reduce anxiety and stress of member 118 regarding the delegated task given the potential expenditures involved. Stated differently, the cognitive load and stress for member 118 due to not knowing when and how money is being spent for high-cost tasks may outweigh the cognitive load for member 118 associated with receiving occasional updates. In contrast, task facilitation service 102 may be configured to implement a communication policy with no or relatively minimal communication between task facilitation service 102 and member 118 for delegated tasks with no expenditures or relatively low budgets. In such cases, the cognitive load and stress for member 118 associated with receiving reminders and notifications for the task may outweigh that caused by member 118 not being fully informed of how and when funds are being spent given the relatively nominal amounts involved.

As another example, communication policies may differ based on the type of task delegated to task facilitation service 102. For example, certain tasks (e.g., planning an upcoming party, planning a vacation, buying tickets for a sporting or entertainment event, etc.) may have an inherent element of fun and excitement for member 118 while others (e.g., scheduling gutter cleaning, setting up a dentist appointment, etc.) may be relatively mundane. Accordingly, if a delegated task has a task type associated with fun and entertainment, task facilitation service 102 may adopt a communication policy that permits communication between task facilitation service 102 and member 118. Stated differently, when a delegated task has a high level of potential interest for member 118, task facilitation service 102 may opt for a communication policy with a higher frequency or more liberal conditions for communication, reminders, etc., under the assumption that such communications will result in a positive response from member 118. In contrast, task facilitation service 102 may opt for a communication policy with lower frequency of communication, reminders, etc., when the delegated task is more mundane or has a generally negative association for member 118. In such cases, receiving reminders and updates for such tasks may result in a neutral or even negative response from member 118 and, as a result, may be avoided by implementing an appropriate communication policy that reduces communications between task facilitation service 102 and member 118.

Task facilitation service 102 may similarly be configured to implement communication policies for delegated tasks that differ based on characteristics of member 118, including characteristics captured in member model 709. For example, member model 709 may include a parameter indicating the tendency or preference of member 118 to manage and be involved in task completion (e.g., a micro-manager metric). To the extent member 118 generally prefers to be involved in task completion, task facilitation service 102 may select a communication policy that permits more notifications, reminders, updates, etc., for the delegated task. Conversely, if the parameter generally indicates that member 118 tends to be "hands off", task facilitation service 102 may select a communication policy with relatively limited communications.

As another example, task facilitation service 102 may consider how long member 118 has worked with task facilitation service 102 or how often member 118 has delegated a task in determining a communication policy for the delegated task. For example, if member 118 is relatively new to task facilitation service 102 or task delegation, task facilitation service 102 may determine that a communication policy that permits or includes more frequent reminders, notifications, etc., may be appropriate to help member 118 become familiar and confident with task delegation and task facilitation service 102. Conversely, if member 118 is a longtime user of task facilitation service 102 with many previously delegated tasks, task facilitation service 102 may determine a communication policy with relatively limited communication is more appropriate.

Notably, communication policies for delegated tasks may be dynamic. For example, task facilitation service 102 may determine a first communication policy for a delegated task and may subsequently reevaluate whether a second communication policy may be more appropriate. Changes in communication policies for delegated tasks may be the result of changes in task data, user data, or member model 709, among other things. Task facilitation service 102 may also change a communication policy for a delegated task in response to receiving feedback from member 118. For example, member 118 may submit an inquiry to task facilitation service 102 (e.g., through representative 106) regarding the status of a delegated task. In response, task facilitation service 102 may provide the status of the delegated task to member 118 but may also change the communication policy applied to the delegated task to provide periodic notifications to member 118 going forward. The converse situation may be true as well, with task facilitation service 102 changing the communication policy for a delegated task to include fewer communication in response to member 118 indicating that such communications are unnecessary or undesired.

At step 1208, task facilitation service 102 determines whether additional task parameter values are required for task facilitation service 102 to complete the task. As previously discussed, a task managed by task facilitation service 102 may generally include task parameters and corresponding task parameter values that define the scope of the task. Accordingly, when a task is delegated task facilitation service 102 may determine whether sufficient task parameter values are available for the delegated task such that completion is possible.

In one specific example, task facilitation service 102 may identify missing task parameter values by retrieving a proposal template for the delegated task and identifying any fields or portions of the template for which task facilitation service 102 lacks adequate information to complete. In another example, task facilitation service 102 may access a record associated with the delegated task (e.g., from task datastore 110) and may determine if any fields of the record are empty or otherwise missing data. More generally, however, task facilitation service 102 may determine whether task facilitation service 102 has sufficient information to scope and complete the delegated task in any suitable way.

If additional task parameter values are required, at step 1210, task facilitation service 102 attempts to obtain the missing information. Among other ways, task facilitation service 102 may do so by requesting the information from representative 106, predicting the missing information using a corresponding model, or requesting the information from member 118.

In at least certain implementations, task facilitation service 102 may contact representative 106 to determine if representative 106 may provide the missing task parameter values (step 1210). If so, task facilitation service 102 obtains the missing task parameters values from representative 106 at step 1212. For example, in response to determining a task parameter value is missing at step 1208, task facilitation service 102 may transmit a request for the missing values or a notification that values are missing to representative 106. Representative 106 may then provide the missing values to the extent known by representative 106 or indicate that representative 106 does not know or otherwise have access to the missing parameter values.

In other implementations, representative 106 may be provided with a user interface that displays task information for member 118, including an indication of any missing task parameter values. For example, the user interface may include a list of tasks for member 118. To the extent a delegated task lacks sufficient information to complete, a visual or other indicator may be provided in a manner associated with the delegated task. Representative 106 may then select the task to see what information is missing and to provide the missing information to the extent known by representative 106. In certain implementations, selecting a task may cause task facilitation service 102 to present representative 106 with a partially completed proposal with missing information highlighted for review and completion by representative 106.

Task facilitation service 102 may also determine whether missing task parameter values may be predicted using corresponding models of task facilitation service 102 at step 1214. Details regarding the process by which task facilitation service 102 may do so are provided above in the context of FIG. 11 and may include the use of a parameter prediction system 1008. In at least certain implementations, parameter prediction system 1008 may include parameter prediction models 1010 for predicting task parameter values using various machine learning and artificial intelligence-based algorithms and models. Accordingly, to the extent possible, task facilitation service 102 may generate task parameter values using parameter prediction system 1008 at step 1216.

Task facilitation service 102 may request the missing task parameter values from member 118 at step 1218 and receive the requested parameter values at step 1220. For example, task facilitation service 102 may transmit a notification or cause a prompt to be presented to member 118 at computing device 120 requesting any missing information. Alternatively, task facilitation service 102 may provide a list of outstanding information to representative 106 with the intent that representative 106 communicate with member 118 to resolve any outstanding issues. In general, requesting missing parameter values from member 118 may be considered by task facilitation service 102 as a last resort when other methods not requiring interaction with member 118 have been exhausted.

Notably, method 1200 generally assumes that any missing task parameter values may be resolved by either representative 106, a predictive model, or member 118. However, to the extent certain task parameter values cannot be resolved, task facilitation service 102 may take various actions including, but not limited to, revoking delegation status of the task, and adjusting a communication policy for the delegated task, accordingly.

After all missing parameter values have been resolved, task facilitation service 102 may generate or complete a proposal for the delegated task at step 1222. For example, in certain cases, task facilitation service 102 may have previously selected a proposal template at step 1208 when identifying any missing task parameter values. In such cases, task facilitation service 102 may complete the template identified in step 1208 with available task parameter values, including those obtained in steps 1210-1220. Alternatively, if task facilitation service 102 has not previously identified a proposal template, task facilitation service 102 may do so at step 1208 and complete the proposal template, accordingly. Task facilitation service 102 may then store the proposal for subsequent use in completing the delegated task.

Figure 13:
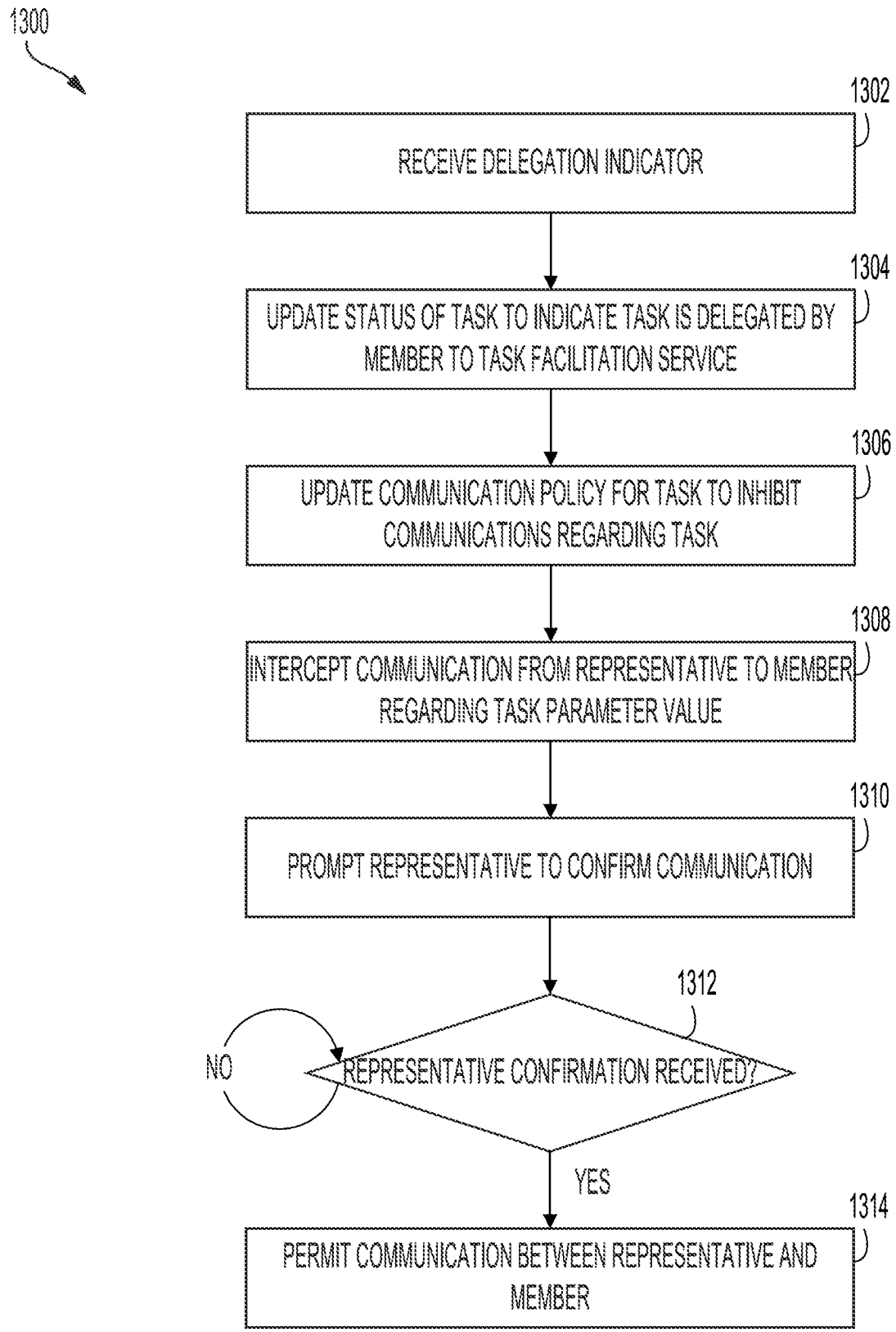
FIG. 13 shows a flow chart illustrating a method for inhibiting communication for a task between a representative of a task facilitation service and a member responsive to delegation of the task.

FIG. 13 illustrates a flow chart for a method 1300 for inhibiting communication between representative 106 and member 118 for a task delegated by member 118 to task facilitation service 102. In general, method 1300 may be implemented to preclude or inhibit communication between representative 106 and member 118 in response to a restrictive communication policy being applied to a task following delegation.

At step 1302, task facilitation service 102 receives a delegation indicator for a task from member 118. As previously discussed in the context of step 1202 of method 1200, the delegation indicator may be generated and received in any suitable way; however, in at least certain implementations the delegation indicator may be generated in response to member 118 activating a delegation control for a task presented at computing device 120.

At step 1304, task facilitation service 102 updates task data associated with the task to indicate that the task is delegated and, at step 1306, task facilitation service 102 determines and applies a communication policy for communications related to the delegated task. As previously discussed, when a task is delegated, task facilitation service 102 generally determines and applies a communication policy that is more restrictive than a communication policy applied to the task prior to delegation. In the context of the current discussion, more restrictive generally means task facilitation service 102 precludes or inhibits at least some communications between task facilitation service 102 and member 118. For example, in certain extreme cases, task facilitation service 102 may prohibit any communication between task facilitation service 102 and member 118 following delegation. On the other end of the restrictiveness spectrum, task facilitation service 102 may instead add friction or additional steps for communicating between task facilitation service 102 and member 118 without fully precluding or prohibiting communication. Method 1300 is directed to this latter approach.

At step 1308, task facilitation service 102 intercepts or otherwise identifies a potential communication from representative 106 to member 118. For example, task facilitation service 102 may be configured to identify when representative 106 attempts to transmit a message regarding the delegated task to member 118, to initiate a chat session with member 118, or otherwise communicate with member 118 regarding the delegated task based on the communication policy implemented in step 1306. For example, representative 106 may include a user interface with controls for initiating communication with member 118. Accordingly, intercepting or detecting an attempt by representative 106 to interact with member 118 regarding a delegated task may include task facilitation service 102 monitoring for and identifying activation of a corresponding control.

At step 1310 and in response to task facilitation service 102 detecting an attempt by representative 106 to communicate with member 118 regarding the delegated task, task facilitation service 102 prompts representative 106 to confirm that the communication is to be sent/initiated. For example, task facilitation service 102 may prompt representative 106 to confirm that representative 106 is sure that representative 106 wants to send the communication despite the task being delegated. At step 1312, task facilitation service 102 may wait to receive confirmation from representative 106. In response to receiving confirmation from representative 106 that the communication is to be sent, task facilitation service 102 may then permit/initiate the communication at step 1314. Although not illustrated in FIG. 13, representative 106 may instead choose to forego sending the inhibited communication to member 118 at step 1312 or otherwise not respond to the prompt provided by task facilitation service 102. In such cases, the communication may be precluded by default.

Figure 14:
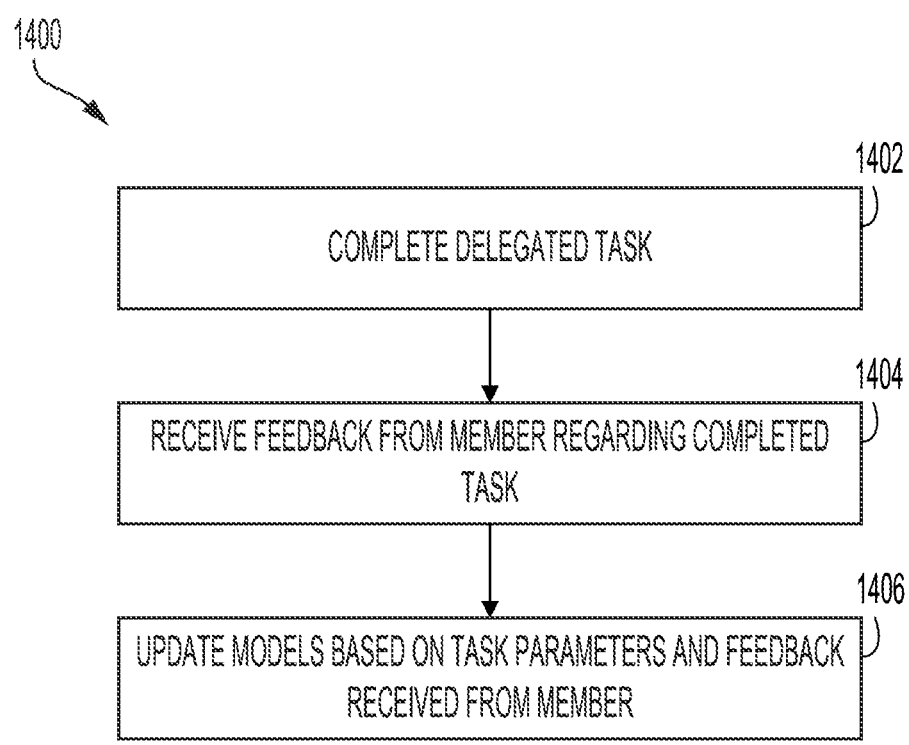
FIG. 14 shows a flow chart illustrating updating of models of a task facilitation service in response to member feedback for a delegated and completed task.

FIG. 14 illustrates a flow chart for a method 1400 for receiving and utilizing member feedback following completion of a delegated task.

At step 1402, task facilitation service 102 determines that a delegated task has been completed. In response, and at step 1404, task facilitation service 102 solicits or otherwise receive feedback from member 118 corresponding to the completed task. Task facilitation service 102 may further request feedback from member 118 regarding specific aspects of the completed task such as, but not limited to, cost, timeliness, communication between task facilitation service 102 and member 118, and the like. Finally, at step 1406, task facilitation service 102 updates any relevant models based on the feedback provided by member 118.

In one specific example, task facilitation service 102 may use feedback received from member 118 to update and refine one or more of parameter prediction models 1010 of parameter prediction system 1008, illustrated in FIG. 11. As described in the context of FIG. 11, parameter prediction models 1010 may generally be used to predict task parameter values that were not directly provided by member 118. Accordingly, to the extent member 118 provides feedback regarding an aspect of a completed task related to a task parameter value predicted by parameter prediction system 1008, task facilitation service 102 may use such feedback to update one or more of parameter prediction models 1010. For example, if a task budget was predicted by parameter prediction system 1008 and member 118 provides feedback that the cost of the completed task was too high, the corresponding model of parameter prediction models 1010 may be updated to provide more conservative budgets going forward. As another example, member 118 may delegate a task to purchase a gift for a loved one to task facilitation service 102. If member 118 subsequently indicates that predicted aspects of the gift were satisfactory or exceeded the expectations of member 118, parameter prediction models 1010 may be updated to make similar predictions going forward.

Figure 15:
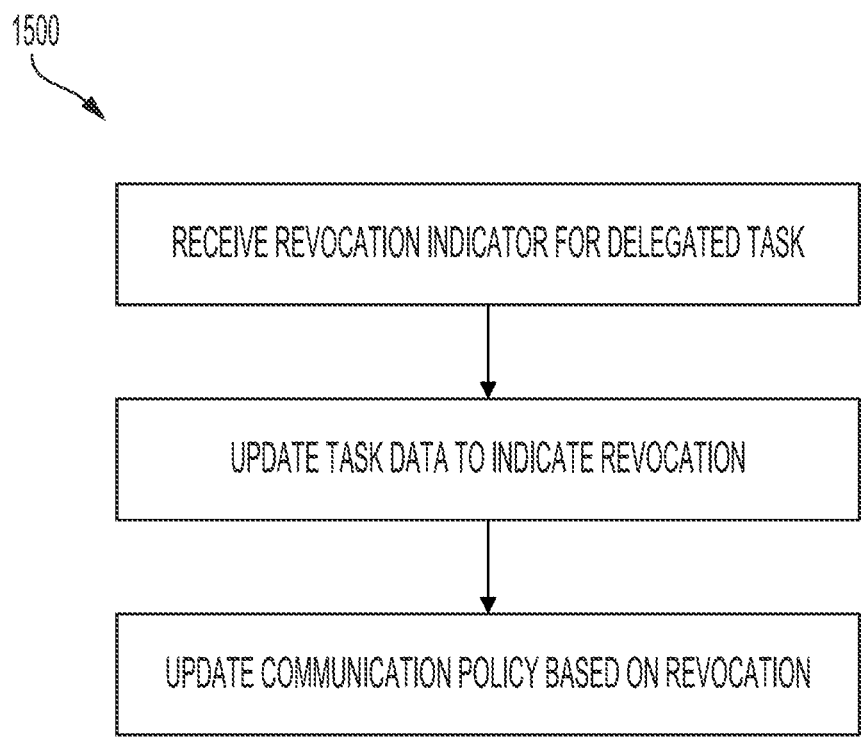
FIG. 15 shows a flow chart illustrating a method for revoking delegation of a task.

FIG. 15 illustrates a flow chart for a method 1500 for revoking delegation of a task. At step 1502, task facilitation service 102 receives a revocation indicator for a task that is currently delegated to task facilitation service 102 for completion. Revocation of delegation status may occur for various reasons and, as a result, receipt of a revocation indicator by task facilitation service 102 may occur using various mechanisms.

In certain cases, task facilitation service 102 may receive a revocation indicator in response to an express revocation by member 118 or representative 106. For example, following delegation of a task, member 118 may be permitted to undelegate a task using a control of a user interface presented by computing device 120 or by communicating their intent to undelegate a task to representative 106. In other cases, task facilitation service 102 may receive a revocation indicator in response to events making completion of the delegated task impractical or impossible. For example, task facilitation service 102 may have inadequate information to complete a proposal for completing a delegated task and may not have any available mans to acquire the missing information. As another example, member 118 may delegate a task to facilitation service 102 to purchase tickets to an event but may only authorize a purchase up to $200 total. If task facilitation service 102 determines that tickets are unavailable at that amount, task facilitation service 102 may undelegate the task given that task facilitation service 102 cannot complete the task as specified when delegated.

At step 1504 and after receiving the indicator that the delegated task is to be undelegated, task facilitation service 102 updates task data for the task to indicate that it has been undelegated. For example, task datastore 110 may include records for each task associated with member 118 with each record including a delegation status field, flag, value, etc. Accordingly, in response to task facilitation service 102 receiving an indicator that a task is to be undelegated, task facilitation service 102 may update/reset the delegation status of the task in task datastore 110 to show that the task is no longer delegated.

At step 1506, task facilitation service 102 determines and updates a communication policy for the task. In contrast to the previously discussed methods in which task facilitation service 102 determines and applies a more restrictive communication policy in response to delegation of a task, when a task is undelegated, task facilitation service 102 may revert the communication policy for the undelegated task to a default communication policy for undelegated tasks or otherwise determine and apply a less restrictive communication policy. Stated differently, task facilitation service 102 may apply a communication policy that permits increased communication between task facilitation service 102 and member 118.

Notably, while not illustrated in FIG. 15, in at least certain instances, task facilitation service 102 may determine that a task may not be undelegated or that doing so would be impractical or generally unrecommended. For example, member 118 may delegate a task to task facilitation service 102 to order dinner. Member 118 may subsequently attempt to revoke delegation. To the extent task facilitation service 102 has ordered the dinner and the order cannot be changed, task facilitation service 102 may determine that revocation is not possible. In such situations, task facilitation service 102 may not permit at task to be undelegated or may otherwise communicate to member 118 that completion of the task is a foregone conclusion.

Task facilitation service 102 may take additional and different actions depending on when delegation is revoked. For example, when delegation is revoked early enough, task facilitation service 102 may simply proceed with the task as if it were undelegated at its outset. So, for example, task facilitation service 102 may proceed with generating multiple proposals for completing the task and presenting the proposals to member 118 for review and approval. If revocation occurs later, task facilitation service 102 may determine what, if any, aspects of the task may still be modified. To the extent any aspects may be modified, task facilitation service 102 may review and confirm those aspects with member 118.

Figure 16:
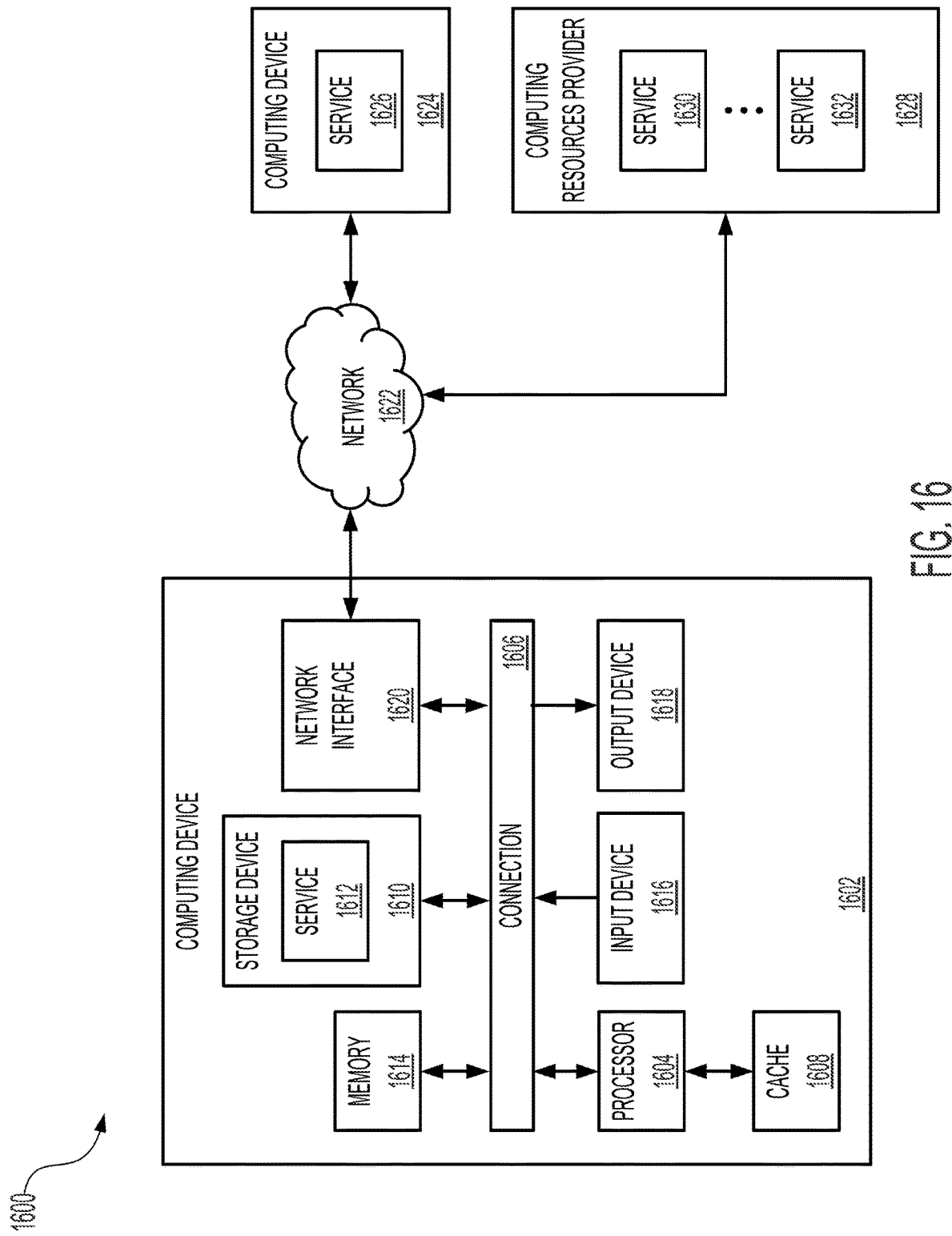
FIG. 16 shows a computing system architecture including various components in electrical communication with each other in accordance with various embodiments.

FIG. 16 illustrates a computing system architecture 1600, including various components in electrical communication with each other, in accordance with some embodiments. The example computing system architecture 1600 illustrated in FIG. 16 includes a computing device 1602, which has various components in electrical communication with each other using a connection 1606, such as a bus, in accordance with some implementations. The example computing system architecture 1600 includes a processor 1604 that is in electrical communication with various system components, using the connection 1606, and including the system memory 1614. In some embodiments, the system memory 1614 includes read-only memory (ROM), random-access memory (RAM), and other such memory technologies including, but not limited to, those described herein. In some embodiments, the example computing system architecture 1600 includes a cache 1608 of high-speed memory connected directly with, in close proximity to, or integrated as part of the processor 1604. The system architecture 1600 can copy data from the memory 1614 and/or the storage device 1610 to the cache 1608 for quick access by the processor 1604. In this way, the cache 1608 can provide a performance boost that decreases or eliminates processor delays in the processor 1604 due to waiting for data. Using modules, methods and services such as those described herein, the processor 1604 can be configured to perform various actions. In some embodiments, the cache 1608 may include multiple types of cache including, for example, level one (L1) and level two (L2) cache. The memory 1614 may be referred to herein as system memory or computer system memory. The memory 1614 may include, at various times, elements of an operating system, one or more applications, data associated with the operating system or the one or more applications, or other such data associated with the computing device 1602.

Other system memory 1614 can be available for use as well. The memory 1614 can include multiple different types of memory with different performance characteristics. The processor 1604 can include any general purpose processor and one or more hardware or software services, such as service 1612 stored in storage device 1610, configured to control the processor 1604 as well as a special-purpose processor where software instructions are incorporated into the actual processor design. The processor 1604 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1604 can be a microprocessor, a microcontroller, a digital signal processor ("DSP"), or a combination of these and/or other types of processors. In some embodiments, the processor 1604 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1600, an input device 1616 can represent any number of input mechanisms, such as a microphone for speech, a touch-sensitive screen for gesture or graphical input, keyboard, mouse, motion input, pen, and other such input devices. An output device 1618 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1600. In some embodiments, the input device 1616 and/or the output device 1618 can be coupled to the computing device 1602 using a remote connection device such as, for example, a communication interface such as the network interface 1620 described herein. In such embodiments, the communication interface can govern and manage the input and output received from the attached input device 1616 and/or output device 1618. As may be contemplated, there is no restriction on operating on any particular hardware arrangement and accordingly the basic features here may easily be substituted for other hardware, software, or firmware arrangements as they are developed.

In some embodiments, the storage device 1610 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1610 can include hardware and/or software services such as service 1612 that can control or configure the processor 1604 to perform one or more functions including, but not limited to, the methods, processes, functions, systems, and services described herein in various embodiments. In some embodiments, the hardware or software services can be implemented as modules. As illustrated in example computing system architecture 1600, the storage device 1610 can be connected to other parts of the computing device 1602 using the system connection 1606. In an embodiment, a hardware service or hardware module such as service 1612, that performs a function can include a software component stored in a non-transitory computer-readable medium that, in connection with the necessary hardware components, such as the processor 1604, connection 1606, cache 1608, storage device 1610, memory 1614, input device 1616, output device 1618, and so forth, can carry out the functions such as those described herein.

The disclosed processes can be performed using a computing system such as the example computing system illustrated in FIG. 16, using one or more components of the example computing system architecture 1600. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for dynamic delegation controls described herein by, for example, executing code using a processor such as processor 1604 wherein the code is stored in memory such as memory 1614 as described herein. One or more of a user device, a provider server or system, a database system, or other such devices, services, or systems may include some or all of the components of the computing system such as the example computing system illustrated in FIG. 16, using one or more components of the example computing system architecture 1600 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1628. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1604 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1614 can be coupled to the processor 1604 by, for example, a connection such as connection 1606, or a bus. As used herein, a connector or bus such as connection 1606 is a communications system that transfers data between components within the computing device 1602 and may, in some embodiments, be used to transfer data between computing devices. The connection 1606 can be a data bus, a memory bus, a system bus, or other such data transfer mechanism. Examples of such connectors include, but are not limited to, an industry standard architecture (ISA bus, an extended ISA (EISA) bus, a parallel AT attachment (PATA bus (e.g., an integrated drive electronics (IDE) or an extended IDE (EIDE) bus), or the various types of parallel component interconnect (PCI) buses (e.g., PCI, PCIe, PCI-104, etc.).

The memory 1614 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1614 can also include magnetic or optical data storage media including read-only (e.g., CD ROM and DVD ROM) or otherwise (e.g., CD or DVD). The memory can be local, remote, or distributed.

As described above, the connection 1606 (or bus) can also couple the processor 1604 to the storage device 1610, which may include non-volatile memory or storage, and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1610. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1606 can also couple the processor 1604 to a network interface device such as the network interface 1620. The interface can include one or more of a modem or other such network interfaces including, but not limited to those described herein. It will be appreciated that the network interface 1620 may be considered to be part of the computing device 1602 or may be separate from the computing device 1602. The network interface 1620 can include one or more of an analog modem, Integrated Services Digital Network (ISDN) modem, cable modem, token ring interface, satellite transmission interface, or other interfaces for coupling a computer system to other computer systems. In some embodiments, the network interface 1620 can include one or more input and/or output (I/O) devices. The I/O devices can include, by way of example but not limitation, input devices such as input device 1616 and/or output devices such as output device 1618. For example, the network interface 1620 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and dependents, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1602 can be connected to one or more additional computing devices such as computing device 1624 via a network 1622 using a connection such as the network interface 1620. In such embodiments, the computing device 1624 may execute one or more services 1626 to perform one or more functions under the control of, or on behalf of, programs and/or services operating on computing device 1602. In some embodiments, a computing device such as computing device 1624 may include one or more of the types of components as described in connection with computing device 1602 including, but not limited to, a processor such as processor 1604, a connection such as connection 1606, a cache such as cache 1608, a storage device such as storage device 1610, memory such as memory 1614, an input device such as input device 1616, and an output device such as output device 1618. In such embodiments, the computing device 1624 can carry out the functions such as those described herein in connection with computing device 1602. In some embodiments, the computing device 1602 can be connected to a plurality of computing devices such as computing device 1624, each of which may also be connected to a plurality of computing devices such as computing device 1624. Such an embodiment may be referred to herein as a distributed computing environment.

The network 1622 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1622 can be wired connections, wireless connections, or combinations thereof. Communications via the network 1622 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1622, within the computing device 1602, within the computing device 1624, or within the computing resources provider 1628 can include information, which also may be referred to herein as content. The information may include text, graphics, audio, video, haptics, and/or any other information that can be provided to a user of the computing device such as the computing device 1602. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1602 and presented to a user of the computing device 1602 using forms that are perceptible via sight, sound, smell, taste, touch, or other such mechanisms. In some embodiments, communications over the network 1622 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1602 and/or the computing device 1624 can be connected to a computing resources provider 1628 via the network 1622 using a network interface such as those described herein (e.g., network interface 1620). In such embodiments, one or more systems (e.g., service 1630 and service 1632) hosted within the computing resources provider 1628 (also referred to herein as within "a computing resources provider environment") may execute one or more services to perform one or more functions under the control of, or on behalf of, programs and/or services operating on computing device 1602 and/or computing device 1624. Systems such as service 1630 and service 1632 may include one or more computing devices such as those described herein to execute computer code to perform the one or more functions under the control of, or on behalf of, programs and/or services operating on computing device 1602 and/or computing device 1624.

For example, the computing resources provider 1628 may provide a service, operating on service 1630 to store data for the computing device 1602 when, for example, the amount of data that the computing device 1602 exceeds the capacity of storage device 1610. In another example, the computing resources provider 1628 may provide a service to first instantiate a virtual machine (VM) on service 1632, use that VM to access the data stored on service 1632, perform one or more operations on that data, and provide a result of those one or more operations to the computing device 1602. Such operations (e.g., data storage and VM instantiation) may be referred to herein as operating "in the cloud," "within a cloud computing environment," or "within a hosted virtual machine environment," and the computing resources provider 1628 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1628 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1630 and service 1632 may implement versions of various services (e.g., the service 1612 or the service 1626) on behalf of, or under the control of, computing device 1602 and/or computing device 1624. Such implemented versions of various services may involve one or more virtualization techniques so that, for example, it may appear to a user of computing device 1602 that the service 1612 is executing on the computing device 1602 when the service is executing on, for example, service 1630. As may also be contemplated, the various services operating within the computing resources provider 1628 environment may be distributed among various systems within the environment as well as partially distributed onto computing device 1624 and/or computing device 1602.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently. A network interface, such as a wireless or wired interface, can enable the computing device to communicate with a network. Examples of computing devices (e.g., the computing device 1602) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, meta-learning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1602.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to illustrate embodiments more clearly and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   generating task data associated with a user, wherein the task data identifies a task to be delegated by a user;
   generating a feature vector corresponding to the task data;
   applying one or more parameter prediction models to the feature vector to generate task parameters associated with the task;
   transmitting the task data and the task parameters, wherein, when the task data and the task parameters are received, a delegation indicator associated with the task is generated;
   receiving the delegation indicator, wherein the delegation indicator corresponds to the user delegating the task for completion by a task facilitation service;
   applying a communication policy for the task responsive to receiving the delegation indicator, wherein the communication policy inhibits transmission of communications to a computing device associated with the user;
   detecting a request to establish a real-time messaging session being transmitted across a communication network, wherein the real-time messaging session is associated with the computing device associated with the user;
   intercepting the request from being transmitted over the communication network, wherein the interception is determined based on the communication policy, and wherein the interception results in inhibiting the transmission of communication data to the computing device associated with the user;

receiving feedback generated by the user after completion of the task; and updating the one or more parameter prediction models based on the feedback, wherein updating the one or more parameter prediction models increases a likelihood of future task parameters being consistent with the feedback.

2. The computer-implemented method of claim 1, wherein the communication policy inhibits the transmission of communications by requiring confirmation at the computing device associated with a representative before permitting a transmission of a communication to the computing device corresponding to the user.

3. The computer-implemented method of claim 1, wherein applying the one or more parameter prediction models includes:
identifying a missing value for a parameter of the task; and
determining the missing value based on the task parameters.

4. The computer-implemented method of claim 1, wherein applying the one or more parameter prediction models includes:
identifying a missing value for a parameter of the task; and
transmitting a request for the task parameters, wherein, when the request is received, the one or more parameter prediction models are applied to the feature vector.

5. The computer-implemented method of claim 1, further comprising generating a proposal for completion of the task using a proposal recommendation system, wherein generating the proposal includes providing the task parameters to the proposal recommendation system.

6. The computer-implemented method of claim 1 further comprising generating a proposal for completion of the task using a proposal recommendation system, wherein the proposal recommendation system selects a proposal template based on the task parameters.

7. The computer-implemented method of claim 1, wherein the communication policy is a first communication policy, the computer-implemented method further comprising:
receiving a revocation indicator for the task, wherein the revocation indicator indicates that the task is to be no longer delegated for completion by the task facilitation service; and
determining a second communication policy for the task in response to receiving the revocation indicator, the second communication policy being more permissive than the first communication policy.

8. The computer-implemented method of claim 1, wherein applying the one or more parameter prediction models includes:
accessing a user model associated with the user, wherein the user model identifies one or more characteristics specific to the user;
generating a weighting vector using the user model; and
adjusting parameters of the one or more parameter prediction models based on the weighting vector, wherein the parameters are adjusted to increase a likelihood of the future task parameters to correspond to the one or more characteristics of the user.

9. A computing device comprising:
one or more data processors; and
a non-transitory computer-readable storage medium containing instructions which, when executed by the one or more data processors, cause the one or more data processors to perform operations including:
generating task data associated with a user, wherein the task data identifies a task to be delegated by a user:
generating a feature vector corresponding to the task data;
applying one or more parameter prediction models to the feature vector to generate task parameters associated with the task;
transmitting the task data and the task parameters, wherein, when the task data and the task parameters are received, a delegation indicator associated with the task is generated;
receiving the delegation indicator, wherein the delegation indicator corresponds to the user delegating the task for completion by a task facilitation service;
applying a communication policy for the task responsive to receiving the delegation indicator, wherein the communication policy inhibits transmission of communications to a computing device associated with the user;
detecting a request to establish a real-time messaging session being transmitted across a communication network, wherein the real-time messaging session is associated with the computing device associated with the user;
intercepting the request from being transmitted over the communication network, wherein the interception is determined based on the communication policy, and wherein the interception results in inhibiting the transmission of communication data to the computing device associated with the user;
receiving feedback generated by the user after completion of the task; and
updating the one or more parameter prediction models based on the feedback, wherein updating the one or more parameter prediction models increases a likelihood of future task parameters being consistent with the feedback.

10. The computing device of claim 9, wherein the communication policy inhibits the transmission of communications by requiring confirmation at the computing device associated with a representative before permitting a transmission of a communication to the computing device corresponding to the user.

11. The computing device of claim 9, wherein applying the one or more parameter prediction models includes:
identifying a missing value for a parameter of the task; and
determining the missing value based on the task parameters.

12. The computing device of claim 9, wherein the operations further include generating a proposal for completion of the task using a proposal recommendation system, and wherein generating the proposal includes providing the task parameters to the proposal recommendation system.

13. The computing device of claim 9, wherein applying the one or more parameter prediction models includes:
identifying a missing value for a parameter of the task; and
transmitting a request for the task parameters, wherein, when the request is received, the one or more parameter prediction models are applied to the feature vector.

14. The computing device of claim 9, wherein the operations further include generating a proposal for completion of the task using a proposal recommendation system, and wherein the proposal recommendation system selects a proposal template based on the task parameters.

15. The computing device of claim 9, wherein the communication policy is a first communication policy, and wherein the operations further include:
   receiving a revocation indicator for the task, wherein the revocation indicator indicates that the task is to be no longer delegated for completion by the task facilitation service; and
   determining a second communication policy for the task in response to receiving the revocation indicator, the second communication policy being more permissive than the first communication policy.

16. The computing device of claim 9, wherein applying the one or more parameter prediction models includes:
   accessing a user model associated with the user, wherein the user model identifies one or more characteristics specific to the user;
   generating a weighting vector using the user model; and
   adjusting parameters of the one or more parameter prediction models based on the weighting vector, wherein the parameters are adjusted to increase a likelihood of the future task parameters to correspond to the one or more characteristics of the user.

17. A computer-program product tangibly embodied in a non-transitory machine-readable storage medium, including instructions configured to cause a computing device to perform operations including:
   generating task data associated with a user, wherein the task data identifies a task to be delegated by a user;
   generating a feature vector corresponding to the task data;
   applying one or more parameter prediction models to the feature vector to generate task parameters associated with the task;
   transmitting the task data and the task parameters, wherein, when the task data and the task parameters are received, a delegation indicator associated with the task is generated;
   receiving the delegation indicator, wherein the delegation indicator corresponds to the user delegating the task for completion by a task facilitation service;
   applying a communication policy for the task responsive to receiving the delegation indicator, wherein the communication policy inhibits transmission of communications to a computing device associated with the user;
   detecting a request to establish a real-time messaging session being transmitted across a communication network, wherein the real-time messaging session is associated with the computing device associated with the user;
   intercepting the request from being transmitted over the communication network, wherein the interception is determined based on the communication policy, and wherein the interception results in inhibiting the transmission of communication data to the computing device associated with the user;
   receiving feedback generated by the user after completion of the task; and
   updating the one or more parameter prediction models based on the feedback, wherein updating the one or more parameter prediction models increases a likelihood of future task parameters being consistent with the feedback.

18. The computer-program product of claim 17, wherein the communication policy inhibits the transmission of communications by requiring confirmation at the computing device associated with a representative before permitting a transmission of a communication to the computing device corresponding to the user.

19. The computer-program product of claim 17, wherein applying the one or more parameter prediction models includes:
   identifying a missing value for a parameter of the task; and
   determining the missing value based on the task parameters.

20. The computer-program product of claim 17, wherein applying the one or more parameter prediction models includes:
   identifying a missing value for a parameter of the task; and
   transmitting a request for the task parameters, wherein, when the request is received, the one or more parameter prediction models are applied to the feature vector.

21. The computer-program product of claim 17, wherein the operations further include generating a proposal for completion of the task using a proposal recommendation system, and wherein generating the proposal includes providing the task parameters to the proposal recommendation system.

22. The computer-program product of claim 17, wherein the operations further include generating a proposal for completion of the task using a proposal recommendation system, and wherein the proposal recommendation system selects a proposal template based on the task parameters.

23. The computer-program product of claim 17, wherein the communication policy is a first communication policy, and wherein the operations further include:
   receiving a revocation indicator for the task, wherein the revocation indicator indicates that the task is to be no longer delegated for completion by the task facilitation service; and
   determining a second communication policy for the task in response to receiving the revocation indicator, the second communication policy being more permissive than the first communication policy.

24. The computer-program product of claim 17, wherein applying the one or more parameter prediction models includes:
   accessing a user model associated with the user, wherein the user model identifies one or more characteristics specific to the user;
   generating a weighting vector using the user model; and
   adjusting parameters of the one or more parameter prediction models based on the weighting vector, wherein the parameters are adjusted to increase a likelihood of the future task parameters to correspond to the one or more characteristics of the user.

* * * * *